US007386586B1

(12) United States Patent
Headley et al.

(10) Patent No.: US 7,386,586 B1
(45) Date of Patent: Jun. 10, 2008

(54) SYSTEM FOR SCHEDULING AND MONITORING COMPUTER PROCESSES

(75) Inventors: Richard E. Headley, Westlake Village, CA (US); Richard E. DeVillers, Camarillo, CA (US); Shiva Mirzadeh, Woodland Hills, CA (US); Gerald A. Hatch, Van Nuys, CA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/219,071

(22) Filed: Dec. 22, 1998

(51) Int. Cl.
*G06F 15/16* (2006.01)
*G06F 9/46* (2006.01)
*G06F 3/00* (2006.01)
*G06F 9/44* (2006.01)
*G06F 13/00* (2006.01)

(52) U.S. Cl. ............. 709/202; 709/201; 718/102; 718/103; 719/317

(58) Field of Classification Search ......... 707/200; 717/100; 718/100–108, 313–319; 719/313–319, 719/201–203, 223–226; 709/201–204, 223–226
See application file for complete search history.

(56) References Cited

U.S. PATENT DOCUMENTS

| | | | |
|---|---|---|---|
| 5,093,794 A | * | 3/1992 | Howie et al. ............ 700/100 |
| 5,363,175 A | | 11/1994 | Matysek |
| 5,465,354 A | | 11/1995 | Hirosawa et al. ........ 395/650 |
| 5,515,492 A | | 5/1996 | Li et al. |
| 5,517,316 A | * | 5/1996 | Hube ..................... 358/296 |
| 5,537,550 A | * | 7/1996 | Russell et al. ........... 709/224 |
| 5,596,750 A | | 1/1997 | Li et al. |
| 5,642,508 A | | 6/1997 | Miyazawa |
| 5,781,908 A | * | 7/1998 | Williams et al. ........ 709/223 |
| 5,819,263 A | * | 10/1998 | Bromley et al. ........... 707/3 |
| 5,825,361 A | * | 10/1998 | Rubin et al. ............ 345/836 |

(Continued)

FOREIGN PATENT DOCUMENTS

JP    08 286958    11/1996

(Continued)

OTHER PUBLICATIONS

*Tivoli*, Tivoli Workload Scheduler, 1998, pp. 1-6.

(Continued)

*Primary Examiner*—Nathan J. Flynn
*Assistant Examiner*—David England
(74) *Attorney, Agent, or Firm*—Baker Botts L.L.P.

(57) ABSTRACT

A job scheduling device providing a consistent set of application programming interfaces (APIs) compiled and linked into an individual or suite of programs to provide scheduling services on a single computer or across multiple computing platforms, includes a GUI API for retrieving and validated job parameters, a job scheduling API for allocating jobs based on the job parameters, and an enterprise scheduling agent hosted on one or more nodes of the computer platforms. An enterprise communication agent sends messages containing jobs from a computer executing a program utilizing the job scheduling device to the enterprise scheduling agent on a selected node where the job is to execute. Then, the enterprise scheduling agent retrieves job parameters and launches the job on the selected node. The enterprise scheduling agent maintains a local job repository containing job information for each job run on its corresponding node and sends messages to a job data management API to maintain a central job repository containing information on jobs executed on all nodes.

50 Claims, 42 Drawing Sheets

U.S. PATENT DOCUMENTS

| | | | |
|---|---|---|---|
| 5,889,989 A | 3/1999 | Robertazzi et al. | |
| 5,933,647 A | 8/1999 | Aronberg et al. | |
| 6,012,084 A * | 1/2000 | Fielding et al. | 709/205 |
| 6,085,243 A * | 7/2000 | Fletcher et al. | 709/224 |
| 6,115,393 A * | 9/2000 | Engel et al. | 370/469 |
| 6,160,988 A * | 12/2000 | Shroyer | 725/63 |
| 6,182,110 B1 * | 1/2001 | Barroux | 709/201 |
| 6,263,358 B1 * | 7/2001 | Lee et al. | 718/100 |
| 6,300,863 B1 * | 10/2001 | Cotichini et al. | 340/5.8 |
| 6,314,555 B1 * | 11/2001 | Ndumu et al. | 717/101 |
| 6,321,264 B1 * | 11/2001 | Fletcher et al. | 709/224 |
| 6,323,882 B1 * | 11/2001 | Jerome et al. | 345/744 |
| 6,681,010 B1 * | 1/2004 | Anderson et al. | 379/265.11 |
| 6,704,409 B1 * | 3/2004 | Dilip et al. | 379/265.02 |

OTHER PUBLICATIONS

*Tivoli*, Tivoli Maestro, 1998, pp. 1-6.
*Tivoli*, Enterprise Job Scheduling, Date Unknown, pp. 1-15.
*Platinum technology, inc.*, AutoSys, V3.3 User Manual.
*Platinum technology, inc.*, Auto Sys, V. 3.4.3., May 1998, Web Page pp. 1-4.
Anonymous, *Process/Processor Icons and Queues*, Research Disclosure, Kenneth Mason Publications, Hampshire GB, vol. 310, No. 51, XP-007114740, ISSN: 0374-4353, 1 page, Feb. 1990.
IBM, *IBM LoadLeveler for AIX, Using and Administering*, Version 2, Release 1, XP-002185517, 12 pages, Oct. 1998.
European Patent Office Communication pursuant to Article 96(2) EPC for Application No. 99 967 671.1-2211, 9 pages, Sep. 16, 2005.

* cited by examiner

Create Calendar
ID:
Description:

| << | < | June 1998 | | | > | >> |
|---|---|---|---|---|---|---|
| Sun | Mon | Tue | Wed | Thu | Fri | Sat |
| 31 | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 1 | 2 | 3 | 4 |
| 5 | 6 | 7 | 8 | 9 | 10 | 11 |

Selected dates:

OK    Cancel    Help

FIG. 22

Edit Calendar
ID:
Mondays/June
Description:
Every Monday in June 1998

| << | < | June 1998 | | | > | >> |
|---|---|---|---|---|---|---|
| Sun | Mon | Tue | Wed | Thu | Fri | Sat |
| 31 | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 1 | 2 | 3 | 4 |
| 5 | 6 | 7 | 8 | 9 | 10 | 11 |

Selected dates:
6/1/98
6/8/98
6/15/98
6/22/98
6/29/98

OK    Cancel    Help

FIG. 23

Strategy Scheduling

Strategy name
LES test 5 - pippen:platinum

Current schedules:

| Job Description | Num Jobs | Start Date/Time | Recurrence |
|---|---|---|---|
| schedule 1 : every 4 wks on Wed | 1 | Not yet scheduled | 4 weeks |
| schedule 2 - every weekday, 7/7 | 1 | 7/7/98 10:18:11 PM | Weekdays |
| schedule3 - run later | 1 | Not yet scheduled | None |
| schedule 4 - 15 & 45 past the hour | 1 | Not yet scheduled | Minutes |

[ Create ]  [ Edit ]  [ Delete ]          [ Close ]  [ Help ]

FIG. 24

Point Product Property Sheet

Job Scheduling

Job Description
[                                    ]

─ Start Date & Time ─
○ Run immediately
○ Schedule later
◉ Run at
  Job at date        Job Start Time
  June  25, 1998     8:45:26 AM ─ Time Zone ─
◉ Use time zone of this workstation
○ Use time zone of the node where the job will be run ─ Recurring Run Interval ─
◉ None
○ Minutes after each hour
○ Hours
○ Days
○ Weeks
○ Months
○ Years Calendar ID:
[ <NONE> ]    Select...          [ Notification scripts... ]

[ OK ]  [ Cancel ]  [ Help ]

| General | Command | Databases | Job Scheduling | Parameters |

Database Connect String: ultra.world

Database Instance: ora73

Object Name: DATA

User ID: system

User Password: xxxxxxxxxxxxxxxxxxxxxxxxx

FIG. 39

| General | Command | Databases | Job Scheduling | Parameters |

Start Date & Time
● Run immediately
○ Schedule later
○ Run at
Job at date: June 24, 1998
Job Start Time: 3:31:35 PM Time Zone
● Use time zone of this workstation
○ Use time zone of the node where the job will be run Recurring Run Interval
● None
○ Minutes after each hour
○ Hours
○ Days
○ Weeks
○ Months
○ Years Calendar ID:
<NONE>

FIG. 40

| General | Command | Databases | Job Scheduling | Parameters |

Job Parameters

| array_size=500 | export_directory_5= | parallel_ |
| cache=0 | export_directory_6= | parallel_ |
| cluster_opt=1 | export_directory_7= | part_opt |
| commit_size=0 | export_directory_8= | part_spr |
| compile_proc=0 | export_directory_9= | part_tab |
| compress_level=5 | export_type=2 | partition |
| conc_idx_build=1 | failure_pred=12 | rbseg=1 |
| disable_log_archiving=0 | max_buffer_for_long=32 | recovery |
| export_directory_1=%DMC_TMP | nb_thread=1 | refresh_ |
| export_directory_10= | nb_thread_for_conc_load=0 | retain_d |
| export_directory_2= | nb_thread_for_parallel_load=2 | retail_e |
| export_directory_3= | ora8_skip_object=1 | retries_r |
| export_directory_4= | parallel_degree=1 | retry_int |

FIG. 41

| General | Run Stats |

| Job ID | 17 |
| Run Number | 1 |
| Time Zone | XXX7XXX |
| Scheduled Start Time | |
| Actual Start Time | 06/20/1998 at 11:03 |
| Start Status | Started Successfully |
| End Time | 06/20/1998 at 11:03 |
| Operating System Status | 1 |

Run Status
- ● Completed     ○ Running       ○ Preempted
- ○ Not Started   ○ Stopped       ○ Failed

| Completion Status Code | 15 |
| Log File | /platinum/dmc/files/logdir/ora73/L73_1log |

SYSTEM FOR SCHEDULING AND MONITORING COMPUTER PROCESSES

BACKGROUND OF THE INVENTION

1. Field of the Invention

This invention relates to the scheduling and monitoring of computer processes. The invention is more particularly related to the submission of jobs for execution. The invention is still further related to the submission, scheduling and monitoring of jobs across multiple networked computer platforms (nodes) and the provision of a common interface for programs submitting to the jobs.

The invention is still further related to a job scheduler that maintains local job repositories having detailed job histories for each node and a central job repository maintaining detailed job history across an enterprise. The invention is yet further related to the provision of a scheduling agent on each computer platform to start execution of each job submitted.

2. Discussion of the Background

Modern computer systems are utilized for a wide range of tasks. Many tasks are simple and are executed in real time. However, some tasks require long execution times, or must be performed at various intervals or at inconvenient times (when a system where a task is running has a light tasking load, early morning or weekend hours, for example).

Basic scheduling devices have been utilized to run certain programs or jobs at various intervals or at specified run times. However, these systems do not provide adequate service or integrate seamlessly into any specific product line, nor provide appropriate service between multiple computing platforms in a networked environment.

SUMMARY OF THE INVENTION

Accordingly, it is an object of this invention to provide a job scheduling apparatus for scheduling jobs.

It is another object of the present invention to provide a job scheduling apparatus that provides job scheduling services across multiple computing platforms, and control over the execution of a job submitted;

It is yet another object of the present invention to provide a scheduling agent on each respective node of a computer network for accepting and managing jobs submitted to the respective node;

It is another object of this invention to provide a command line that may be utilized to determine job status and issue job control commands to jobs executing on a node in an enterprise.

It is another object of this invention to provide a seamless job scheduling device for plural software products having a common format for submission and scheduling of jobs, and to provide consistent application programming interfaces to the software products utilizing the job scheduling device.

It is yet another object of this invention to provide a single job scheduling and administrative tool for all POEMS enabled products (Platinum point products, for example) under a common application programming interface that specifically and efficiently targets job scheduling requirements of the products.

It is yet another object of the present invention to provide a common graphical user interface (Microsoft Foundation Class (MFC), for example) to, schedule and list all jobs and common APIs used by a GUI component and the agent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is an illustration of a POEMS Scheduling Service Job Scheduling window;

FIG. 17 is an illustration providing an example of a job scheduled to run on a selected specific date of each month;

FIG. 21 is an illustration of a Create Calendar window utilized to create a calendar having selected dates for running jobs associated with the calendar;

FIG. 22 is an illustration of an existing calendar brought up for editing;

FIG. 23 is an illustration of a Strategy Scheduling window utilized for creating strategy windows and selecting strategy windows for editing and deleting;

FIG. 24 is an illustration of a Point Product Property sheet invoked by clicking Create from the Strategy Scheduling window;

FIG. 39 is an illustration of a Databases Tab property page;

FIG. 40 is an illustration of a Job Scheduling Tab property page;

FIG. 41 is an illustration of a Parameters Tab property page;

FIG. 42 is an illustration of a General Tab property page containing information about a job run;

DESCRIPTION OF THE PREFERRED EMBODIMENTS

Figure 1:
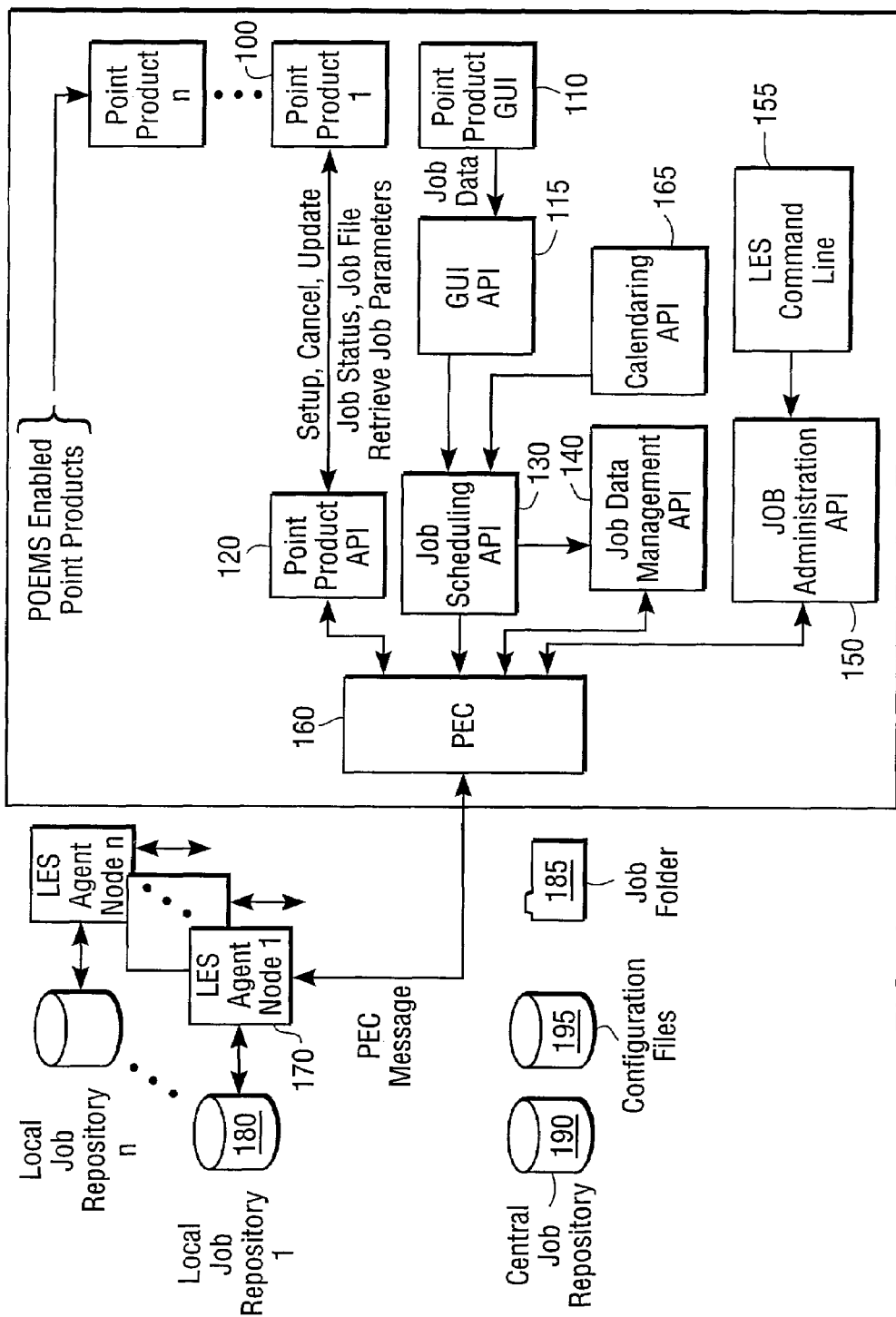
FIG. 1 is a block diagram illustrating an implementation of the present invention providing a job scheduling and administrative tool for POEMS enabled products under a common application programming interface.

Referring now to the drawings, wherein like reference numerals designate identical or corresponding parts throughout the several views, and more particularly to FIG. 1 thereof, there is illustrated an implementation of the present invention providing a job scheduling and administrative tool for POEMS enabled products (Platinum point products, for example) under a common application programming interface.

In FIG. 1, a suite of point products 100 (point products 1 . . . n), each including a point product GUI 110, are linked together with various POEMS enabling application programming interfaces (API's), and a Platinum Enterprise Communicator (PEC) 160. At least one Lightweight Enterprise Scheduler (LES) agent 170 is installed on a node. The point product GUI 110 provides a user interface to the point product 100 and communicates user selections by sending job data to a GUI API 115.

The GUI API 115 incorporates LES provided property pages, performs data checks and job allocation, and calls relevant scheduling functions in the job scheduling API 130 according to the job parameters. The GUI API 115 is used by the point product GUI 110.

The job scheduling API 130 performs scheduling services, allocates and defines jobs submitted and distributes jobs by initiating a PEC message to an LES agent on a selected node to run the job (LES node 1, 170, for example). Inter-process communications are performed via the PEC 160. The Job Scheduling API is preferably used by the point product GUI 110.

The LES agent 170 initiates processing of the job as requested by the Job Scheduling API 130. The present invention may be implemented across multiple computing platforms and/or nodes, and an LES agent is installed on each node on which jobs run (LES agents 1 . . . n).

Each LES Agent updates a local job repository 180 that maintains job information on each job submitted to it's respective node. The local job repositories are installed on each node where jobs run and may be implemented using SQL*Anywhere (a database product having a small footprint, for efficiency of resources). Other SQL products and various database/repository configurations may be substituted.

A central job repository 190 maintains a super set of job data on all jobs submitted to each node in the system. The central job repository is maintained by a job data management API 140, and is implemented in a Relational Database Management System (RDBMS), Dex, or other data repository or management system.

The job data management API 140 selects, inserts, updates, or deletes jobs and job histories. Both local and central job repositories are updated by job data management API. Also, the job data management API 140 is used internally by the job scheduler and the LES agent. The job scheduling API reformats data into PEC message format.

A location of the central job repository 190 is determined by RDEX (Relational Data Exchange). If no DEX (Data Exchange) information is available, the SDM (Software Delivery Manager) install prompts are utilized for table location information. Configuration files for set up of the POEMS environment, PEC 160, LES agents, etc. are maintained on a same node as the central job repository, each client machine, and on each node where jobs run.

Each of the Central and local job repositories are automatically updated by LES. The point products themselves only interact with the API's and are not concerned with the details of either type of repository.

A point product API 120 is provided to allow access by each point product to determine job status, job logfile, perform setup and cancel functions (jobs), update the job logfile, and retrieve job parameters as the job runs. In the POEMS configuration, this API is utilized by the point product executable (point product 100, for example).

An LES command line 155 provides command line access to job administration functions (by communicating with a job administration API 150), including determine job status, and setup, cancel, or update a job logfile and retrieve job parameters.

The job administration API 150 deletes, cancels, reruns, or copies existing jobs. This API is used internally by the LES command line 155 and a job folder 185 (containing a list of jobs, that may be viewed in various formats).

Each of the point product API 120, Job Scheduling API 130, Job Data Management API 140, and Job Administration API 150, communicate as needed with any of LES agents installed on nodes 1 . . . n via PEC messages.

The PEC messages are provided in a format to communicate between LES enabled workstations and the various APIs.

A calendaring API 165 is provided to manage calendar functions and is used internally by other API's and the point product GUI.

The POEMS enabled point products and LES agents installed on nodes of a computing network or system provide common job scheduling services, hereinafter referred to as the Lightweight Enterprise Scheduler (LES). The LES allows a user to schedule a new job, delete a job, cancel a running job, and re-run a job.

A sample LES job flow is provided in the following steps:
1. Enter job parameters in the point product GUI.
2. Press the "Finish/OK" button.
3. Job parameters are passed to the LES Job Distributor.
4. Parent job entry is placed in the central repository.
5. Job parameters are passed to the LES agent using PEC.
6. Job parameters are stored in the local Job Table. (If this step fails, an event/alarm is sent indicating that the job is not scheduled on the node.)
7. Child job is created and stored in the central repository.
8. Repeat steps 5-7 for each of selected nodes.
9. At the appropriate time, the job is started (which launches the point product executable).
10. Job parameters are obtained from the job table using a LES API.
11. A job progress message is sent out.
12. The job's progress displays on the console using a progress monitor.
13. The job completes, and the LES agent places a record in the local Job History Table.
14. The LES agent places a record in the central Job History Table.
15. The LES Agent sends a "Job Complete" event.

LES Agent

Figure 2:
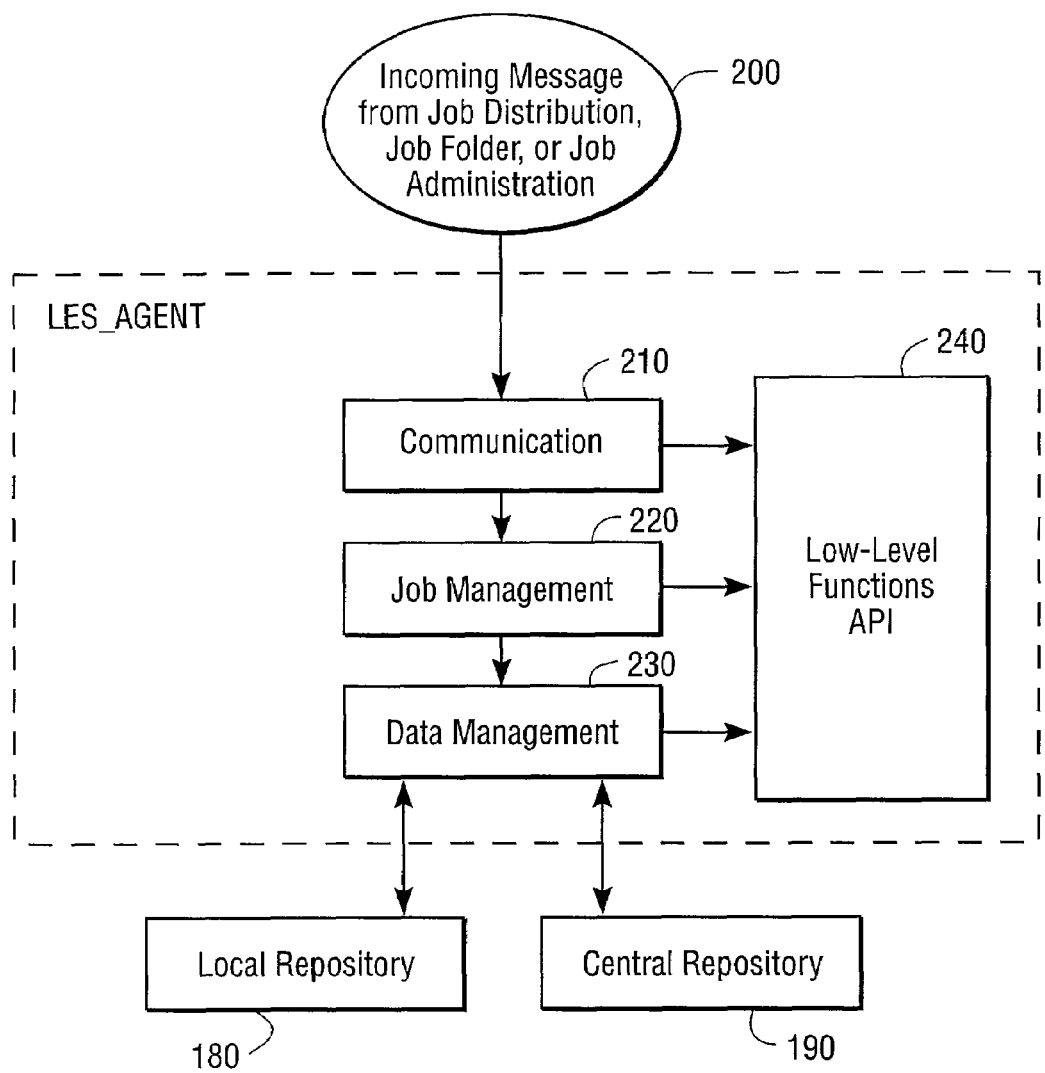
FIG. 2 is a block diagram of a Lightweight Enterprise Scheduler (LES) Agent that coordinates execution and job history submissions for a node.

FIG. 2 is a block diagram illustrating the main components and communications of an LES agent (LES agent 170, for example). The LES agent consists of three main parts:
1. Communication Module 210—Sends and receives PEC messages from the Job Distribution API to the point product and from the point product to the Job Distribution API.
2. Job Management Module 220—The LES kernel. This part of the agent sets up the internal environment and memory, launches the job, runs the job, and manages job processes.
3. Data Management Module 230—Updates and deletes data from the Local and Central Repositories (180 and 190, respectively).

A low-level function API 240 is available to all agent modules. This low-level API handles all internal functions, file management, and messages.

Figure 3:
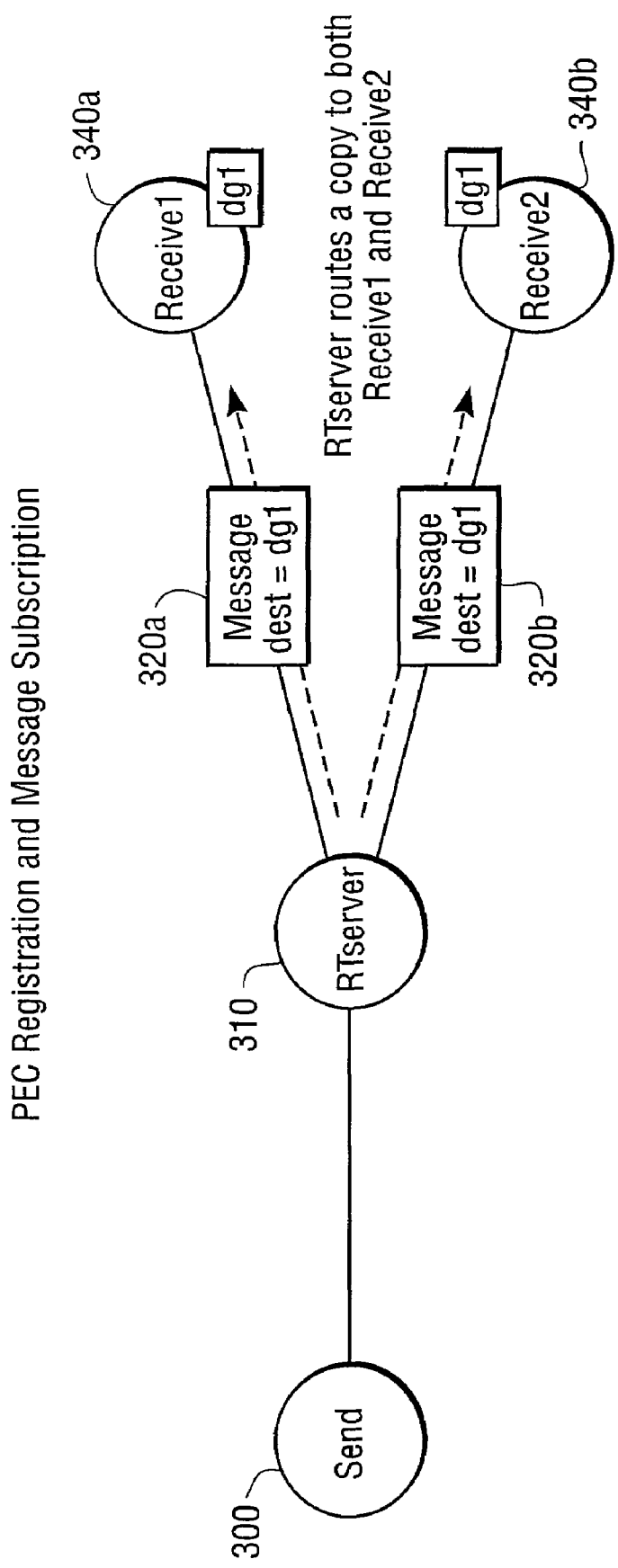
FIG. 3 is a flow diagram illustrating an RTserver utilized to communicate messages to Receive modules.

FIG. 3 is a flow diagram illustrating how PEC messages are normally routed. A send module 300 sends a message 320 having a destination encoded therein which is received by an RT server which sends copies of the message 320a and 320b to each of Receive modules 340a and 340b, respectively (LES agents, for example).

To prevent the RT server from delivering the same job message to more than one agent, the LES agent registers as PTLES_<nodeaddress> datagroup. This registration identifies each LES agent with a unique datagroup so that messages may be routed to nodes of a datagroup corresponding to the message.

Figure 4:
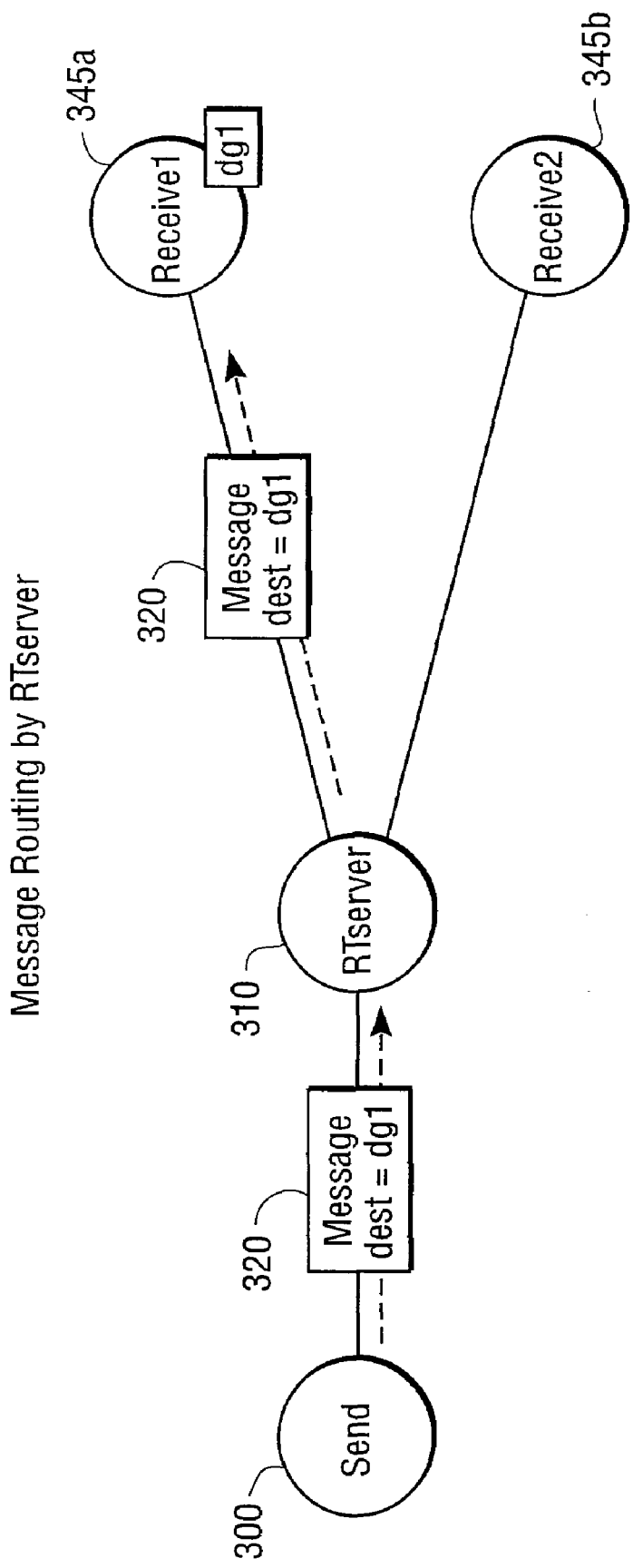
FIG. 4 is a flow diagram illustrating an RTserver utilized to communicate messages to Receive modules subscribed to a specific node.

Each LES Agent subscribes to the current node address (hostname) messages, so each sender should also specify which node will receive the message. Proper message routing is illustrated in FIG. 4, which illustrates the RT server 310 passing the message 320 to Receive1 module 345a, and Receive module 345b not receiving a copy. An RT Server runs on each machine where processes are managed, provides PEC routing to a correct destination.

Figure 5:
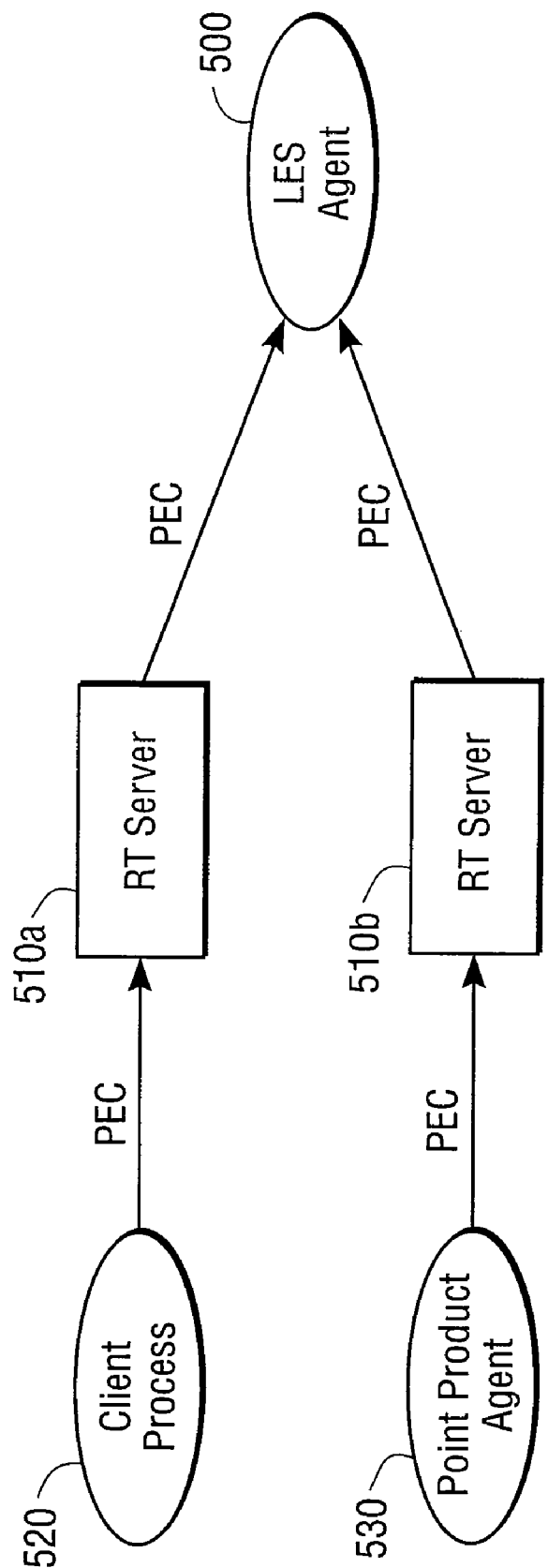
FIG. 5 is a flow diagram illustrating LES agent receipt of Platinum Enterprise Communicator (PEC) messages.

FIG. 5 is a flow diagram illustrating the flow of messages incoming to an LES agent 500. All incoming messages are received via a PEC communication API (PEC 160, for example, see FIG. 1), from any of a client process 520, point product agent 530, or other module communicating with an LES agent. Each message is routed via an RT server (510a, 510b, for example) to the LES agent 500.

Figure 6:
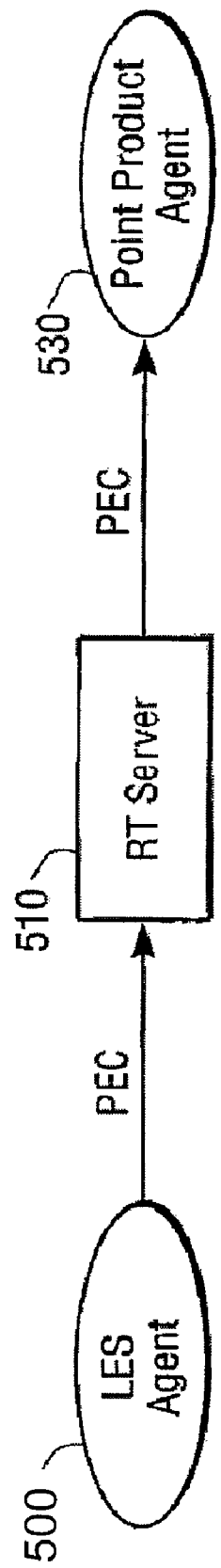
FIG. 6 is a flow diagram illustrating an LES agent sending point product parameters to a point product process via PEC.

FIG. 6 illustrates reverse message traffic, from the LES agent 500 to the point product agent 530. The LES agent 500 sends point product parameters to the point product process (agent) 530 using PEC messages via the RT server 510.

Figure 7A:
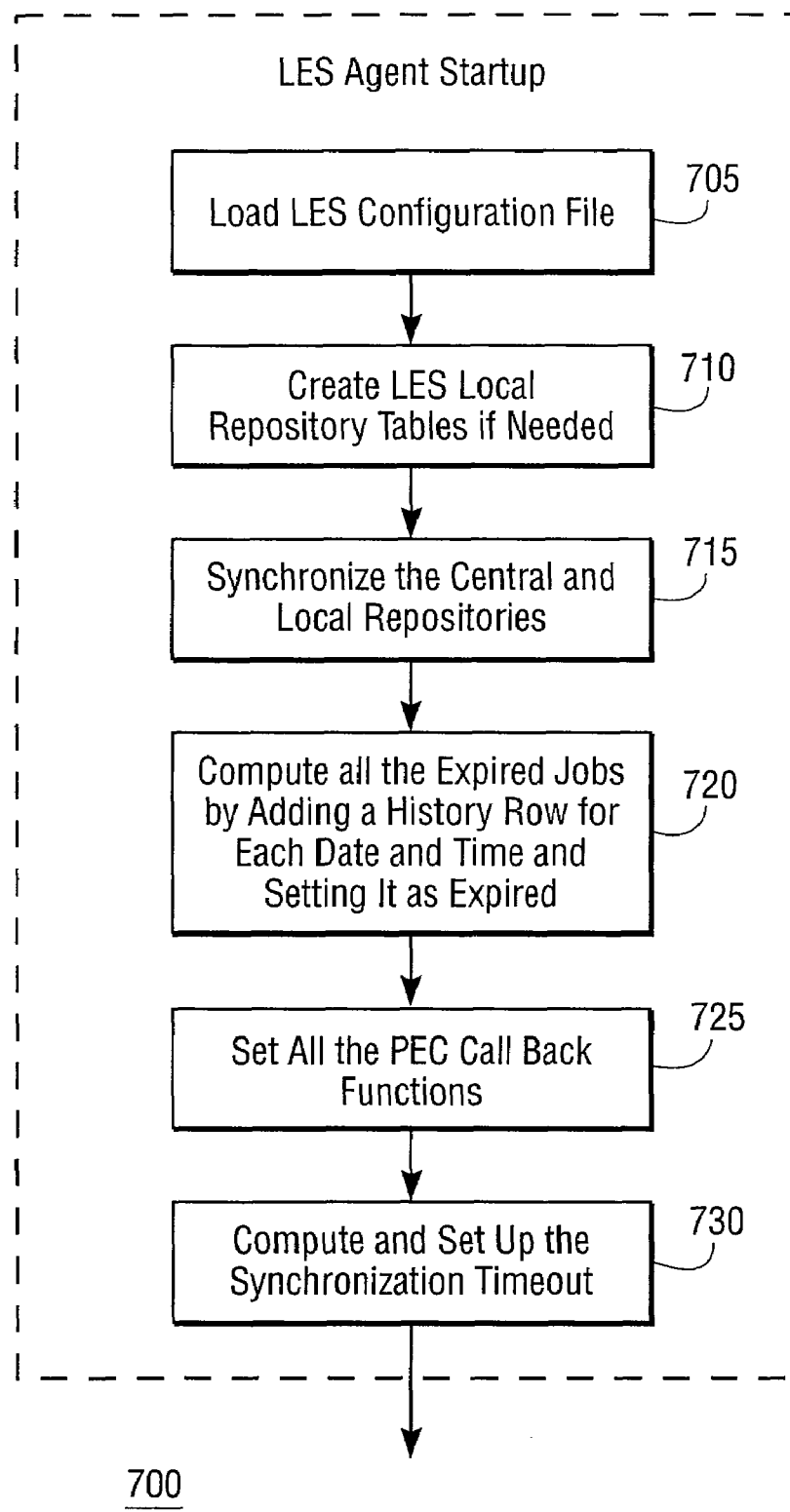
FIG. 7A is a flow chart illustrating startup of an LES agent.

FIG. 7A is a flow chart illustrating the steps for LES agent startup. At step 705, LES configuration files (which maintain startup information on location of repositories, information for LES to find out how to set-up and operate) are loaded. At step 710, LES local job repository tables are created (local job repository 1 180, see FIG. 1, for example). Step 710 is bypassed if local job repositories are already present on the node which the LES agent is being started.

At step 715, the local job repository is synchronized with the central job repository 190. For example, The synchronization process updates the central job repository to reflect each entry in the local job repository, this process assures that the central job repository maintains records for each job across the enterprise.

At step 720, a history row is added for all expired jobs (both central and local). Information on expired jobs is maintained for historical purposes.

At step 725, PEC call back functions are initialized. The PEC callback functions provide the appropriate API interface allowing communication with the PEC 160.

At step 730, a synchronization timeout is computed and setup. The synchronization timeout is utilized to control how long to wait to connect to the other repository.

Figure 7B:
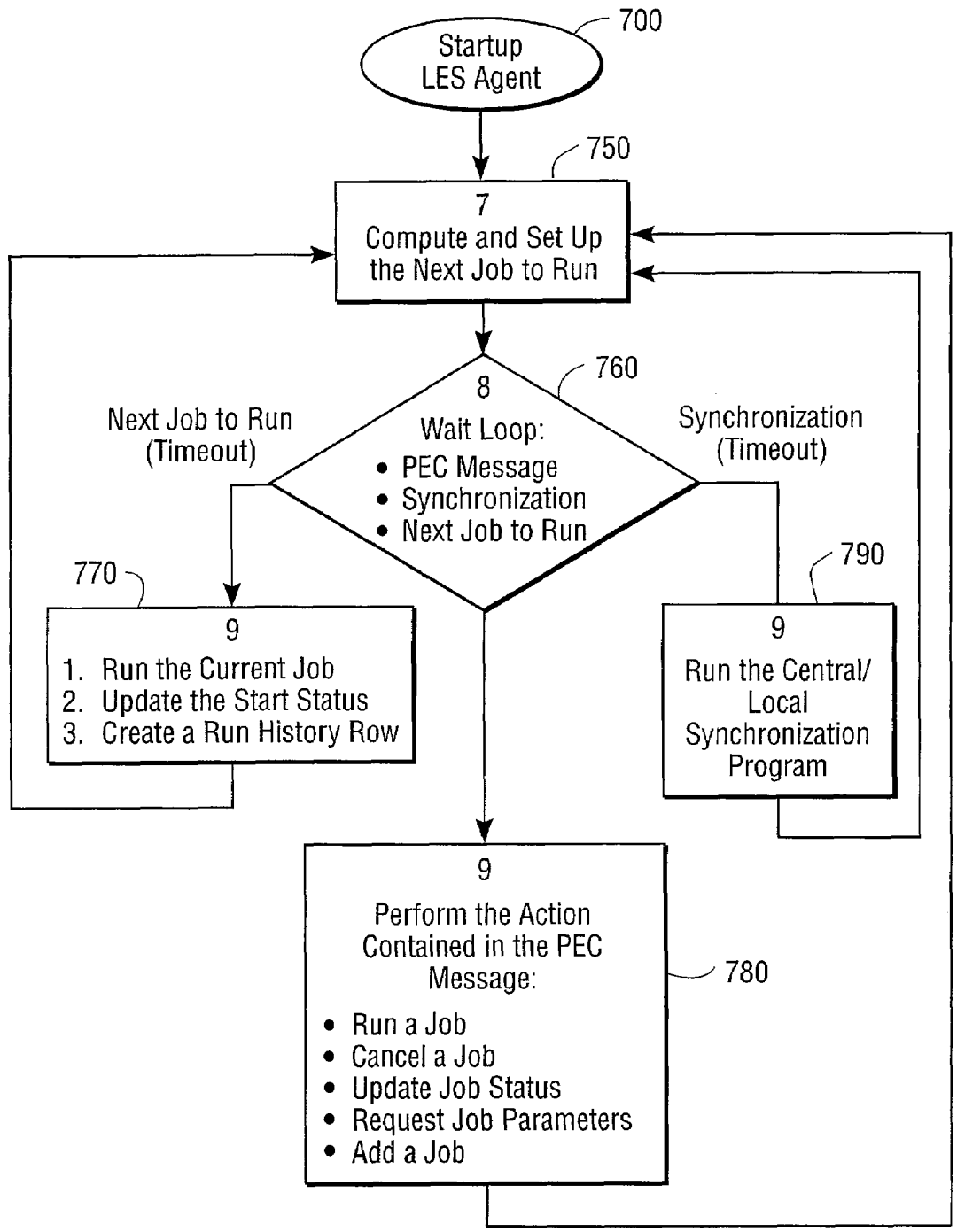
FIG. 7B is a flow chart illustrating the processes of an LES Agent.

As illustrated in FIG. 7B, once the LES agent is started, it begins performing receipt and startup of job processes selected to be run on the node on which the LES is installed. At step 750, the LES agent computes and performs setup of a next job to run, and then enters a wait loop 760, where the LES agent waits for one of a PEC message, Synchronization timeout, and a timeout on a next job to run.

When the wait loop times out on a next job to run, step 770 is performed, which includes running the current job (next job that timedout), updating a start status of the job, and creating a run history row (updating and creating actions are performed in both local and central repositories).

When the loop times out on a synchronization, a Central/Local synchronization program is executed (synchronizes Local with central, and central with local).

When the loop receives a PEC message, the LES agent performs the action contained in the PEC message, step 780. PEC messages received by the LES agent include messages to run a job, cancel a job, update job status, request job parameters (Job parameters are information that a product would need, user name, db name, set by point product and stored in the LES API in an area of the LES db where point products can use for whatever they want).

Upon completion of either the job timeout, synchronization timeout, or PEC message action (steps 770, 790, and 780, respectively), the LES agent computes and sets up a next job to run (repeating step 750), and re-enters the wait loop 760.

When the POEMS Scheduling Service is utilized to add a job, the point product GUI 110 calls the Job Scheduling API 130 to submit the job.

The API performs the following steps:
1. Saves the job in the central repository.
2. Checks to see if the agent is present.
3. If the agent is running, sends a PEC message (including the job) to the agent.

The Agent performs the following steps:
1. Receives the PEC message.
2. Saves the job in the local repository.
3. Checks when to run the job.
4. Launches the command line.

Figure 8:
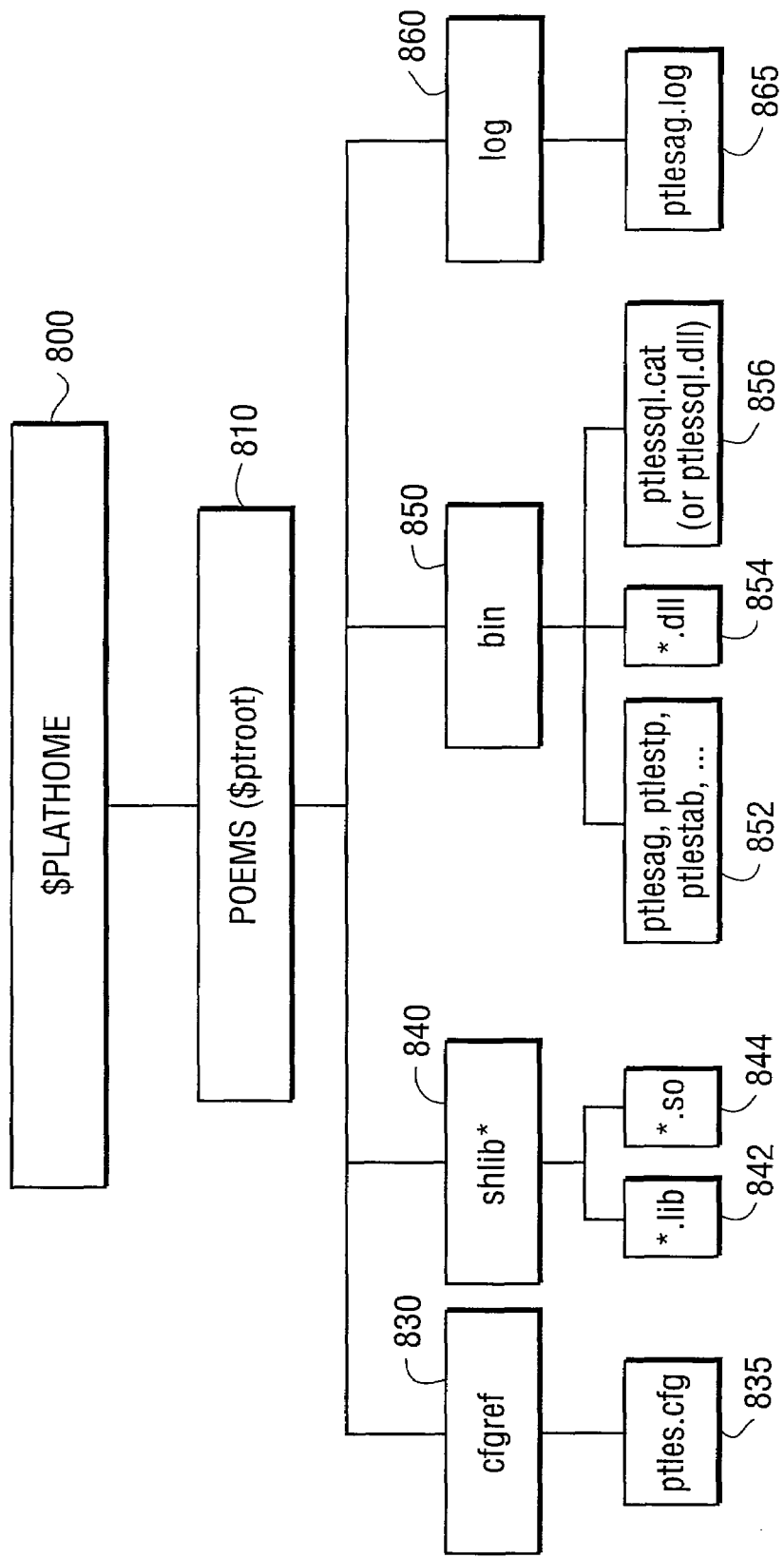
FIG. 8 is a block diagram illustrating an LES directory structure.

The LES agent is maintained in an hierarchically organized directory structure, one example being illustrated in FIG. 8. A top level directory $PLATHOME 800 contains all relevant directories containing files related to Platinum products (other products could alternatively be used). A POEMS root directory, $ptroot 810 maintains all directories and files related to enabling POEMS.

A cfgref 830 directory maintains a configuration file configuration files 195, for example.

A shlib* 840 directory maintains all *.lib, and *.so files, which are shared libraries.

A bin 850 directory separately maintains each of a ptles* files 852, *.dll 854, and *sql.dll 856 files. The ptles* files 852 include ptlesag, ptlestp, ptlestab, and other related files. The *.dll 854 maintains each of dynamic link libraries, and *sql.* 856 maintains LES queries for LES functions.

A log 860 directory maintains a ptlesag.log 865 logfile (that includes a diagnostic log, info about runs, and errors).

Figure 9:
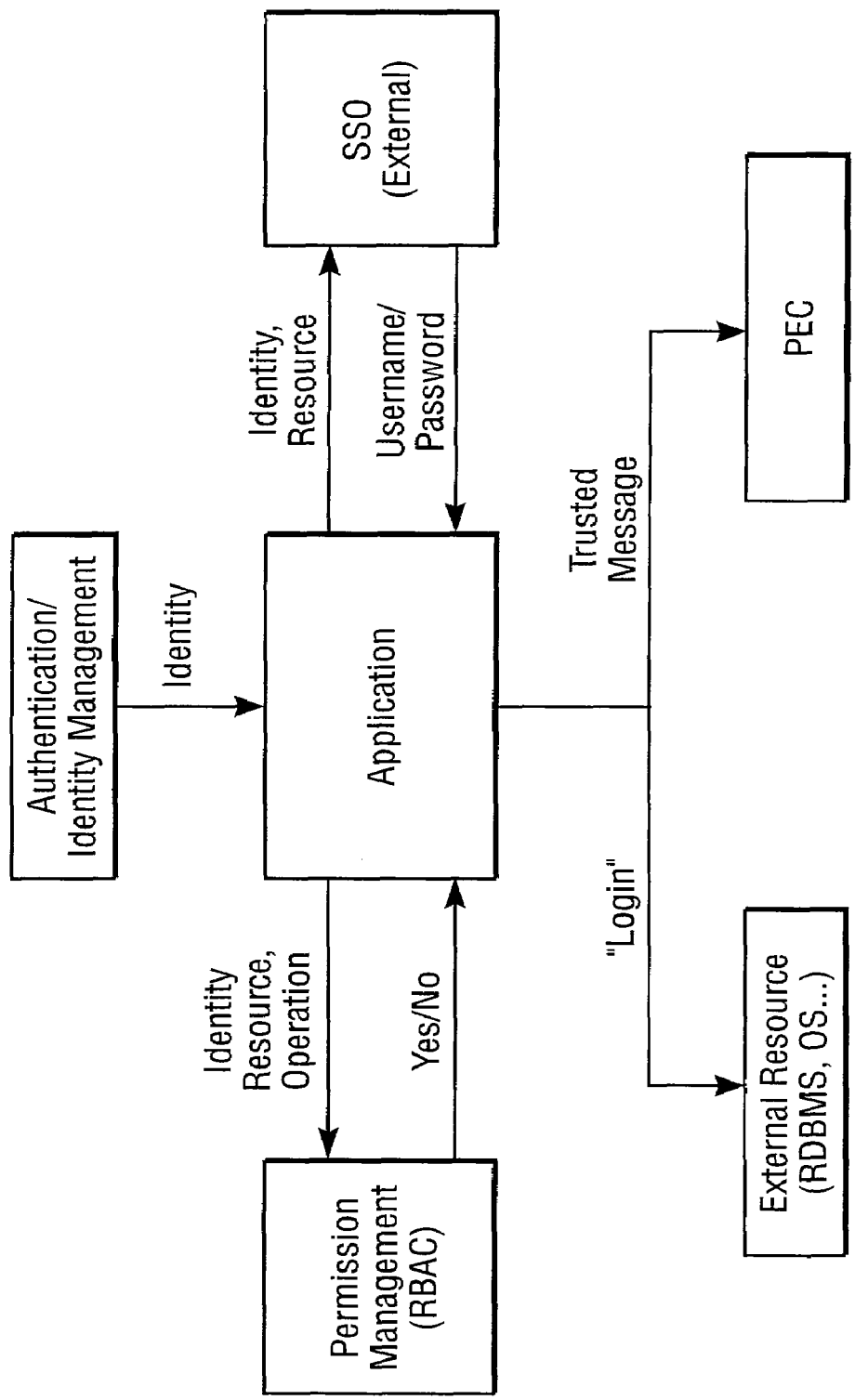
FIG. 9 is a block diagram of a Platinum Security Model illustrating user identification requirements of applications and point products.

In one embodiment, as illustrated in FIG. 9, the Platinum Security Model requires that many applications/point products be run as a specific user in order to succeed.

An AutoLogin API provides a way to run jobs as a specific operating system user without querying the user at run-time or hard-coding the UNIX user as part of the job.

To take advantage of this feature, an application may utilize an PtLESSetJobCommand( ) function and pass a username and role to LES. If the username and role are set to NULL, LES runs the job as the default platinum user (or other default user). Otherwise LES tries to retrieve the userid and password by calling the AutoLogin API and passing the username and role as Requested User and Requested Role, the operating system as Resource Type, and the job instance name as Resource Instance.

Entering Login Information in AutoLogin

In the AutoLogin embodiment, an administrator signs in as "root" to set up the LES/OS resources.

From the POEMS Director:
1. Select Tools⇒Security Admin⇒AutoLogin.
2. Log in as "root". If already logged in, "rtlogout.exe" may be utilized before running Administrator AutoLogin.
3. The AutoLogin Administration window displays.
4. Right-click on the Agent's Requesting User folder to invoke a pop-up menu display.
5. Select Add Entry.
6. The Add Entry window displays.
7. Enter login information in the fields.
   h) The Resource Type is set to OS.
   i) The Resource Instance is the same instance name that the point product passes to the job.

If the Point Product . . .
  Uses AutoLogin and a valid user ID and a password are recorded in the Add Entry window, the LES agent passes the ID and password strings and access is granted.
  Uses AutoLogin but no user information is recorded in the Add Entry window, the LES agent automatically checks for the UNIX user login. If the UNIX user is found, access is granted.
  Uses AutoLogin and an invalid user ID and password are recorded in the Add Entry window, the LES agent defaults to PLATINUM (or other default) user.
  Does not use AutoLogin, the LES agents defaults to the PLATINUM (or other default) user.

Command Line Interface

The command line interface included in LES performs administrative functions, including:
  Delete a job with all its runs.
  Cancel a job's run.
  List all jobs.
  List all jobs by product code, status, and/or node.
  Rerun a job immediately.

The command line interface utilizes the following format:
  ptlescmd [-a action] [-jobid] [-c cleanup_process] [-r run_number] [-p product_code] [-s status] [-b buffer-size] [-n node]

Note: The -a option is for all actions; the -j option is for all actions except List; the others are optional.

Ptlescmd is the LES command line interface used to delete a job, cancel a job run, list jobs (all jobs, by product code, by status, and/or node), and rerun a job immediately.

Table 1 provides a listing of the ptlescmd command line supported options.

TABLE 1

| Command Line Options and Arguments | If Omitted | Description |
| --- | --- | --- |
| -a [action] | Error | Executes a given action. Action can have any of the following values: delete, cancel, list, rerun |
| -j [jobid] | Error (except with "list" action) | The job ID of the job to be acted on. In one embodiment, this is a required option (except with List action). |
| -c [cleanup_process] | | The name of the process to be executed after deleting a job. If a delete action is specified and no cleanup process name is given, then no cleanup will take place on UNIX after deleting the job. On NT this option will check the registry for an existing cleanup process and execute it after deleting the job. |
| -r [run_number] | Error | In one embodiment, this number is required with Cancel action to define which run of the specified job will be generated. |
| -p [product_code] | | Used only when product code is specified with List action, a list of all the jobs with this specific product code will be generated. |
| -s [status] | | Used only when status is specified with List action, a list of all the jobs with this specific status will be generated. |
| -n [node] | | Used only when node is specified with List action, a list of all the jobs on this node will be generated. |
| -b [buffersize] | Default value is 1024 | This option is mainly needed when the user knows that the number of elements to be retrieved is large. (>100,000). The default value is 1024 (1K). |

To use the LES command line, a user types the following:
ptlescmd -a[action] -j [jobid] [-letter option_name] where:
  action is one of the following: delete, cancel, rerun, and list.
  jobid is the identifier used for the job.
  letter is the letter for one of the options listed in the Command Line Supported Options table.
  option_name is the name of one of the options listed in the Command Line Supported Options table.
  Table 2 provides a set of example command lines and a corresponding description.

TABLE 2

| Command Line | Description |
| --- | --- |
| ptlescmd -a delete 123 -c cleanup.exe | Deletes job 123 and all its runs then runs the process cleanup.exe |
| ptlescmd -a delete -j 134 | Deletes job 134 and all its runs |
| ptlescmd -a list | Lists all jobs |
| ptlescmd -a list -n dimultra | Lists all jobs on the node = 'dimultra' |

TABLE 2-continued

| Command Line | Description |
| --- | --- |
| ptlescmd -a list -p TSR | Lists all jobs with the product code = 'TSR' |
| ptlescmd -a list -s running | Lists all jobs and their running runs |
| ptlescmd -a list -p TSR -s completed | Lists all jobs of product code = 'TSR' and their completed runs |
| ptlescmd -a cancel -j 234 -r 3 | Cancels run 3 of job 234 |
| ptlescmd -a rerun -j 345 | Reruns job 345 immediately |

Note: Valid status values include: Completed, Failed, Notstarted, Preempted, Running and Stopped.

LES jobs stay in the central and local repositories until the user deletes them. The user can delete, rerun, or cancel a running job at any time by right-clicking on the Poems director/Job folder 185 and selecting the appropriate option. A delete option removes the job and all the runs and history of the job. The point product may provide a cleanup process executable that removes all the point product files related to the job. This executable, if available, is run by the agent before removing the job and job history.

LES provides job modification options including Rerun Job and Update Job. The Rerun Job option allows a user to rerun the job with a different start time. A PtLESUpdateJob( ) function allows updates for all GUI fields.

Context variables, such as %C(PLATHOME) or the environment variable %E(FUS_HOME) etc., which are resolved by the agent before running the job command.

The UNIX username is set from the GUI point product as part of the job. The agent does not need the password because the agent is running as root (the agent has the set_root_ID bit).

Context Variables

Context variables are keyword identifiers that may be used on the command line. The LES agent converts these variables according to the context of the current job and job parameters passed. The LES agent inserts these context variables, forms the command line, and then executes the command line.

Keyword Context Variable—Substitution takes place from the current job.
  Environment Variable—Substitution takes place from the environment where the agent is running.
  Filename Variable—The agent uses this variable as the filename and replaces it with the contents of the file pointed to by the variable.

How Context Variables are Specified:
  Keyword Context Variable:
  Specified as %C(context identifier is replaced by value)—e.g., my_prog %C(JOB_ID) %C(USERNAME) replaced with my_prog 1234 manager where the current Job jobid = 1234 and username = manager.
  Environment Variable:
  Specified as %E(variable name)—e.g., my_prog %E(HOME)%E(LANG), my_prog/home/platinum en-us.
  Filename Variable:
  Specified as %F(filename)—e.g., my_prog %F(/etc/platinum)%C(JOB_ID) %E(HOME)my_prog /home/dmc 1234 /home/platinum where the filename /etc/platinum contains the line /home/dmc.

Acceptable %C(Context Variable Name) Syntax Keywords:

The syntax for the variables is %C(KEYWORD). A user may insert a space on either side of the KEYWORD inside the parentheses. Table 3 provides a listing of sample keyword identifiers.

TABLE 3

| /* Identifier | Value | Description */ |
|---|---|---|
| /* JOB_ID-Env | _JobRecord.joid | Job ID */ |
| /* GROUP_ID-Env | _JobRecord.groupid | Group */ |
| /* HOSTNAME | _JobRecord.node | Hostname */ |
| /* INSTANCE-Env | _JobRecord.instance | Instance name */ |
| /* USERNAME | _JobRecord.username | User name */ |
| /* OWNER | _JobRecord.owner | Owner */ |
| /* PASSWORD-Env | _JobRecord.password | Password */ |
| /* CONNECT_STR | _JobRecord.connectstring | ConnectStrin */ |
| /* JOB_OWNER | _JobRecord.jobowner | JobOwner */ |
| /* OBJECT | _JobRecord.object | Object name */ |
| /* PRODUCT CODE | _JobRecord.productcode | Product Code */ |
| /* PRODUCT VERSION | _JobRecord.productversion | Product Version */ |
| /* DESCRIPTION | _JobRecord.description | Description */ |
| /* EMAIL_ADDR | _JobRecord.notificationemail | E mail Address */ |
| /* TYPE | _JobRecord.type | Type */ |
| /* C_SCRIPT | _JobRecord.completionscript | Completion script */ |
| /* F_SCRIPT | _JobRecord.failedscript | Failed script */ |
| /* PLATHOME | _Installation directory | Install dir */ |
| /* USERROLE-Env | _JobRecord.userrole | User role */ |

GUI API

The GUI API is utilized by the point product 100 and the point product GUI 110 for a number of functions, including:

Allocate a job with the Job Scheduling API and override any default values as desired.

Base a GUI on class CptDynPropertySheet (which is derived from CpropertySheet), instead of using CpropertySheet directly. CptDynPropertySheet is exported by DnyPS.DLL In addition, the GUI API may be used to submit a job without ever displaying the GUI window.

Figure 25:
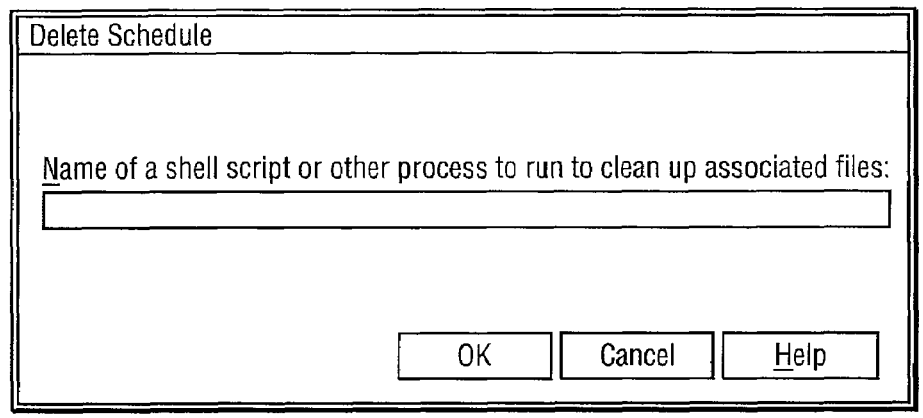
FIG. 25 is an illustration of a Delete Schedule window having a prompt for identifying a clean-up script upon deletion of a schedule.

Use the GUI API to construct a CptLESJobSchedulingPage (see FIG. 25, for example) object based on the job, and then add it (and any other pages) to the CptDynPropertySheet or CpropertySheet-derived property sheet.

Use the GUI API to customize any job parameters that are displayed on the scheduling property page.

Use the Job Scheduling API to set any required job parameters that cannot be set by controls on the scheduling property page. Examples of these include point product-specific job parameters set by calling PtLESSetJobParm.

When a final OK indicates that the job should be submitted, use the GUI API to validate the data and submit the job.

Products that use the LES Job Scheduling page as a tab call its ValidateData( ) method before submitting the job. ValidateData( ) can be safely called multiple times and can be called in such a way that no message box appears to the user.

Table 4 provides sample code for invoking the GUI API to implement to the above discussed processes.

TABLE 4

| Step | Sample Code |
|---|---|
| Allocate a job and override defaults | PtLESJobHandle job = PtLESJobAlloc();<br>PtLESSetJobTZNode (job, PTLES_TZLOCAL); |
| Setup property sheet and pages | CpropertySheet sheet;<br>CptLESJobSchedulingPage LESpage<br>(CptLESJobSchedulingPage::AsPage, job);<br>Sheet.AddPage (LESpage); |
| Set product job info | PtLESSetJobParam (job, key, value); |
| Customize the page's data | LESpage SetRunWhen (CPtLESJobSchedulingPage::RunImmediately);<br>LESpage.SetRunWhenState (CPtLESJobSchedulingPage::Disable); |
| When the sheet exits, validate the data, and submit the job | In the sheet's OK handler:<br>if (LESpage.ValidateData())<br>sheet.m_LESPage-<br>>SubmitJob("nodename", groupID, TRUE). |

Job Distribution APT

The job distribution API dispatches information to appropriate machines (LES workstations), typically called by the job data management API 140.

Job Scheduling API

The job scheduling API 130 works with the point product GUI to define submitted jobs. Some of the functions available via the job scheduling API are required, some are optional, and some are internal functions that can be set by the user through the LES GUI. A value is set for baseline functions and any desired optional functions or functions that are defined by the GUI (defined as appropriate for a corresponding point product).

The following tables list functions by type and provide a brief description of each function. The baseline functions are utilized to provide basic information for the job scheduling processes, and are listed with a description in Table 5.

TABLE 5

Baseline Functions

| Function | Description |
|---|---|
| User Name | User name under which to run the job. In one embodiment, the scheduler must be run as root in order to use this function. If it is run as root and the User Name field is null, the scheduler will automatically mark the job as failed. |
| Node | Indexed on central table. Specifies the node used to run this job. |
| Command | The command line to execute. Because of database VARCHAR size limitations, this may be split into 2 pieces by the API and reassembled to invoke. |
| Product Code | Code identifier of the product used to create the job. This should be the code assigned and used by the PLATINUM PAR tracking system. |
| Product Version | Version number of the product used to create the job. |

The optional functions, listed and described in Table 6, are not required and are utilized (defined) as appropriate for a specific point product.

TABLE 6

Optional Functions

| Function | Description |
| --- | --- |
| GroupID | Strategy group ID<br>Use the function PtLESCreateGroup to get the GroupId. |
| ReTryInterval | After a preempted run, this is the number of minutes to wait before attempting to rerun the job. If zero, the job will not be rerun after being preempted.<br>A preempted run is a job that did not run because the point product determined that it should not run due to point product specific operating rules. |
| RetryCount | Number of retry attempts to make if the job was preempted or was unable to start. If zero, the job will, not be rerun after preemption or start failure. This does not control reruns after a point product failure. |
| N_retrys (RecurFailThreshold) | Number of failed (point product) runs to accept before the job is no longer rescheduled. This value is moved to "RecurFailureCount" upon job creation and every time the job runs successfully. This field helps control runaway job rescheduling for jobs that never run correctly.<br>See "RecurFailureCount" for more information. |
| RecurFailCount | This function counts job failure for a given number of successive runs. It is decremented each time the job fails and reset to its original value (RecurFailureThreshold) each time a job is successful. If the value ever gets to zero, the job will not be rescheduled. |
| Instance | Database instance to run against.<br>Optional for database-related point products. |
| Owner | Optional user ID for point product use (For RDBMS product, this would be the owner.) |
| Cred_value | Optional user password.<br>Encrypted/decrypted by API set and get. |
| ConnectString | Optional database connect string or name. |
| JobOwner | For future use related to security (Only the owner of the job can make changes.) |
| Object | Optional object name for point product use. |

Table 7 lists internal functions that may be set by a user via the LES GUI.

TABLE 7

GUI Functions

| Function | Description |
| --- | --- |
| JobId | Unique job ID. Each unique ID is generated on the central control server. The IDs are unique within the nodes managed by that central server.<br>Use the function PtLESSubmitJob to set the JobID. The JobID cannot be zero. |
| Next_Start | Indexed on local node. This is the next time, in GMT, to run this job. Time_t timestamp is set using the calendar and recurrence information the next time the job is started. If = −1, this job is to be run immediately. |
| TimeZone | 1 = Use time zone of the node where the job will run.<br>2 = Use time zone of the node from which the job is scheduled (local workstation's time zone)<br>This value from Window's time zone convention should be converted to whatever time zone convention LES uses. This function is used to convert the time to GMT. The API will retrieve the time zone's offset from GMT and adjust the time to GMT. |
| WSTimeZone | Time zone of the workstation from which this job is scheduled. This is used by the scheduler to adjust the time if TimeZoneNode = 2. |
| NotificationEmail | Email address where job completion notification will be sent. |
| CompletionScript | Script to run upon successful completion. |
| FailedScript | Script to run upon failure. |
| Description | Optional job description. |
| CalendarId | ID of the calendar to use. |
| RecurInterval | This is used to test if the job fails for a given number of successive runs. It is decremented each time the job fails and is reset to its original value (RecurFailureThreshold) each time a job is successful. When the value equals zero, the job will not be rescheduled. |
| RecurIncrement | How often to run the job, depending on recurrence interval; "Every x minutes, every x days, every x months, etc." |
| EveryWeekday | This flag states to run every day of the week (RecurInterval = Daily). If this is set and RecurInterval = Daily, RecurIncrement is ignored. |
| Days_of_Week (DayOfWeekFlags) | Zero padded array. Flags to indicate which day or days of the week to run the job(0 = Sunday, 6 = Saturday) (RecurInterval = weekly) |
| DayOfMonthFlags | Zero padded array. Flag to indicate which day or days of the month to run the job (1 to 31) (RecurInterval = Monthly) |
| LastDayOfMonth | If true, run on the last day of the month(s) (RecurInterval = Monthly or Yearly). The job will run on the last day of the month regardless of which actual day the end of the month falls on (28, 29, 30, or 31). Can be used with or without the DayOfMonthFlags. If set, this takes precedence over the DayOfMonthFlags (i.e., the job flag for November 30 is off and this is on, the job will run on November 30). |
| YearMonth | Month to run (1-12) for yearly interval (RecurInterval = Yearly) |
| TimeOfDayHour | Hour of day (0-23) to run |
| TimeOfDayMinute | Minute of hour (0-59) to run |
| Start_Times | Minutes after each hour flags. Zero-padded flags - one for each minute of the hour. This is used to emulate Autosys' run at x minutes after each hour behavior. Each flag, when on, signifies the job should run at that minute after EVERY hour after the first run which is determined by next_start. |

Table 8 provides example code for on how the GUI API 115 would be utilized by a point product. For example, allocating a job structure requires a point product to define a handle (jh), an array defining the days the job is to run (0=don't run, 1=run; ie, 0, 0, 0, 0, 0, 1, 0 means run on Friday), a userid and password, and a call to the PtLES-JobAlloc( ) function.

TABLE 8

| Step | Sample Code | Comment |
|------|-------------|---------|
| Allocate a job structure | PtLESJobHandle jh;<br>int days_to_run[ ] = {0,0,0,0,0,1,0};<br>char userid[20], password [20];<br>jh = PtLESJobAlloc ( ); | run on Friday |
| Set parameters for the job | PtLESSetJobDescription (jh, "smith", "TablespaceReorg", "Weekly run");<br>PtLESSetJobCommand (jh, "reorg.exe");<br>PtLESSetJobProdInfo (jh, "Tsreorg", "2.07")<br>PtLESSetJobInstanceInfo (jh, "ora73", userid, password, "payrl.world");<br>PtLESSetJobObject (jh,"payroll");<br>PtLESSetJobRetry(jh, 10, 6);<br>PtLESSetJobTZNode (jh,PTLES_TZLOCAL); PtLESSetJobRunRules (jh, PTLES_RECURWEEKS, 1, 0 days_to_run, NULL, NULL 0, 0, 0, 22, 0); | Retry every 10 min for an hour every week at 10 pm |
| Submit the job on two nodes | PtLESSubmitJob (jh,"dimultra",101,0);<br>PtLESSubmitJob (jh,"dimsparc",101,1) | node dimultra node dimsparc |
| Clean up | PtLESJobDealloc (jh) | |

Calendaring API

The calendaring API is utilized internally by other APIs and provides comprehensive calendaring functions. For example, main use of the Calendaring API is to allow users to input calendaring information for a specific job run.

Job Administration API

As discussed above, the job administration API 150 deletes, cancels, reruns, or copies existing jobs. In addition, it allows other APIs to determine job status, and setup, cancel, or update a job logfile and retrieve job parameters. For example, one process within the Job Administration API is the PtLESCancelJob utilized to stop currently running jobs. The PtLESCancelJob first performs a check on a specified node to see if the job is running, and issues a stop command to the corresponding LES agent if the job is executing.

Job Data Management API

Both the job and the job history are saved in the central repository and the local repository of the node where the job is to be run. Open Database Connectivity (ODBC) is used to select, insert, update, and/or delete each job or job history.

Point Product API

The Point Product API allows the point product to communicate with the LES Agent. When you use this API, the LES job folder shows more accurate information about your job, the logfile viewer shows the job logfile, and the LES agent manages your point product job, making LES easier to use from a development standpoint.

The functions of this API encapsulate PEC messages to the LES agent to update the job status or logfile, or signal the end of a running job process. The PEC model is adhered to wherein the LES agent and the point product are Rtclients using broadcast communication. PEC Initialization has been performed before calling any of the LES_API functions. In addition, the Point Product should call TptTerm before exiting.

In one embodiment, SIGUSR2 is used as a CANCEL notification signal on all UNIX platforms, and the LES agent ignores this signal by default. Because the child process inherits all signals, the CANCEL event is ignored unless the point product takes action. As a result, conflicts may arise if a user application is using SIGUSR2 for other purposes (but allows for utiliation of standard UNIX toolsets for operations).

The following Environment variables are set before running any point product by the LES Agent:

LES_JOBID→The point product current job number

LES_RUN_NUM→The Point product current run number

LES_GROUPID→The point product current strategy group number

LES_RUNTIME→The schedule time(If −1, the job was scheduled to run immediately.)

LES_INSTANCE→The job instance

LES_USERNAME→The job user name

LES_USERROLE→The job user role

Error messages are displayed whenever the agent detects an error. Table 9 lists the errors, consisting of a number and a message. Some of the messages use variables, which appear as % signs in the message text as shown in the following example. These variables are replaced by actual values when the error message displays. For example, in this case the variable % is replaced with the actual constraint and file name when the error message is displayed.

TABLE 9

| | |
|---|---|
| PTLES_AGENT-0001 | Agent is already running |
| PTLES_AGENT-0002 | Cannot get the current node name |
| PTLES_AGENT-0003 | Cannot open process table file |
| PTLES_AGENT-0004 | Cannot write to process table |
| PTLES_AGENT-0005 | Cannot read from process table |
| PTLES_AGENT-0006 | Cannot allocate enough memory for the job handle |
| PTLES_AGENT-0007 | Unable to free the job handle memory |
| PTLES_AGENT-0008 | Unable to find the job attached to this process id (% d) |
| PTLES_AGENT-0009 | Unable to read job parameters |
| PTLES_AGENT-0010 | Cannot allocate enough memory for the calendar handle |
| PTLES_AGENT-0013 | Cannot create a PEC message (TipcMtCreate failed % d) |
| PTLES_AGENT-0014 | Unable to find and cancel the job with job_id = % d and run number = % d |
| PTLES_AGENT-0015 | The following is not a valid job, cannot cancel this job. (job_id = % d, run number = % d) |
| PTLES_AGENT-0016 | Cannot cancel the following job (job_id = % d, run number = % d) system error = % d |
| PTLES_AGENT-0018 | Cannot execute job process – job_id = % d and system error is: % d |
| PTLES_AGENT-0020 | Cannot execute job process – job_id = % d, the user (% s) doesn't exist |
| PTLES_AGENT-0021 | Cannot delete the job – job_id = % d, error = % d |
| PTLES_AGENT-0023 | PEC Callback create failed. (pec_error = % d) |
| PTLES_AGENT-0024 | Cannot insert the job (job_id = % d) into the Local repository error = % d |
| PTLES_AGENT-0025 | Cannot insert a job history, job_id = % d, error = % d, Agent initialization . . . Checking the expired jobs: % s |
| PTLES_AGENT-0027 | Cannot connect to the central repository. (ODBC-Error = % d) |
| PTLES_AGENT-0028 | Cannot connect to the local repository. (ODBC-Error = % d) |
| PTLES_AGENT-0029 | Calendar insertion error(ODBC-Error = % d) |
| PTLES_AGENT-0030 | Cannot update job (% d) (ODBC-Error = % d) |
| PTLES_AGENT-45 | The agent is not running |

Table 10 provides example source code for a point product job template and may be considered an example use of the point product API 120. However, the code presented is not intended to be either a compilable or executable version of the present invention or a complete embodiment thereof, but merely an example representation of some of the features discussed herein.

TABLE 10

```
/* Platinum Technology Inc
 * Copyright (C) 1997 Platinum technology Dimeric Lab
 * All Rights Reserved.
 * PLATINUM Lightweight Enterprise Scheduler example program
 * using the LBS Point Product API referred to LBS_API
 * Function source code.
 */
/* Point Product job template and use of the Point Product API */
/* system includes */
#include <stdio.h>
#include <stdlib.h>
/* pec include files */
#include <rtworks/ipc.h>
#include <ptm/ptm.h>
/* LES_API include files */
#include "ptles_size.h"
#include "ptles_ppapi.h"
/* edit keys here */
/* for example purposes the num of keys allowed is limited to 10
*/
#define MAX_KEYS 10
static char keys[MAX_KEYS] [KEY_L+1]=
{
"key 1", /* e.g replace key 1 with your key value */
"key 2",
"key 3",
"key 4",
};
#define MY_STATUS_RUNNING    1
#define MY_STATUS_COMPLETE   2
#define MY_STATUS_ABORT      3
#define MY_STATUS_CANCELED   4
FILE *fplog;
/*
** If user want to cancel this job
** switch to the following function
*/
void
cancel_this_job( sig )
int sig,
{
    fprintf(fplog,"Update Job Status to STATUS_CANCELED \n");
    if ( PtLESUpdateJobStatus ( MY_STATUS_
    CANCELED) ==LESAPI_FAIL
)
    {
      fprintf(fplog,"PtLESUpdateJobStatus: Error % d\n");
    }
    fprintf(fplog,"Point Product example : Job canceled by user
request\n");
    PtLESUpdateExitStatus(PP_FAILED);
    TptTerm();
    fclose(fplog);
    exit(1);
}
/* example program demonstrates how a point product */
/* can use the LES_API to communicate with the LES Agent*/
int main( argc,argv )
int argc;
char **argv;
{
int rc;                /* used for error return */
char pvalue[DATA_L+1];   /* allocation to hold value of a key-
value pair*/
int plan;              /* length of value */
int i;                     /* used as a counter */
int num_items;         /* num of key-value pairs rec */
char *plat_home;
char log_path[PATH_L+1];
char *les_jobid , *job_id;
char *les_groupid;
char *les_runtime;
char *les_run_number;
#if defined(DEBUG) && defined(WIN32)
  DebugBreak ();
```

TABLE 10-continued

```
#endif
  job_id = getenv("LES_JOBID");
  plat_home = getenv("PLATHOME");
  if( plat_home != NULL && job_id != NULL )
sprintf(log_path,"%s/les/files/logdir/pplogfile_%s.log",
plat_home, job_id);
  else
    strcpy(log_path,"pplogfile.log");
  fplog = fopen( log_path, "w");
  if( fplog == NULL)
    fplog = stderr;
  fprintf(fplog,". . . Point product example. . .
. . . \n");
  les_jobid = getenv("LES_JOBID");
  les_groupid = getenv("LES_GROUPID");
  lee_runtime = getenv("LES_RUNTIME");
  /*
  ** LES V1.1.0 New Env.
  */
  les_run_number = getenv("LES_RUN_NUMBER");
  fprintf(fplog,"ENV. VARIABLE SETUP BY PTLES_AGENT : \n");
  if( les_jobid != NULL )
  {
    PtLESSetJobId(atoi(les_jobid));
    fprintf(fplog,". . . LES_JOBID = %s \n", les_jobid);
  }
  if( les_groupid != NULL )
  {
    fprintf(fplog,". . . LES_GROUPID  =  %s  \n",
les_groupid);
  }
  if( les_runtime != NULL )
    fprintf(fplog,". . . LES_RUNTIME  =  %s  \n",
les_runtime);
  if( les_run_number != NULL
    fprintf(fplog,". . . LES_RUN_NUMBER  =  %s \n",
les_run number);
  /* print our any argumente paeeed on the command line */
  fprintf(fplog,"Command line argument : \n");
  for ( i=1;i < argc;i++)
  {
    fprintf(fplog,"Argument[%d]: %s\n",i,argv[i]);
  }
  /* To uee the LES_API you always have to call the PEC
TptInit function*/
  /* to make a connection to the RtServer in main program */
  TptInit(PPROD_API,"V1.1.0");
  /* LES V1.1.0 adapt. Add CANCEL Function */
  PtLESSetJobCancel( &cancel_this_job );
  fprintf(fplog,"Update logfile name : %s \n", log_path);
  /* Communicate the Point Products Logfile to LES Agent */
  if ( PtLESUpdateLogFileName (log_path)==LESAPI_FAIL )
  {
    fprintf (fplog,"PtLESUpdateLogFileName: Error %d\n");
  }
  /* Update the Point Product Statue to Running */
  /* use this function to update status       */
  fprintf(fplog,"Update Job Status to STATUS_RUNNING \n");
  if ( PtLESUpdateJobStatus ( MY_STATUS_
  RUNNING)==LESAPI_FAIL
}
  {
    fprintf(fplog,"PtLESUpdateJobStatus: Error %d\n);
  }
  /* The following function call performs the initial
communication */
  /* with the LES AGENT            */
  /* Used to retrieve the point product parms that may be
needed to */
  /* be passed
  */
  /* stored internally is the jobid and run number
  */
  fflush(fplog);
  fprintf(fplog,"Get Point product Parameters: \n");
  rc=PtLESGetProductParms( 360 /* TIMEOUT */ );
  if ( rc == LESAPI_FAIL )
  {
    fprintf(fplog,"PtLESGetProductParms: Error %d\n",
```

TABLE 10-continued

```
    PtLESGetErrno ();
    /* Another call to communicate the progress of a job
*/
    /* to the LES AGENT         */
    fprintf(fplog,"pp_example:Update the STATUS to
MY_STATUS_ABORT = %d \n", MY_STATUS_ABORT);
    if ( PtLESUpdateJobStatus (
MY_STATUS_ABORT) ==LESAPI_FAIL )
    {
        fprintf(fplog,"PtLESUpdateJobStatus: Error
%d\n");
    }
    /* Communicate exit status of point product */
    /* pre defined to PP_SUCCESS,PP_FAILED,PP_PREMPTED */
    fprintf(fplog,"pp_example : Update the exit status =
%d \n", PP_FAILED);
    PtLESUpdateExitStatus(PP_FAILED);
    PtLESDestroyParms();
    TptTerm();
    fclose(fplog);
    exit(1);
}
/* edit the keys static char string defined before the main
 * to add point product keys
 */
/* return the no of key value pairs */
num_items=PtLESGetNumParms();
if( num_items==LESAPI_FAIL )
{
    fprintf(fplog,"PtLESGetNumParms: % d\n",
        PtLESGetErrno ());
}
fprintf(fplog,"No. Parameters received:% d\n",num_items);
num_items=num_items<MAX_KEYS?num_items:MAX_KEYS;
fprintf(fplog,"No. Parameters received:% d\n",num_items);
    /* retrieve an print the key value pairs */
    for(i=0; i <num_items; i++)
    {
        /* get the length of value in the key-value pair */
        plen= PtLESGetParameterLen(keys [i]);
        if( plen > 0 )
        {
            /* Function used to retrieve the value given*/
            /* a key for the parameter */
            if (PtLESGetParameter(keys [i],pvalue,plen) ==
LESAPI_FAIL)
                fprintf(fplog,"PtLESGetParameter: % d\n,
                    PtLESGetErrno ());
            else /* print out the key-value pair   */
                fprintf(fplog,
                    "\tParameter[%d]: key=%s      Value=%s
len=% d\n,
                    i,keys[i],pvalue,plen);
        }
    }
    /* print out the job Id and the Run Number received */
    fprintf(fplog,"Received Job Id: %Id\n",PtLESGetJobId());
    fprintf(fplog,"Received Job Run
Number:%Id\n",PtLESGetJobRunNum());
    /* Another call to communicate the progress of a job */
    /* to the LES AGENT         */
    fprintf(fplog,"Update Job Status to STATUS_COMPLETED \n");
    if ( PtLESUpdateJobStatus ( MY_STATUS_
    COMPLETE) ==LESAPI_FAIL
)
    {
        fprintf(fplog,"PtLESUpdateJobStatus: Error %d\n");
    }
    /* Before terminating call PtLESExitStatus */
    /* Communicate exit status of point product */
    /* pre defined to PP_SUCCESS,PP_FAILED,PP_PREMPTED */
    /* free the internal structures allocated by LES_API*/
    fprintf(fplog,"Send END_OF_JOB with STATUS SUCCESS to
PTLES_AGENT \n");
    PtLESUpdateExitStatus(PP_SUCCESS);
    PtLESDestroyParms();
    /* terminate connection to RTServer */
    TptTerm();
    fclose(fplog);
```

TABLE 10-continued

```
    return (0);
}/* eof of main */
```

Scheduling Via POEMS

Figure 10:
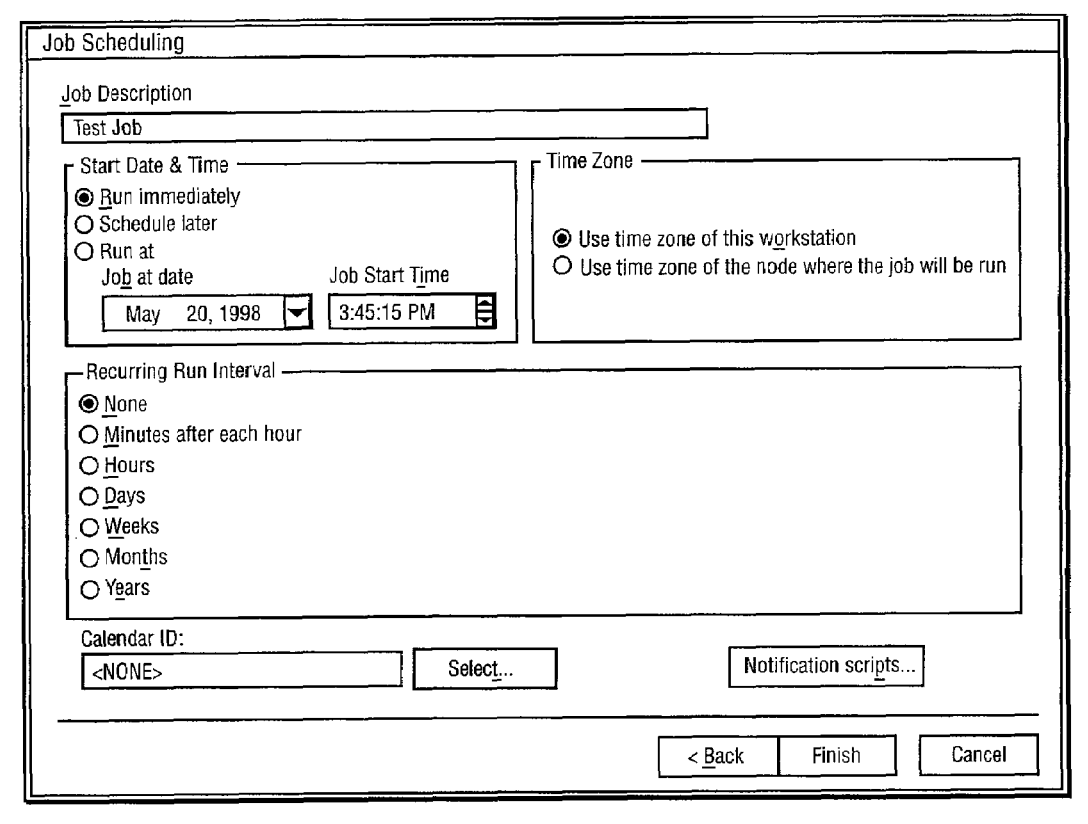
Figure 11:
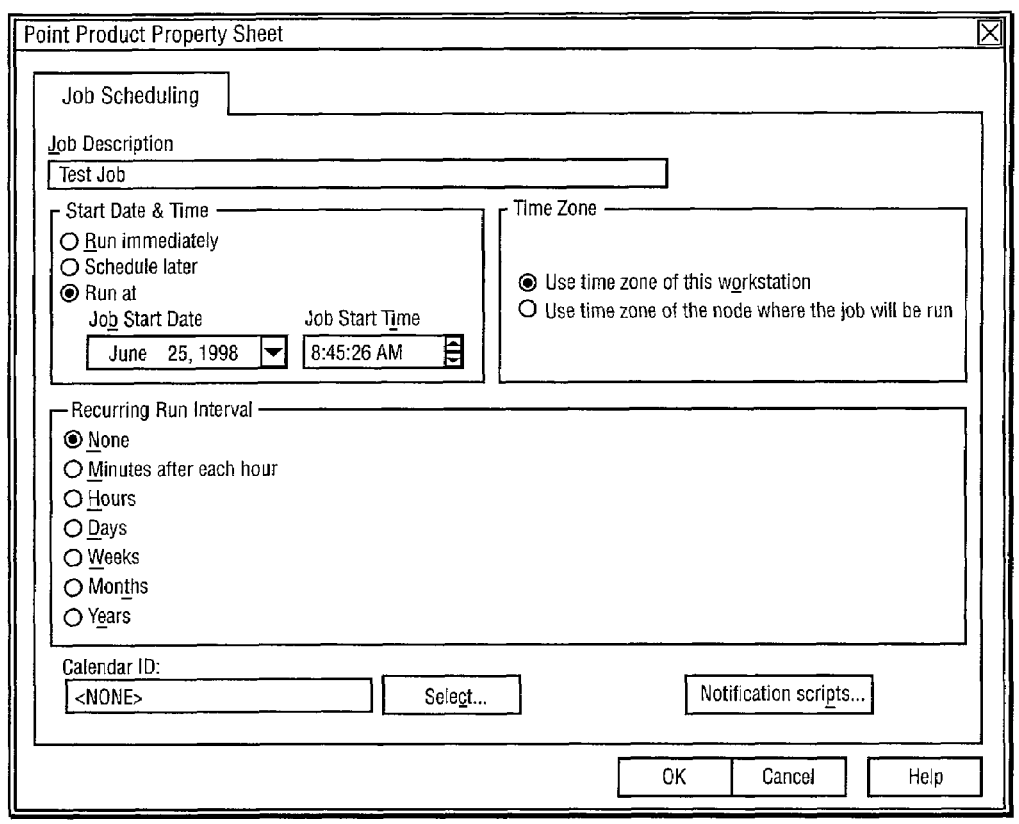
FIG. 11 is an illustration of a Point Product Property sheet.

The present invention has been implemented utilizing a GUI interface that includes either a window (POEMS Scheduling Service Job Scheduling Window, FIG. 10) or a property page (Job Scheduling tab property page, FIG. 11). Other embodiments or arrangements of GUI windows or pages are also applicable, for example, using pull down selection menus instead of radio buttons, as just one example).

The GUI interface allows user input for scheduling specifications for a job to be submitted, including:
Immediate job run.
Job run at a later time.
Starting time and date of the job.
Recurring run intervals for the job.
Create or select a scheduling calendar.

In addition, the GUI interface allows a user define or modify a notification script.

To start a job, a user enters a job description in the Job Description box, selects a run time as either immediate, a later time, or start date and time, and then Clicks on OK or Finish.

Figure 12:
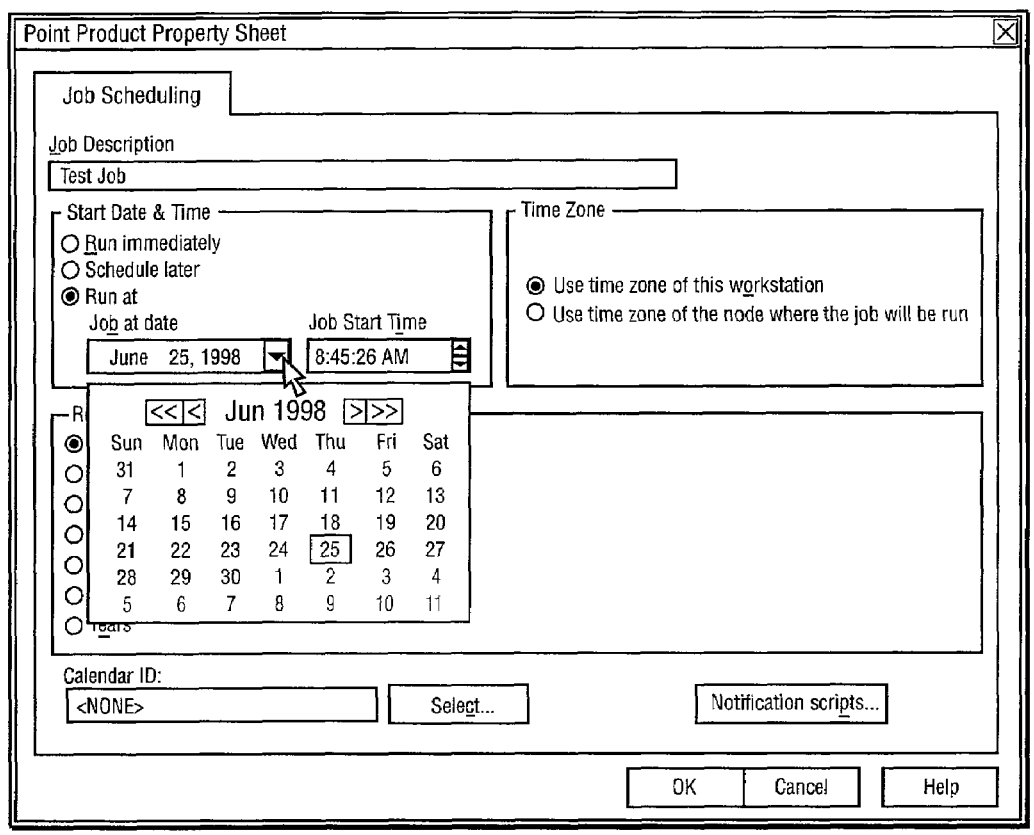
FIG. 12 is an illustration of a pull-down calendar on a Point Product Property sheet.

POEMS has several features for providing the appropriate start date and time. For example, as shown in FIG. 12 a pull down calendar is provided for date selection. The pull down calendar includes advance and decrease buttons as follows:
Select the >> button to advance the year by one.
Select the << button to decrease the year by one.
Select the > button to advance to the next month.
Select the < button to move back to the previous month.

Since the POEMS scheduling service schedules jobs at remote nodes, a selection box is provided to use the local time of the remote node as the starting time (instead of the submitting node).

Recurring job runs may be set for a wide array of intervals, including:
None—Used to schedule no recurring runs for the job.
Minutes after each hour—Used to schedule recurring runs for a job each hour at a specified number of minutes after the hour.
Hours—Used to schedule recurring runs for a job at specified hourly intervals.
Days—Used to schedule recurring runs for a job at intervals specified in days or every weekday.
Weeks—Used to schedule recurring runs for a job at intervals specified in weeks on the selected day or days.
Months—Used to schedule recurring runs for a job at intervals specified in months on the selected day or days.
Years—Used to schedule recurring runs for a job every year on the specified dates.

Figure 13:
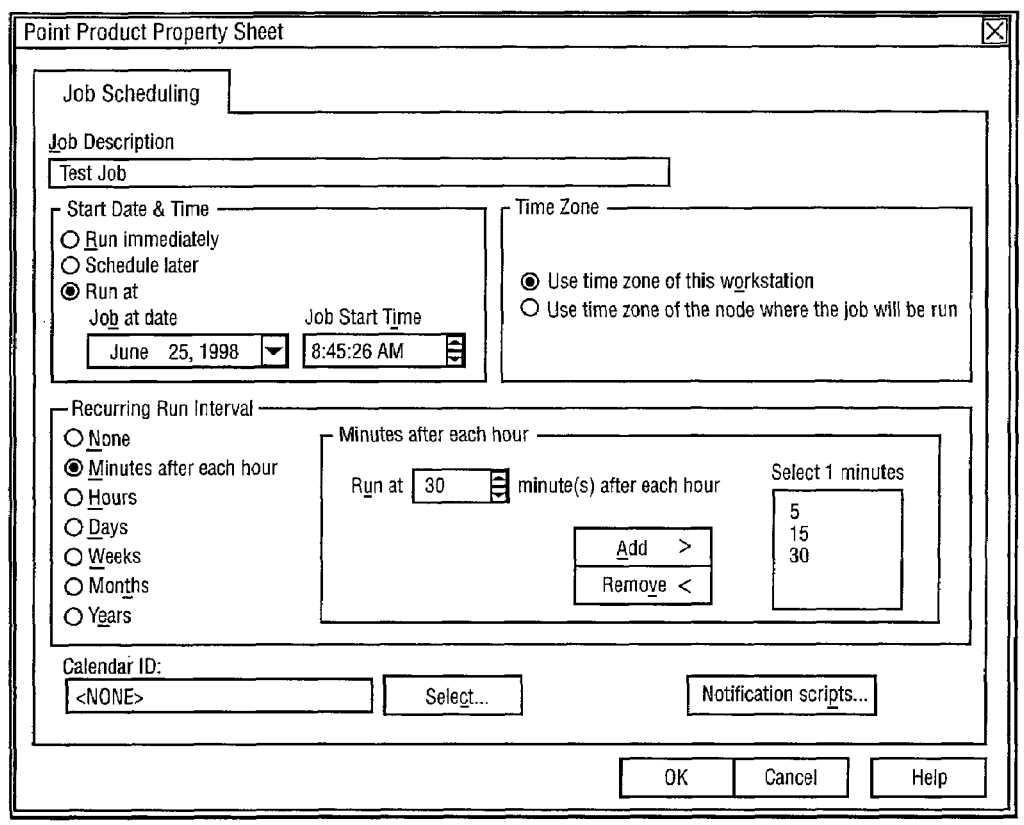
FIG. 13 is an illustration of an example job scheduled to run via the Point Product Property sheet.
Figure 14:
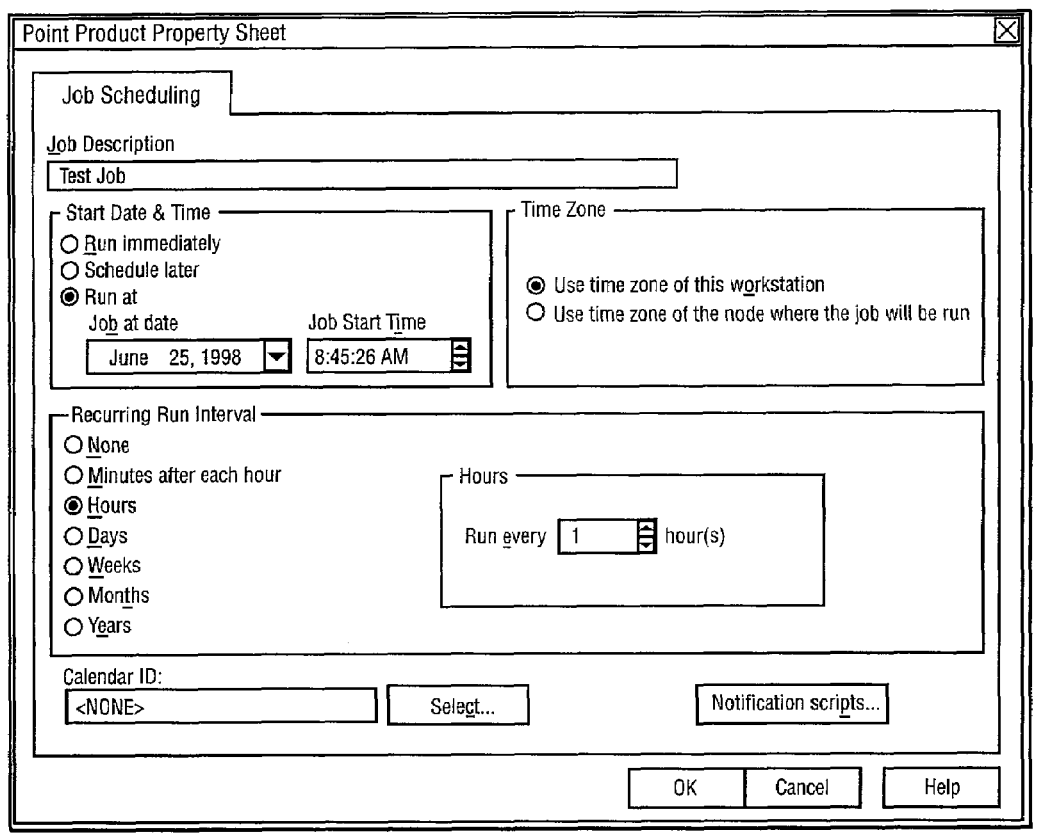
FIG. 14 is an illustration of a second example of a job scheduled to run via the Point Product Property sheet.
Figure 15:
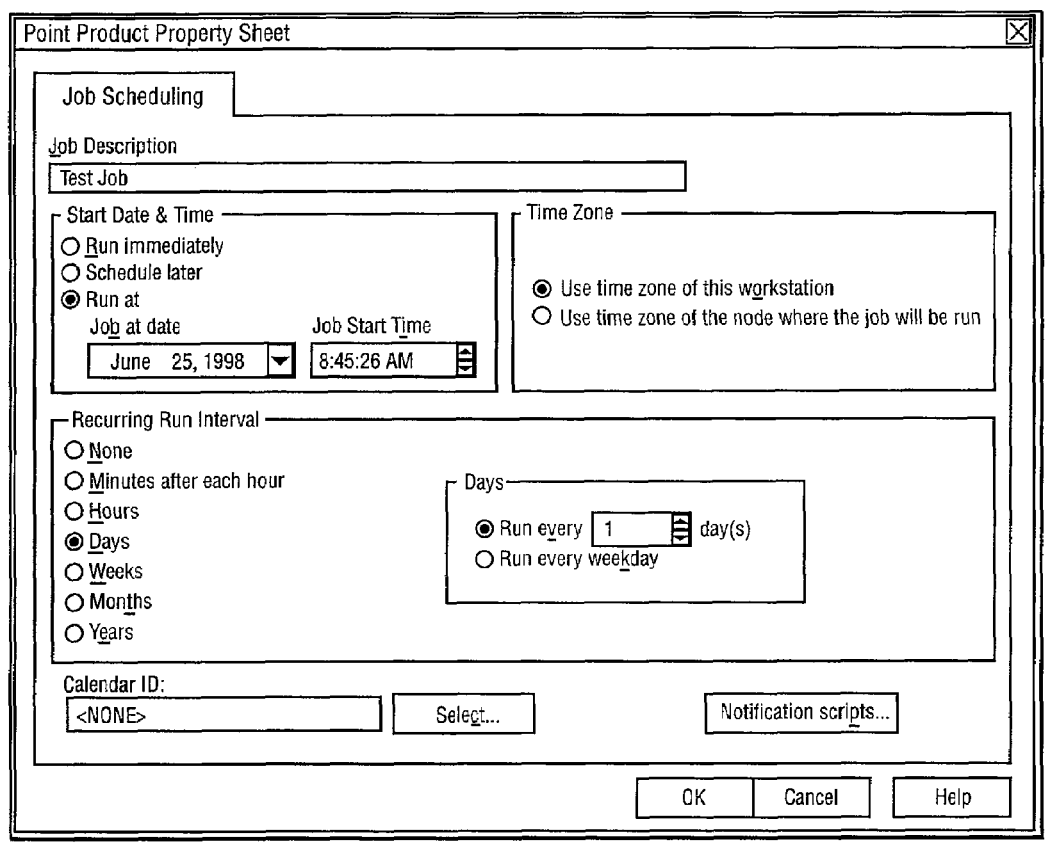
FIG. 15 is an illustration providing an example of a job scheduled to run every day.
Figure 16:
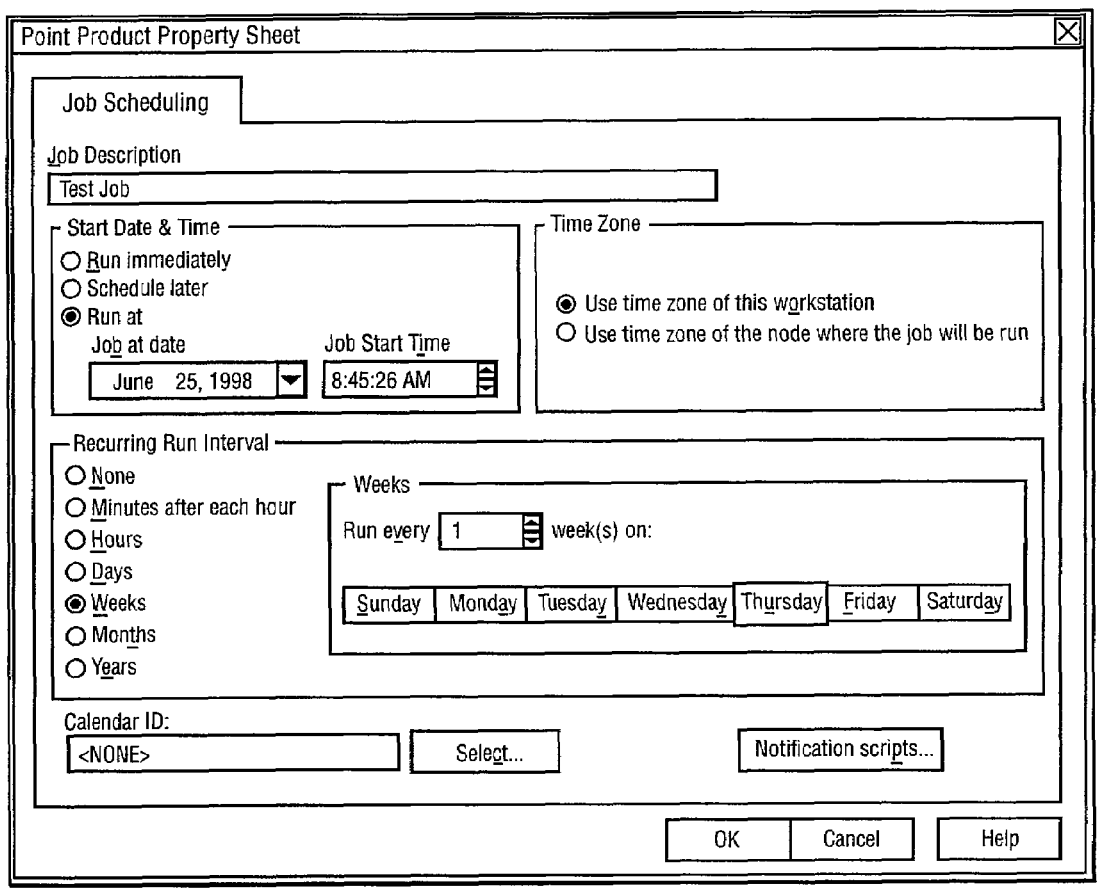
FIG. 16 is an illustration that provides an example of a job scheduled to run every week on a specific day.
Figure 17:
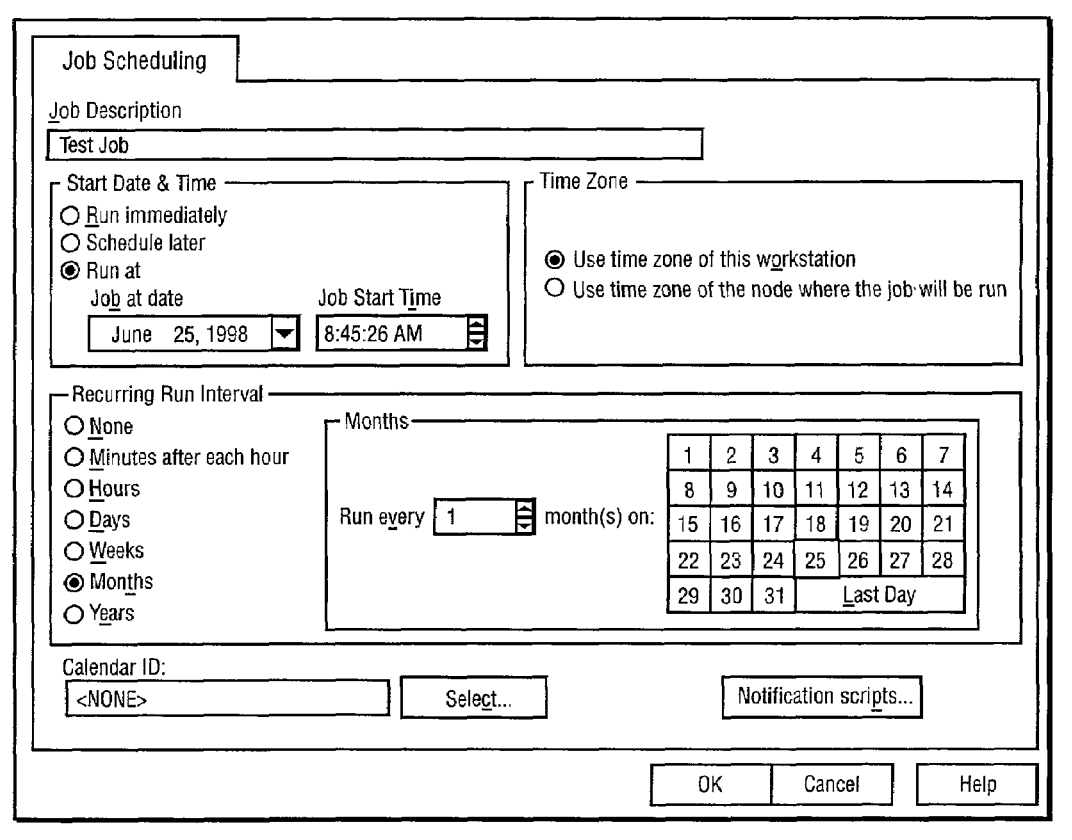
Figure 18:
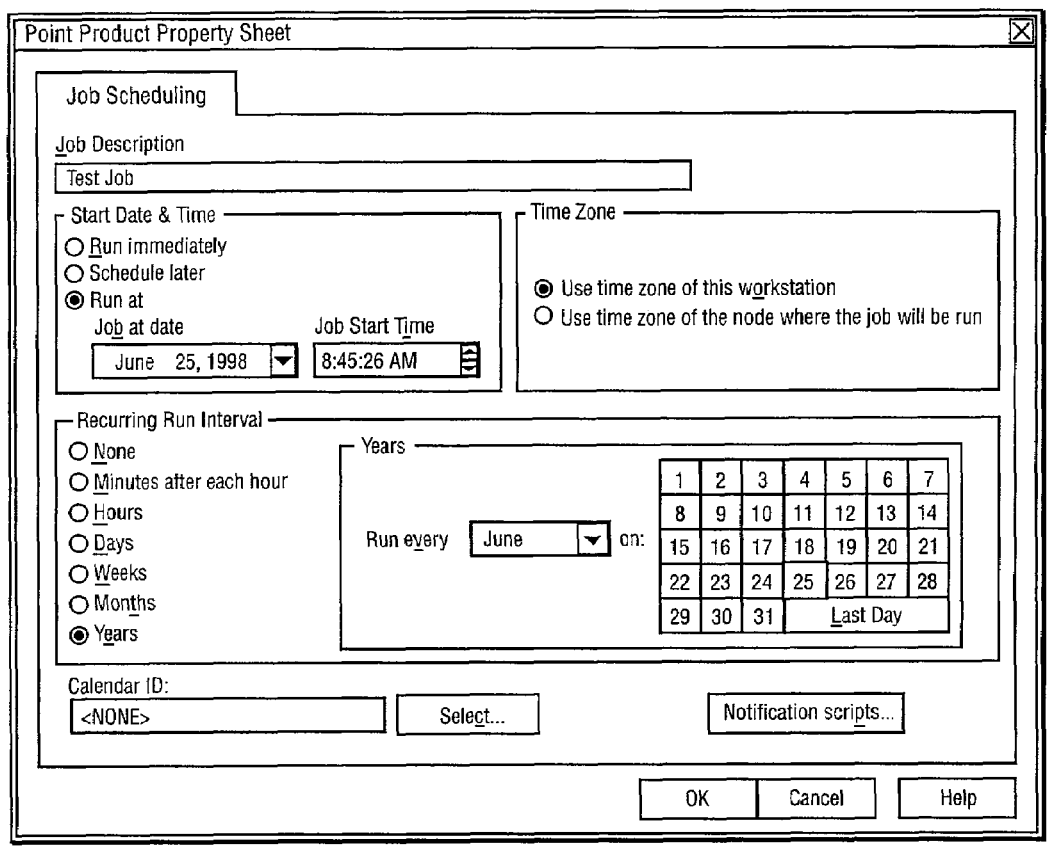
FIG. 18 is an illustration that provides an example of a job scheduled to run once a year on a specific date.

FIG. 13 provides an example of a job scheduled to run at selected minutes after each hour (schedule the hourly recurring run interval). FIG. 14 provides an example of a job scheduled to run every hour (schedule the recurring run interval in hours). FIG. 15 provides an example of a job scheduled to run every day (schedule the recurring run interval in days). FIG. 16 provides an example of a job scheduled to run every week on Thursday with a specific start date (schedule the recurring run interval in weeks). FIG. 17 provides an example of a job scheduled to run every 25th day of the month (schedule recurring run interval in months). FIG. 18 provides an example of a job scheduled to run once a year on June 25th (schedule the recurring run interval in years).

Notification Scripts

As discussed above, the GUI interface provides the user an opportunity to define, modify, or select a notification script. Notification scripts are shell scripts containing actions used to automatically provide notification about jobs and job status information. Other functions may also be performed by the notification scripts, for example. The point product application executes the jobs notification scripts. The product application documentation should include detailed information on actions taken upon job completion or job failure.

Notification scripts may be constructed for tables, tablespaces, and indexes. When constructing a notification script for notification of a completed or failed job, variables of previously assigned values may be utilized.

The values for these variables are the same ones defined for a particular job in the default notification script files. A user may define the values for the variables in these files, and then use the variables in the notification script as arguments.

Using these variables in a notification script allows the same script to be utilized for various jobs, since different values may be assigned to the variables for each job. You can use variables in a job completion script or job failure script as determined by the product application.

Table 11 provides a listing of established notification script variables, including a description of each variable.

TABLE 11

| This Script Variable | Represents This Value |
| --- | --- |
| %C(JOB_ID) | Job identification number |
| %C(GROUP_ID) | Group identification number |
| %C(HOSTNAME) | Name of the host on which the completed or failed job ran |
| %C(INSTANCE) | Instance name on which the completed or failed job ran |
| %C(USERNAME) | Name of the user |
| %C(CONNECT_STR) | Connect string |
| %C(JOB_OWNER) | Owner of object whose job completed or failed |
| %C(OBJECT) | Name of object whose job completed or failed |
| %C(PRODUCT_CODE) | Product Code |
| %C(PRODUCT_VERSION) | Version number of the product |
| %C(DESCRIPTION) | Job description |
| %C(EMAIL_ADDR) | Notification routing string (the value entered in the Notification email address field) |
| %C(TYPE) | Job type code, representing the type of job that completed or failed |
| %C(PLATHOME) | Install directory |
| %C(USERROLE) | The role assigned to the user (e.g., administrator) |

Figure 19:
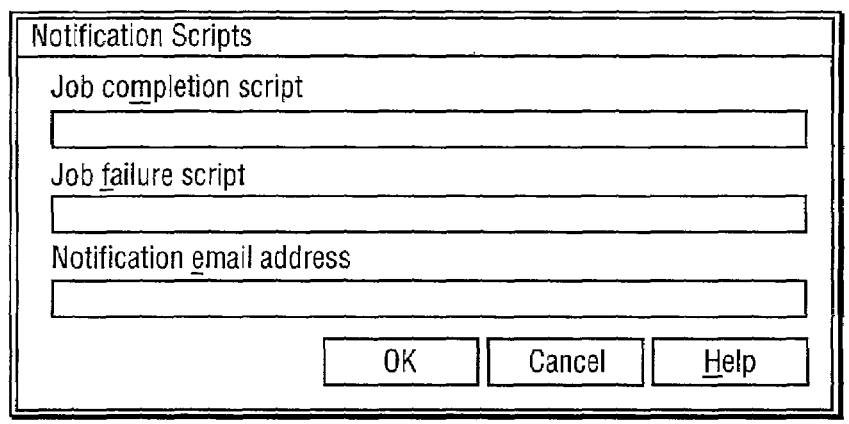
FIG. 19 is an illustration of a Notification Script window.

A Notification Scripts button on the GUI interface accesses a Notification Scripts window (see FIG. 19). The Notification Scripts window allows a user to:

Modify the text to use for confirmation messages indicating the completion or failure of a job.

Write a customized script using the variables specified in this window.

Specify the path for the notification email address used to inform you of the job's completion or failure.

In each of the Job completion script box and Job failure script box, a user may enter any of the predefined script variables to modify default script, or simply type in a full path location and filename for a notification script.

A full path location for a user or notification email box address is typed into the Notification email address box. This method may be utilized to assign notification routing addresses for a pager, email, or phone number to deliver the information about the scheduled jobs to any location.

Scheduling a Calendar

Figure 20:
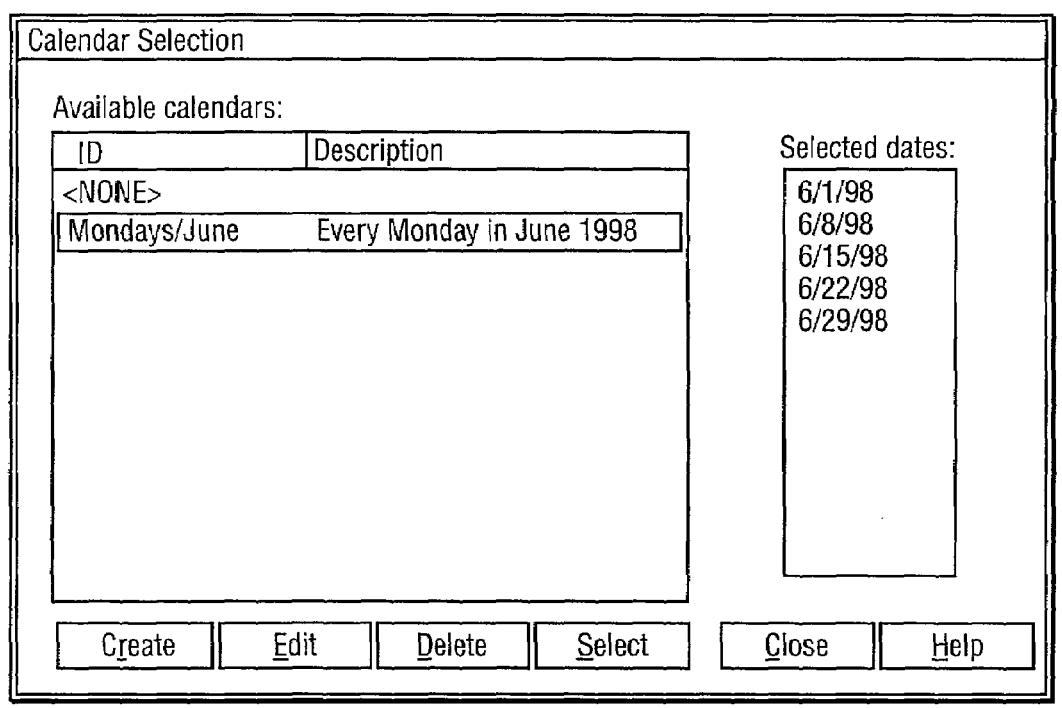
FIG. 20 is an illustration of a Calendar Selection window.

A Calendar Selection window, see FIG. 20, accessible from the GUI interface, provides a list of the predefined calendars that may be used with the current job. Using the options in this window, a user can:

Create a new calendar.

Edit an existing calendar.

Select a previously defined calendar.

Delete a calendar

To create a calendar, a user selects the Create button in the Calendar selection window, which invokes the display of a Create Calendar window (see FIG. 21). The user fills out the ID (a name for the calendar) and Description fields.

The user may select the following buttons to select the month and year of a date on which the job is to run:

Select the >> button to advance the year by one.

Select the << button to decrease the year by one.

Select the > button to advance to the next month.

Select the < button to move back to the previous month.

By clicking a day of the month, a red border marks the date on the calendar and the complete date displays in the Selected dates field. Multiple days may be selected.

Existing calendars may also be modified by selecting a calendar first by clicking on its ID or Description in the available Calendars list in the Calendar Selection window and then clicking on the Edit button (see FIG. 22, for example). Once the calendar is displayed, additional job run dates may be added by selecting a date on the calendar. A user utilizes:

Select the >> button to advance the year by one;

Select the << button to decrease the year by one;

Select the > button to advance to the next month;

Select the < button to move back to the previous month; and then the user clicks on the day of the month. A red border marks the date on the calendar and the complete date displays in the Selected dates field. The above process is repeated until all the dates for running the job are displayed in the Selected dates field.

Dates may be deleted from the Selected dates list by clicking on calendar numbers marked with red borders to deselect. The border on the date disappears when deselected and the date no longer displays in the Selected dates field.

The OK button saves the calendar and exits the window. The edited calendar is then available in the Calendar Selection window. Clicking the Cancel button exits the window without saving changes to the calendar.

A calendar may be selected by clicking on the Select button of the GUI interface (Job Scheduling window/property page), which displays the Calendar Selection window (FIG. 20, for example). A calendar is highlighted by clicking on the calendar ID or description in the Available Calendars list, and then clicking on the Select button (or double clicking on the ID or description). The calendar selection window then closes and the selected calendar ID displays in the Calendar ID field on the Job Scheduling window or property page.

A calendar my be deleted using the above procedure by clicking the Delete button instead of the Select button from the Calendar Selection window.

Strategy Scheduling

A Strategy Scheduling window is provided to view, create, modify, or delete schedules for a strategy. The schedule strategy window is invoked from a point product, as shown in FIG. 23.

A Create button is provided for creating a new schedule for a current strategy, which invokes the Job Scheduling window/property page (see FIG. 24). The Job Scheduling window/property page is then filled out for the new schedule.

An Edit button is provided to modify an existing schedule for the current strategy, which invokes the Job Scheduling window/property page available for editing a selected schedule.

A delete button is provided to delete a schedule for the current strategy. A user first highlights a schedule to be deleted and then clicks on delete. A Delete Schedule window prompting for a clean up script is then displayed (see FIG. 25, for example).

The user may either delete the schedule without running a cleanup script by deleting the text (if any) in the Name of a shell script or other process to run to clean up associated files field, or delete the schedule and run a cleanup script by typing a path and full name of the script. The user invokes the action by clicking OK or returning to the Strategy Scheduling window without deleting by clicking Cancel.

Job Management Services

The present invention includes multiple job management services that are presented in an easy to use and intuitive format. The present invention utilizes a Jobs resource object to allow a Director program to identify and track various job processes.

Figure 26:
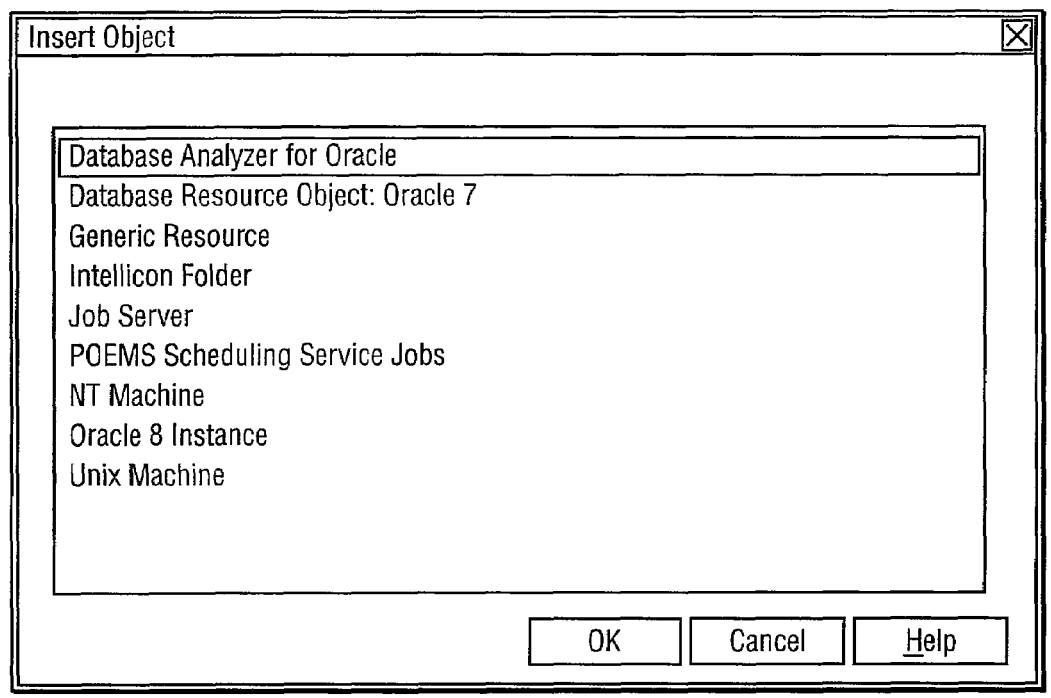
FIG. 26 is an illustration of an Insert Object window.
Figure 27:
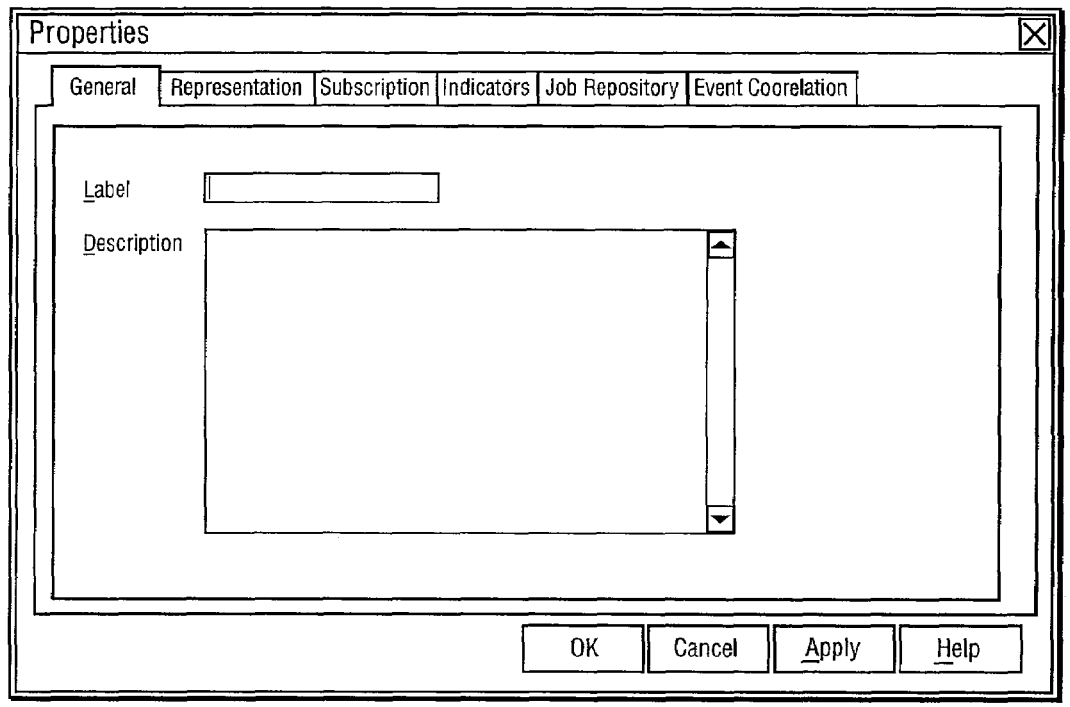
FIG. 27 is an illustration of a General tab of a properties window.
Figure 28:
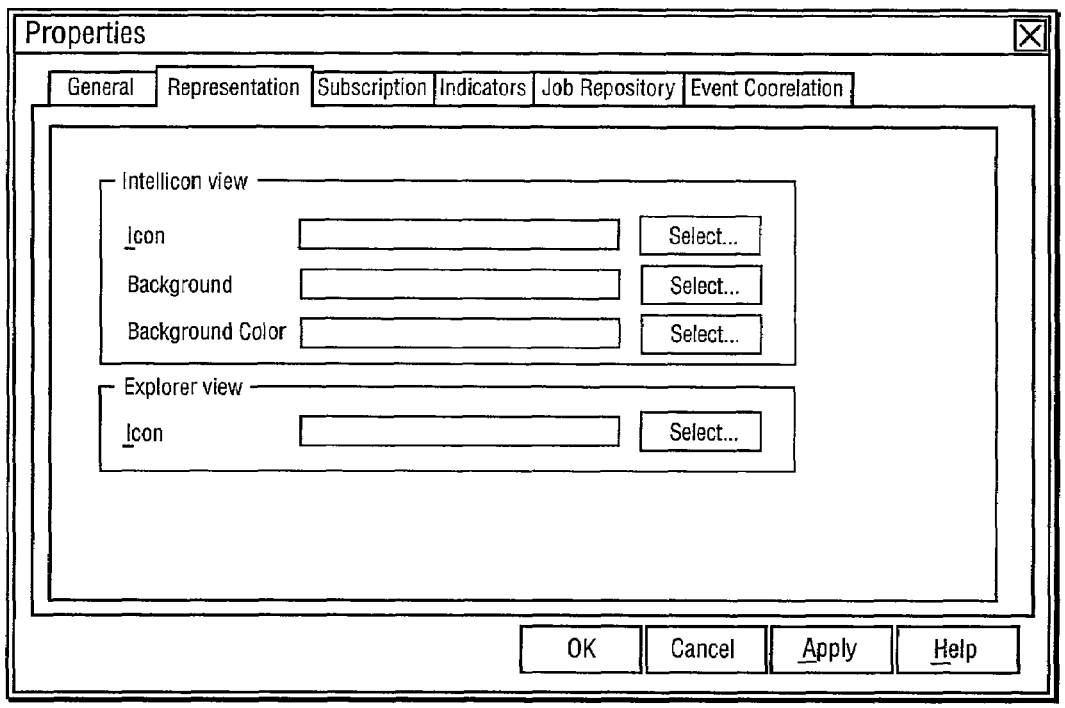
FIG. 28 is an illustration of a Representation tab of a properties window.

After inserting a Jobs resource object into the Director, a user may perform the following job management tasks:
    View information in the following formats:
        Columns—Located on the right side of the Director window.
        Property pages—Located on the right side of the Director window.
        Logfile—Supplied Log File Viewer
    Delete jobs
    Rerun jobs
    Cancel job runs
    Monitor the progress of job runs A Jobs resource object provides a bookmark for finding information to display, and locating a job to be acted on when utilizing job management processes (deleting or monitoring a job, for example). An Insert Object window (see FIG. 26), invoked by the user, identifies objects to insert (POEMS provides a number of objects that may be inserted, a partial listing is provided in FIG. 26). The user selects an object (POEMS Scheduling Service, in this example), and presses OK. In response, a properties page is displayed (see FIG. 27), which includes General (FIG. 28), Representation (FIG. 29), Subscription, Indicators, Job Repository (FIG. 30), and Event Correlation tabs.

The Properties page includes a label and description field. The user enters a label and a description (description is optional).

The Representation tab allows the user to select, in an Intellicon View, an icon for representing the job, and optionally, a background and background color. Alternatively, the user may select an icon in Explorer view.

Figure 29:
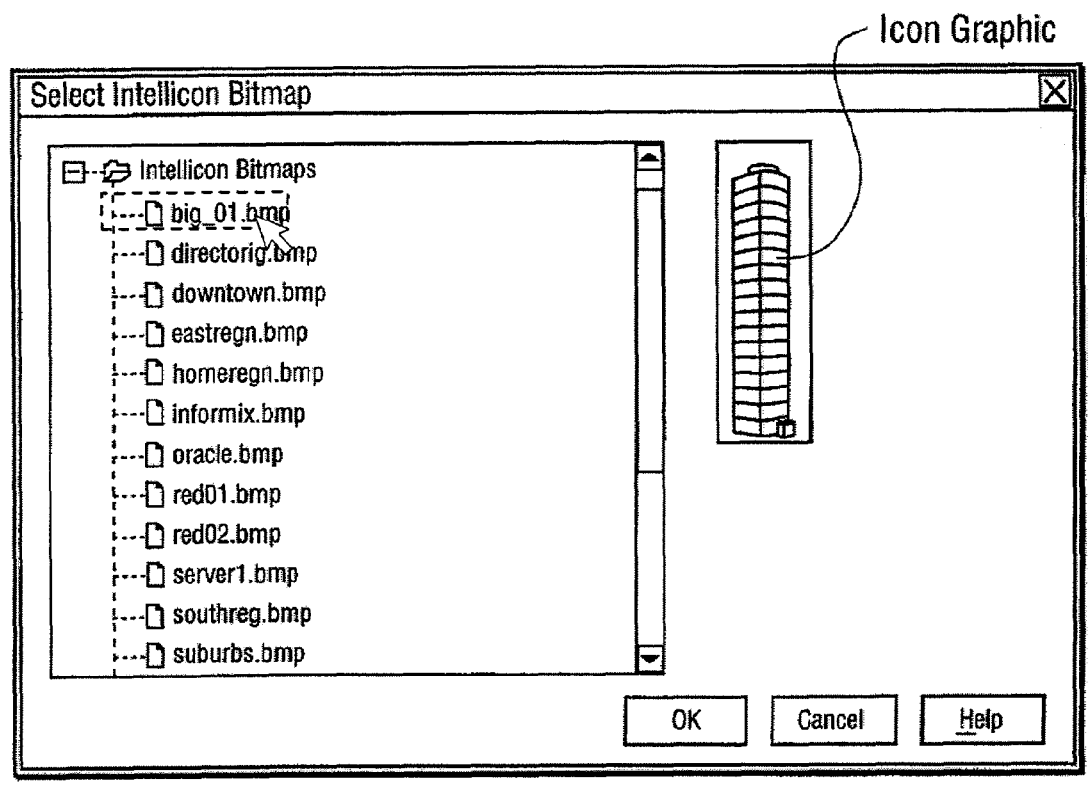
FIG. 29 is an illustration of a Select Intellicon bitmap utilized for selecting icon graphics for representing an object.
Figure 30:
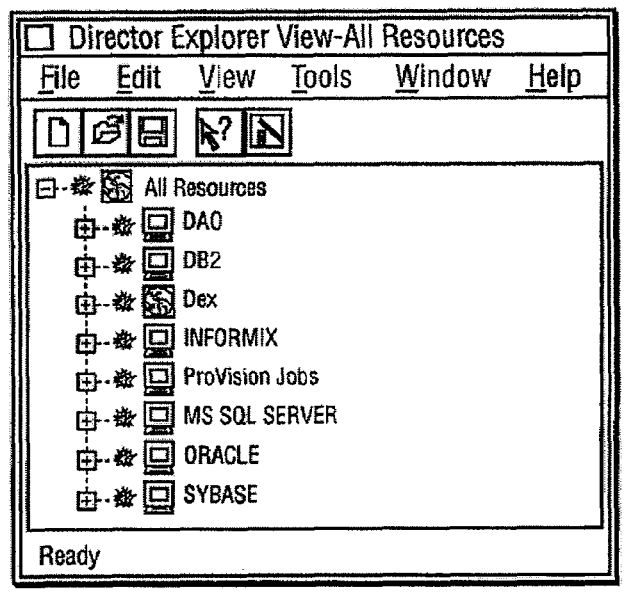
FIG. 30 is an illustration of an example in an Explorer view for the display of labels for a jobs resource object.
Figure 31:
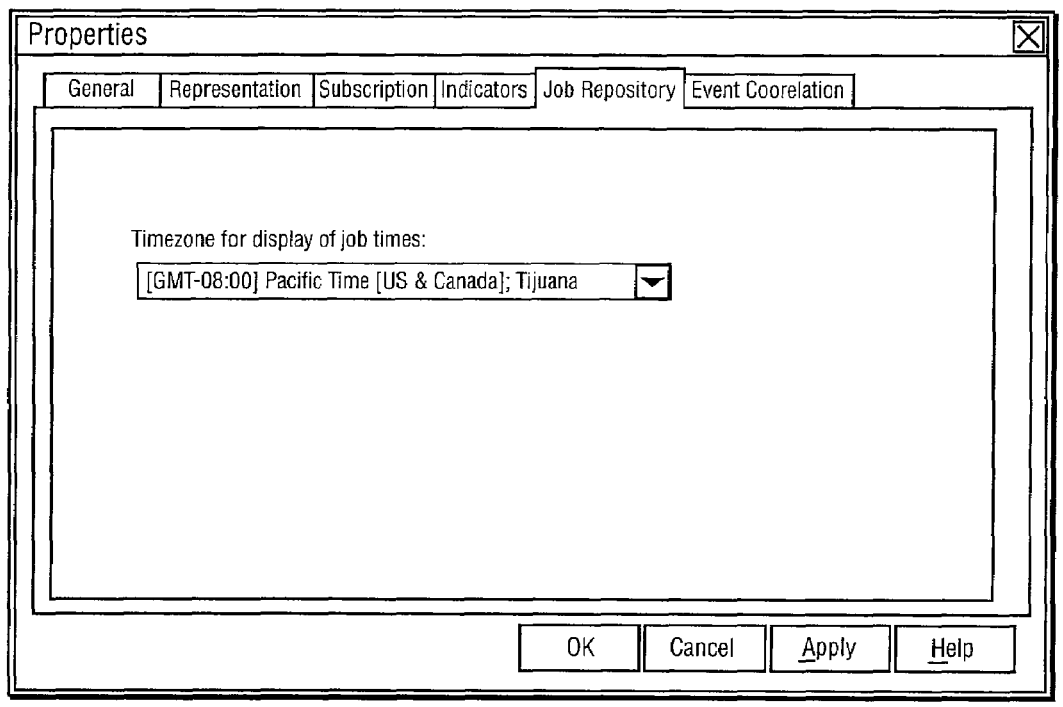
FIG. 31 is an illustration of a Job Repository tab of a properties window.

The Intellicon view is show in FIG. 29, and includes a list of Intellicon icons (provided by POEMS files, or alternatively provided by the user), and a display window to view a selected icon (graphic). An example of the Explorer view is illustrated in FIG. 30, which is an Explorer view displaying ProVision (point product, or application) Jobs (or LES jobs) as the label for a Jobs resource object.

Selecting the Job repository tab displays a window for defining a timezone for display of times related to jobs. A down arrow pull down menu bar provides the user with selections of any timezone. This selection does not affect the time or timezone selected for running a job as specified in the Job Scheduling property page. In one embodiment, daylight savings time may be compensated for by providing an automatic compensation selector that invokes a program to adjust for daylight savings time; alternatively, the user may select a timezone just east of the desired timezone.

Using Job Resource Objects

The Job Resource objects defined by the above processes enables a user to locate and view both jobs and runs. The user can locate each job in the Explorer view. Each time a job executes, it creates a new run, which then displays in a run folder for the job.

Each Jobs resource object contains a hierarchy of folders sorted into the following categories:
    All Jobs—Lists all jobs regardless of current status and also lists all runs by status.
    Jobs By Group—Lists all jobs arranged by group Ids.
    Jobs By Node—Lists all jobs arranged by the node on which the job runs.
    Jobs By Product—Lists all jobs arranged by the product used for the job.
    Jobs By Type—Lists all jobs arranged by type.
    Jobs By User—Lists all jobs arranged by the user who scheduled the job.

Figure 32:
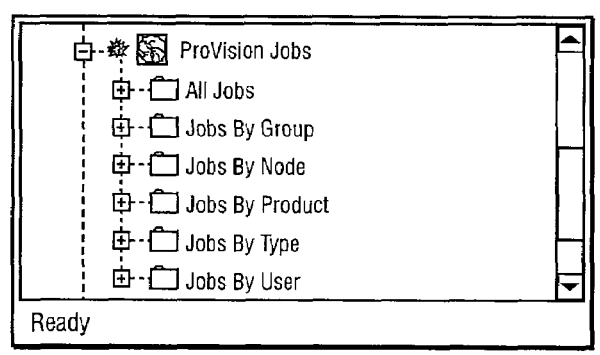
FIG. 32 is an illustration of a hierarchy of folders of a jobs resource object.

However, a point product may not allow a user to assign a job group or type. The hierarchy of folders is illustrated in FIG. 32.

Figure 33:
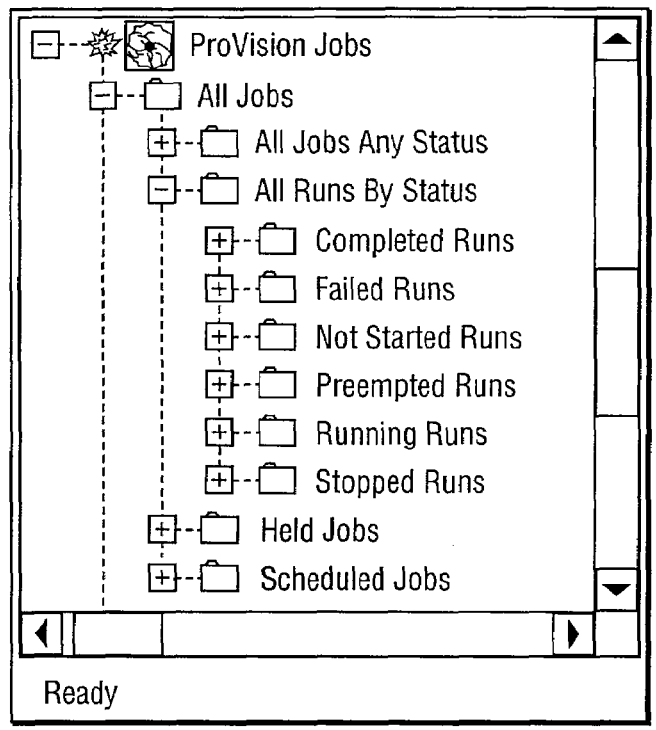
FIG. 33 is an illustration of a listing of jobs in All Jobs folder.

The All Jobs Folder (see FIG. 33) numerically lists all of the jobs instead of categorizing them by group, product or type. The All Jobs Folder lists jobs in folders, including:
    All Jobs Any Status—Lists all jobs regardless of status along with associated job history (each run of the job).
    All Runs By Status—Arranges all of the runs of jobs into the following folders according to their current status:
        Completed Runs
        Failed Runs
        Not Started Runs
        Preempted Runs
        Running Runs
        Stopped Runs
    Held Jobs—Lists all of the jobs that are held and can be scheduled later.
    Scheduled Jobs—Lists all of the jobs that are scheduled to run.

A user can display jobs according to the groups assigned to them when they were originally scheduled by using the Jobs Group Folder. The specific product application (used to run the job) assigns a group, but may not use this classification.

Jobs may be displayed according to the node on which they ran by using the Jobs By Node Folder.

Jobs may be displayed according to the specific product that ran each job by using the Jobs By Product Folder. This is helpful if using multiple ProVision products to schedule and run jobs with the POEMS Scheduling Service (helpful because it allows grouping of jobs by function or application, for example).

Jobs may be displayed by job type assigned to them when the jobs were originally scheduled by using the Jobs by Type Folder. The user's specific product application (used to run the job) assigns the job type. However, products do not necessarily use this classification.

Jobs may be displayed according to the user who scheduled the job by using the Jobs By User Folder. Each of the Jobs By User, Jobs By Type, Jobs By Product, Jobs By Node and Jobs By Group Folders contain the same folder hierarchy for each user as that for the All Jobs Folder described above.

Specific jobs may be located by expanding folders using the (+) signs in the Jobs resource object hierarchy. The resulting display includes Job ID, Job Icon, and a Job description.

Figures 35, 36:
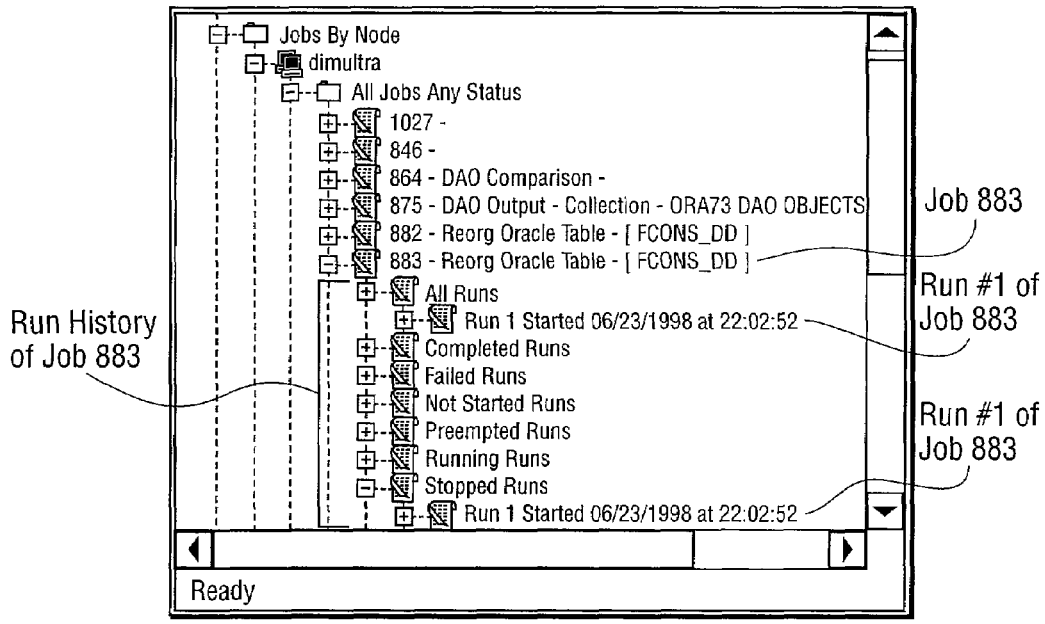
FIG. 35 is an illustration of an example of a Job's Run history.
FIG. 36 is an illustration of a listing of jobs in an All Jobs Any Status folder under a specific node.

In addition, a (+) sign of a specific job reveals its run history (See FIG. 35, for example).

The run history is stored in several folders. The All Runs folder contains every run regardless of its status. The remaining six folders contain only the runs that possess the status that applies to that folder (Completed, Failed, Not Started, Preempted, Running and Stopped Runs).

Figure 34:
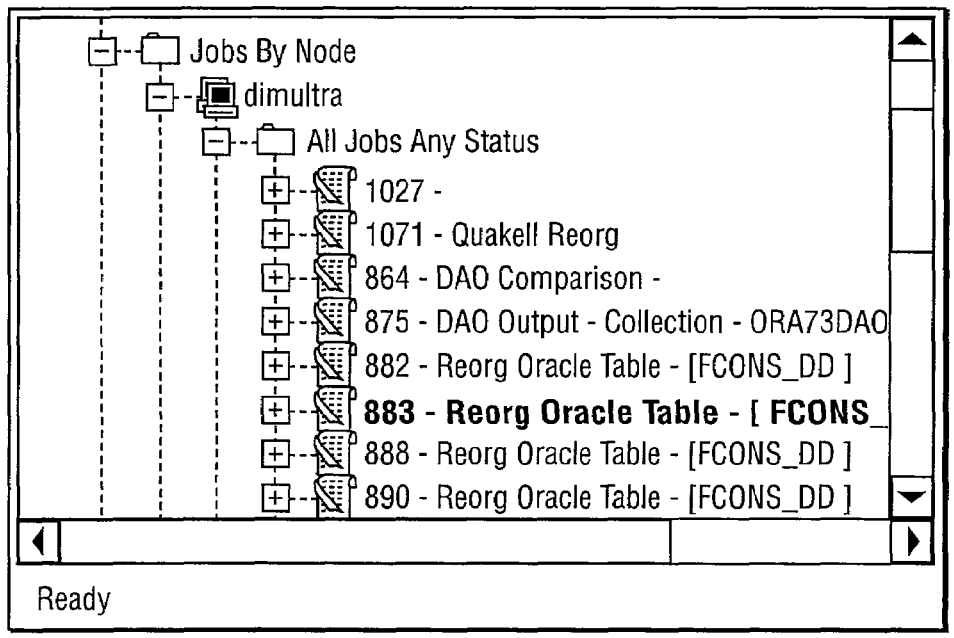
FIG. 34 is an illustration of a job in an All Jobs Any Status folder.

Specific runs may be located in the All Runs folder and according to its status as illustrated in FIG. 34. In FIG. 34, Run #1 of Job 883 is stopped; therefore, it displays in the Stopped Runs folder as well as in the All Runs folder.

Each run listing includes:
Run icon
Run number
Run start date and time

Data can be viewed in column format for all jobs, runs, groups, nodes, products, types and users stored in a job, runs, groups, nodes, products, or types folder. The data displays in columns on the right side of the Director window when using the Explorer view. As shown in FIG. 36, some of the data is shown that is available for the jobs in the All Jobs Any Status folder under a specific node in the Jobs By Node folder.

A user can select any of the following folders to view data for their contents in column format (note that some folders, such as All Jobs, do not provide data), including:
Jobs By Group
Jobs By Node
Jobs By Product
Jobs By Type
Jobs By User
All Jobs Any Status
All Runs By Status
Held Jobs
Scheduled Jobs
All Runs
Completed Runs
Failed Runs
Not Started Runs
Preempted Runs
Running Runs
Stopped Runs Viewing Job Group Data The following data columns display when a user clicks on the text of the Jobs By Group folder in a Jobs resource object:

Group ID—Strategy group ID number.
Strategy ID—Strategy ID number of the strategy defined in the Common Strategy Services to which the group belongs.
Description—Description of the group that the user can enter when the group is created.
Product Code—Code for the product used to create the jobs that can be viewed in this folder.
Product Version—Version number of the product used to create the jobs that can be viewed in this folder.
Jobs_Per_Run—Number of POEMS Scheduling Service jobs submitted by the product for this strategy group.
Created—Date and time the strategy group jobs were generated.

Viewing Node Data

The following data column displays when the user clicks on the text of the Jobs By Node folder in a Jobs resource object:
Node—List of the nodes under which jobs are located.

Viewing Product Data

The following data columns display when the user clicks on the test of the Jobs By Product folder in a Jobs resource object:
Product Code—Code for the product used to create the jobs that can be viewed in this folder.
Product Version—Version number of the product used to create the jobs that can be viewed in this folder.

Viewing Data Type

The following data column displays when the user clicks on the text of the Jobs By Type folder in a Jobs resource object:
Type—List of job types. The user can locate jobs under their job type, which is assigned in the product used to run jobs.

Viewing User Data

The following data column displays when the user clicks on the text of the Jobs By User folder in a Jobs resource object:
User—List of user names. The user can locate jobs listed under user names.

Viewing Job Data

The following data columns display when the user clicks on the text of an All Jobs Any Status, Held Jobs, or Scheduled Jobs folder in a Jobs resource object:
Job ID—Unique Job ID number.
Description—Optional description of the job.
Job Group—Strategy group ID number for the group to which the job belongs.
Access Mode—If this column displays L, the job is locked and you cannot rerun the job until the job is unlocked. A job is locked and unlocked by the point product running the job. If a job is not locked this column remains blank.
Product—Product that created the job.
Type—Job type (product-dependent).
Node—The machine on which the job will run.
Whosetz—Time zone to use for scheduling the job.
When Deployed—Time that the job is written into the job table.
Next Start—This field may contain one of the following values or text messages:
The next time the job is set to run.
Run immediately.

Expired.
Schedule later (held).
Run Count—Total number of times the job was run.

Viewing Run Data (Job History)

The following data columns display when the user clicks on the All Runs By Status folder and any folder containing runs:
Job ID—Unique Job ID number for this run.
Run Number—Unique run number (the number assigned to each recurring run of the job).
Group ID—Strategy group ID number of the group where the job belongs.
Product—PLATINUM ProVision product (or other product) that created the job.
Type—Job type (product-dependent).
Time Zone—Time zone used for job runs.
Scheduled Start Time—Time the job is scheduled to start.
Start Status—Status of how the job started. This status is set by the POEMS Scheduling Service and the column may contain the following values:
  0: Job started successfully.
  1: Job did not run because the starting time passed while the POEMS Scheduling Service was down and the job was not recurring.
  2: Could not execute due to OS status.
  3: Fork failed due to OS status (insufficient system resources).
  4: Invalid user.
Actual Start Time—Time when this job run actually started.
End Time—Date and time when the run completed.
OS Status—Provided by the operating system when job process could not be created (see your operating system documentation for information).
Complt Status—Completion status of the run assigned by the point product that ran the job (see your product-specific documentation for information).
Failed—This column may contain the following values:
  0: Job was successful.
  1: Job failed for any reason.
Preempted—This column may contain the following values:
  1: Job did not run because it was disallowed due to your specific product's operating rules.
  −1: Job was not preempted.
Stopped—This column may contain the following values:
  1: Job process finished without notifying the agent and the status is not known.
  −1: Job was not stopped.
Logfile—Name and location of the logfile for this run.

Viewing Data in Property Page Format

Figures 37, 38:
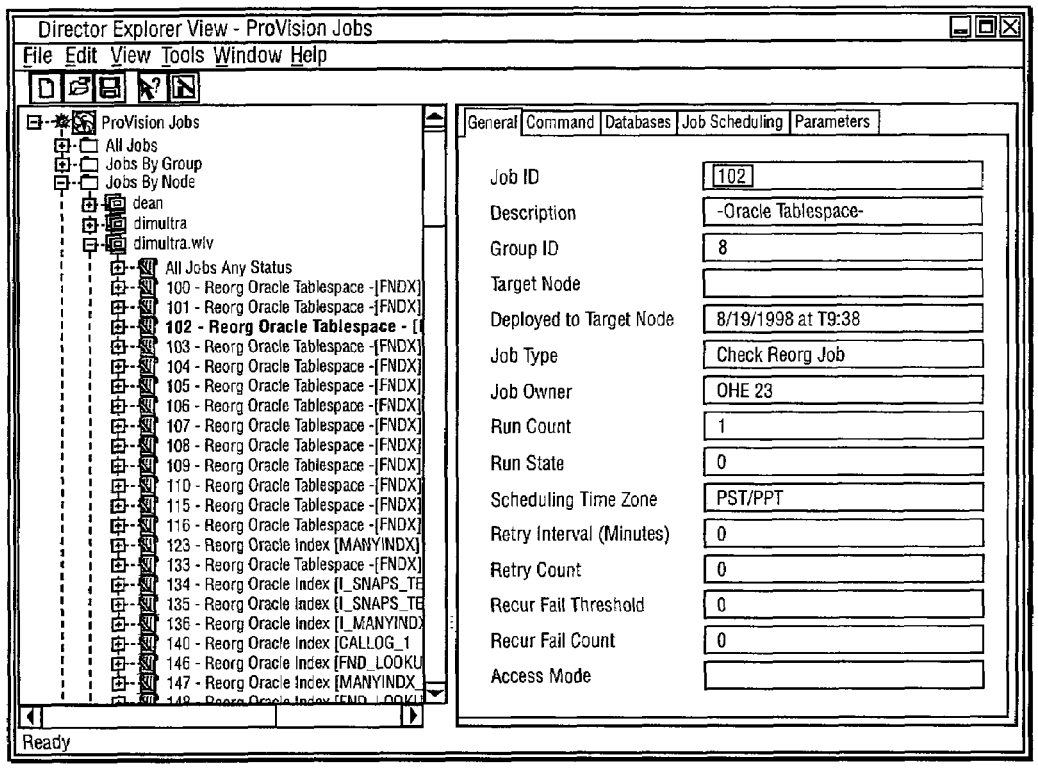
FIG. 37 is an illustration of Property Page tabs that are available for jobs.
FIG. 38 is an illustration of a Command Tab property page.

Data about specific objects (jobs, runs, groups, products, or types) may be viewed within a Jobs resource object. The data displays in a property page format with one or more tabs on the right side of the Director (Explorer view) window. Clicking on the text of the object displays the data in property page format on the right side of the Director, as illustrated in FIG. 37, accessing the property page data.
The General property page contains the following fields:
Job ID—Unique Job ID number.
Description—Optional description of the job.
Group ID—Strategy group ID number of the group to which the job belongs.
Target Node—The machine where the job will run.
Deployed to Target Node—Time when the job is written into the job table on the node where it will run.
Job Type—Job type (product-dependent).
Job Owner—Owner of the object on which the job is performed.
Run Count—Number of times the job was run.
Run State—This column may contain the following values:
  0: Waiting for the next run.
  1: Currently running.
Scheduling Time Zone—Time zone of the workstation where this job was scheduled.
Retry Interval (Minutes)—This column may contain the following values:
  Number of minutes to wait before attempting to rerun the job after a preempted run
  Or
  0: job will not rerun after it is preempted.
Retry Count—This column may contain the following values:
  Number of retry attempts made on the job when it is preempted or is otherwise unable to start.
  Or
  0: the job will not be rerun.
Recur Fail Threshold—Number of failed product runs accepted before the rescheduling of the job is stopped.
Recur Fail Count—Used to test if the job has failed for a given number of successive runs. (The number is decreased with each failure and reset to the original value with each successful run; if it is 0, the job is not rescheduled.)
Access Mode—If Locked appears, the user cannot rerun the job until the job is unlocked. A job is locked and unlocked by the point product running the job. If a job is not locked, this field remains blank.

Other Property pages are displayed by clicking on a corresponding tab. The Command property page (see FIG. 38) contains the following fields:
Command Line—Command line to execute.
E-Mail Completion Notification to—Email address used to send job completion or failure notification.
Completion Script—Job completion script.
Failure Script—Job failed script.
Product Code—Code for the ProVision product that created the job.

The Databases property page (see FIG. 39) contains the following fields:
Database Connect String—Optional database connect string or name used.
Database Instance—Name of the instance on which the completed or failed job ran.
Object Name—Name of object whose job completed or failed.
User ID—Database user ID.
User Password—Encrypted database user password.

Note: The information on this property page is set by the point product that runs the job.

The Job Scheduling property page (see FIG. 40) displays the following job scheduling selections made in the product that ran the job:
Start date and time of the job.
Time zone where the job was scheduled.

Note: If the Use time zone of this workstation button is selected, it refers to the workstation where the job was scheduled.

Interval at which the job reruns.

Calendar ID of stored calendar used to run the job. This field displays a Calendar ID only if a stored calendar was used.

The parameters tab property page (see FIG. 41) contains the following field:

Job Parameters—Lists the jobs parameter names and values. (The point product determines the contents of this field.)

The General tab property page (see FIG. 42) contains the following fields:

Job ID—Unique Job ID number for this run.

Run Number—Unique run number (the number assigned to each recurring run of the job).

Time Zone—Time zone where the job runs.

Scheduled Start Time—Time when the job is scheduled to start.

Actual Start Time—Time when this run of the job actually started.

Start Status—Status of how the job started (set by the POEMS Scheduling Service).
  Started successfully.
  Expired—Job did not run because the start time passed while the POEMS Scheduling Service was down and the job was not recurring.
  Agent down—The POEMS Scheduling Service agent is down.
  Fork failed—Process could not run on agent machine due to insufficient system resources.

End Time—Date and time the run completed.

Operating System Status—Status of the process provided by the operating system.

Run Status—One of the following radio buttons is selected, indicating the current status of the run:
  Completed—The run is finished.
  Not Started—The run has not started yet.
  Running—The run is currently in progress.
  Stopped—The process has finished without notifying the agent and the status is not known.
  Preempted—The run was disallowed due to point product operating rules.
  Failed—The run failed due to an unspecified reason.

Completion Status Code—Completion status of the run assigned by the point product that ran the job (see product-specific documentation for information).

Logfile—Name of the logfile for the job.

Figures 43, 44:
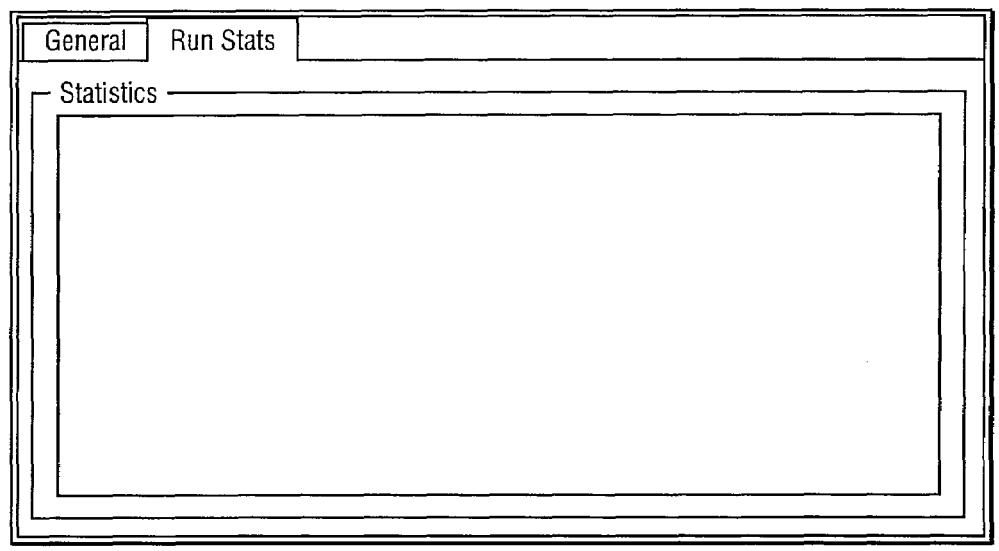
FIG. 43 is an illustration of a Run Stats Tab property page that displays product specific information about a job run.
FIG. 44 is an illustration of a General Tab property page on the text of a group in a Jobs resources object.

To access the Run Stats tab property page, the user clicks on the Run Stats tab to view data on the Run Stats property page (see FIG. 43).

The Statistics field displays product-specific information about this run of the job. This field only displays data if data is provided by the ProVision, Point or other product.

Viewing Job Group Data

To Access job group data:

Click on the text of a group in a Jobs resource object, the General tab property page, as shown in FIG. 44, is displayed.

The General tab property page (for a group) contains the following fields:

Group ID—Strategy group ID number.

Description—Optional description of the group.

Strategy ID—Strategy ID number of the strategy defined in the Common Services Strategy where the group belongs.

Product Code—code (three-letter Platinum code, in one embodiment) for the ProVision product used to create the jobs that can be viewed in this folder.

Product Version—Version number of the ProVision product used to create the jobs, which can be viewed in this folder.

Jobs Per Run—Number of POEMS Scheduling Service jobs submitted by the product for this strategy group.

When Created—Date and time the strategy group was generated.

Viewing Log File Data

Log files are generated by various ProVision products, point products, application products, etc (a class of software products that include links to the APIs and related programming as discussed herein) when jobs are run. If created, the user can view the log files created by products using the POEMS Scheduling Service through a Jobs resource object. The user may launch a log file viewer.

Figure 45:
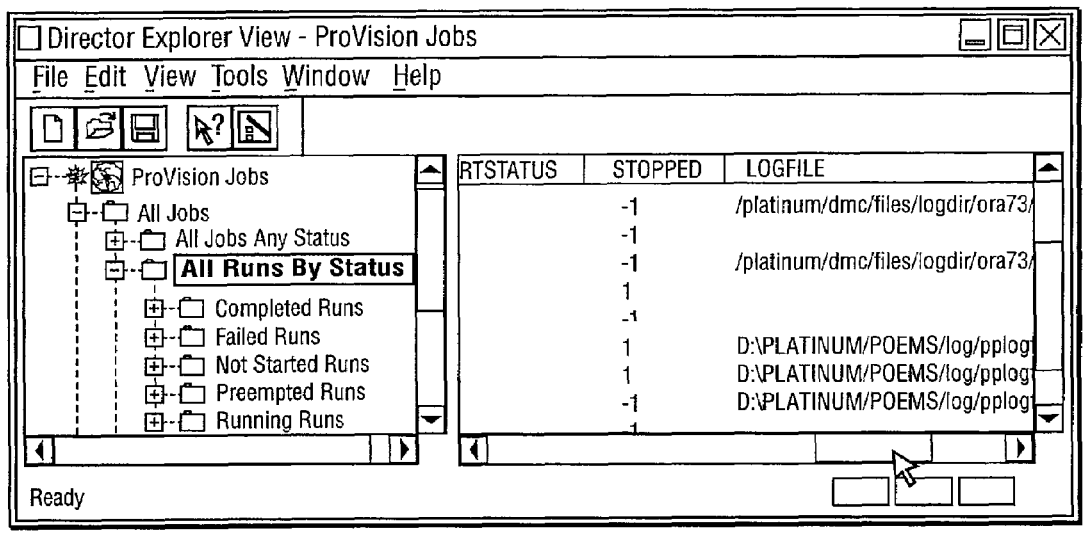
FIG. 45 is an illustration of a view of a Log File column in a Director Explorer view.

To determine if a log file exists for a given job, the user first clicks on the text or the icon of an All Runs By Status folder to display the data in column format on the right side of the Director window. Then, scroll left to view the LOG-FILE column using the horizontal scroll bar or the right arrow (see FIG. 45, for example). If a log file for a run is available, its location displays in the row for that run in the LOGFILE column.

Figure 46:
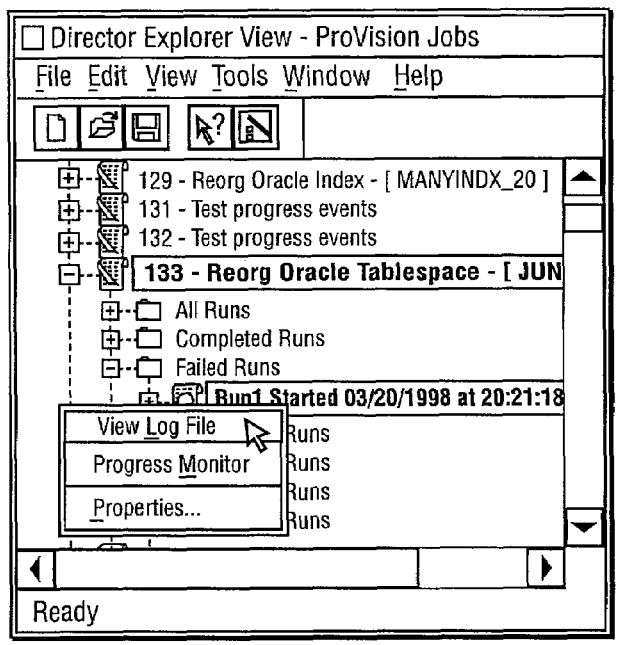
FIG. 46 is an illustration of utilization of a popup menu for viewing a Log File.
Figure 47:
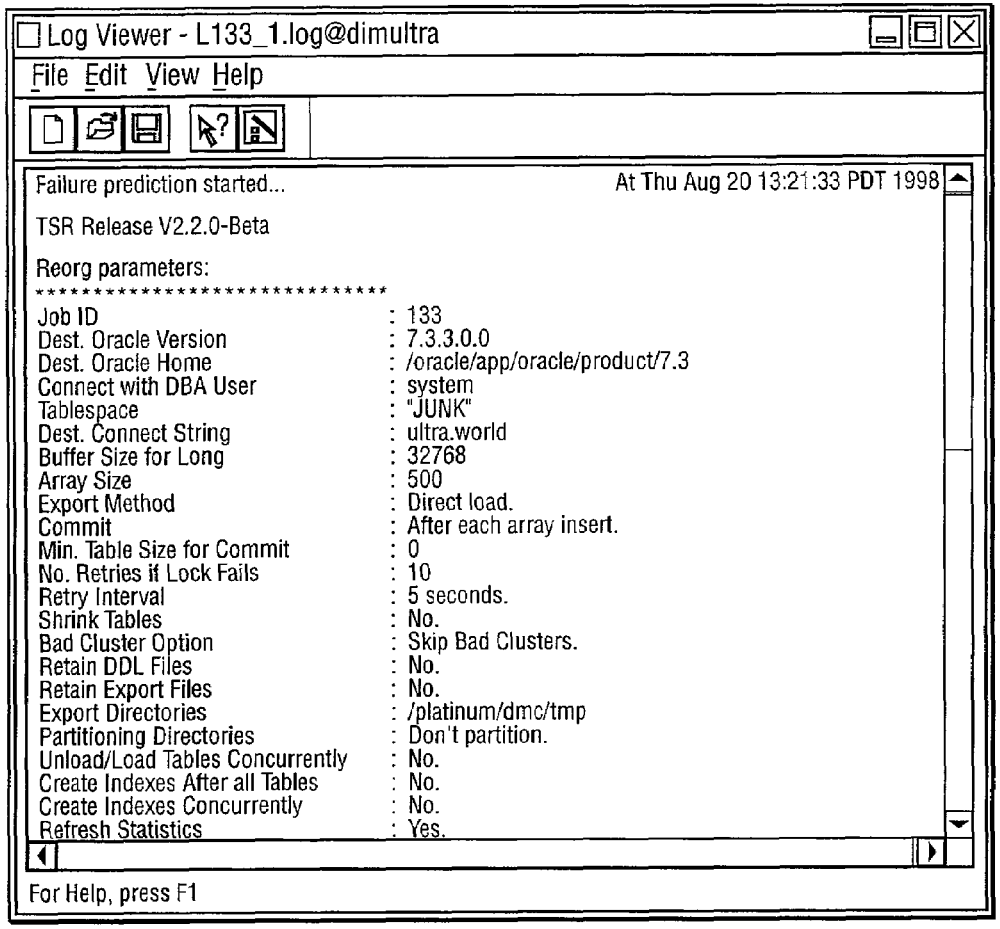
FIG. 47 is an illustration of a Log File viewer displayed for a specific job run.

To view a log file for a run, the user finds the run of the job in a Jobs resource object. Then, right clicks on the run to display a popup menu (see FIG. 46, for example). Finally, selecting View Log File from the popup menu brings up the display shown in FIG. 47.

Deleting Jobs

When the user no longer requires a job history, it may be deleted using the Jobs Administrator window. Either multiple jobs or single jobs may be deleted.

Deleting Multiple Jobs

Figure 48:
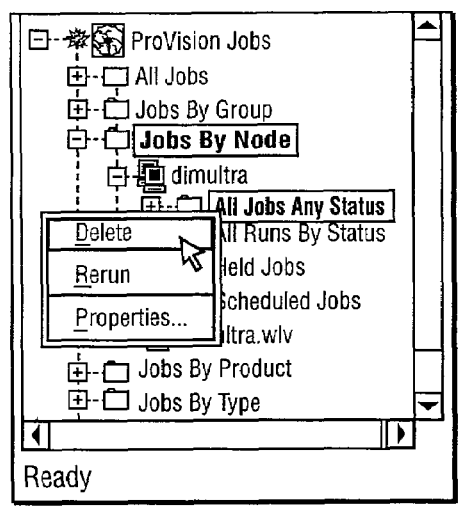
FIG. 48 is an illustration of a popup menu utilized to delete a folder of jobs.

To delete multiple jobs, the Jobs Administrator window is accessed at the level of the folder that contains the jobs to delete in a Jobs resource object. Then, a right-click on the icon or text of the folder to display the popup menu illustrated in FIG. 48. Selecting Delete from the popup menu displays the Delete Jobs window (see FIG. 49). This window displays the Job ID and node name of all of the jobs selected in the Submit Jobs/Runs field.

All of the jobs in a folder are initially selected and highlighted. If the user clicks on a job, it is deselected and will not be deleted. If all jobs are deselected, the Submit button becomes inactive.

Figure 49:
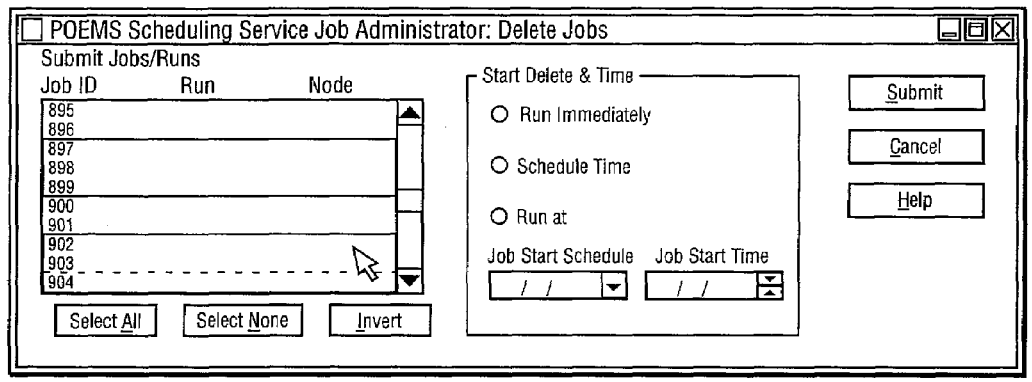
FIG. 49 is an illustration of a Delete Jobs window.

Deselect any jobs by either:

Click on the jobs one at a time (as shown in FIG. 49);
Or
Use the Select None button to deselect all the jobs, and then click on the jobs to delete;
Or
Click on the jobs to delete one at a time to initially deselect them, and then use Invert button to reverse your selection. (This will reselect the jobs you deselected and deselect all others.)

Note: The Select All button may be used to reselect all the jobs.

Figure 50:
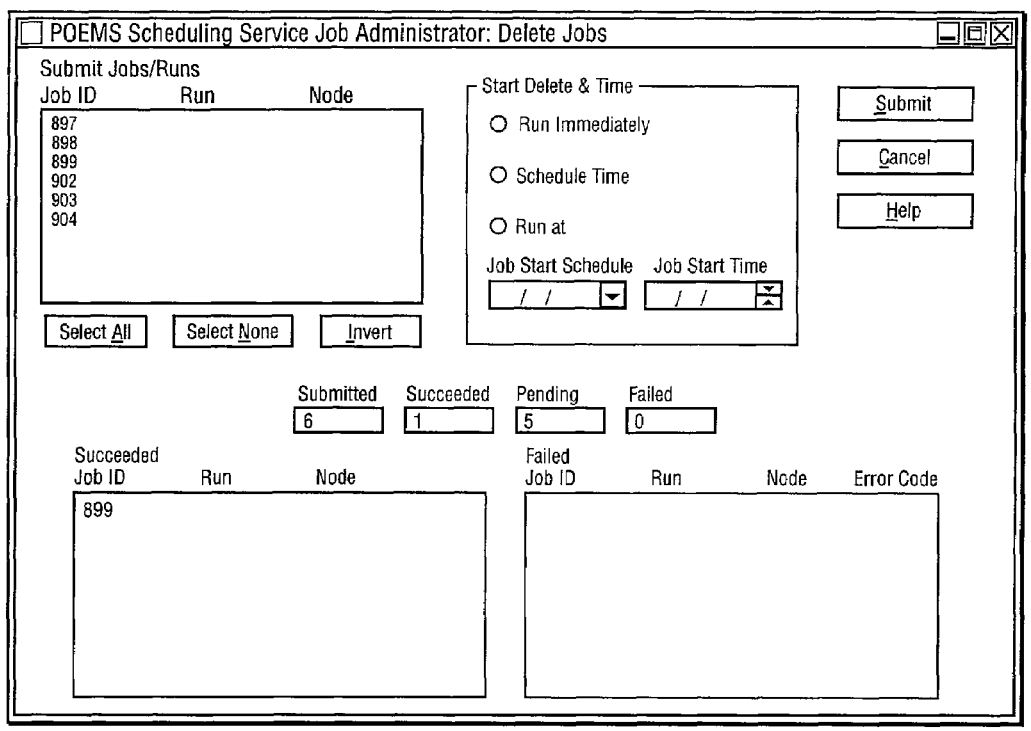
FIG. 50 is an illustration of a Status and Results window.

Clicking on the Submit button deletes the selected jobs. The window expands to provide a dynamic display of the status and results of the action (see FIG. 50). If the deletion of a job completes successfully, the job ID and node name for each job display in the Succeeded field. If the deletion of a job fails, the job ID, node name, and an error code for that job display in the Failed field.

A running total of submitted, succeeded, pending and failed deletions displays in the small Submitted, Succeeded, Pending, and Failed fields. Alternatively, a user may click on the Close button while the jobs are deleted without waiting for all of the results to display in the expanded window; or wait until all of the results (successful or failed) display in the Succeeded or Failed fields in the expanded window. The Close button then changes to the Done button, which you select to close the Jobs Administrator window.

Deleting Single Jobs

Figure 51:
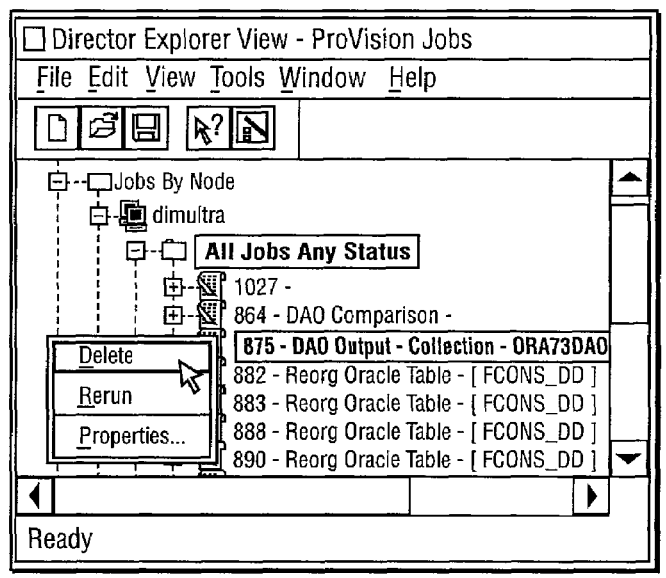
FIG. 51 is an illustration of utilization of a popup menu to delete a single job.

To delete single jobs, the Jobs Administrator window is accessed at the level of the job to delete in a Jobs resource object. The user then locates the job to delete and right-clicks on the icon or text of the job to display a popup menu (see FIG. 51) and selects Delete.

Figure 52:
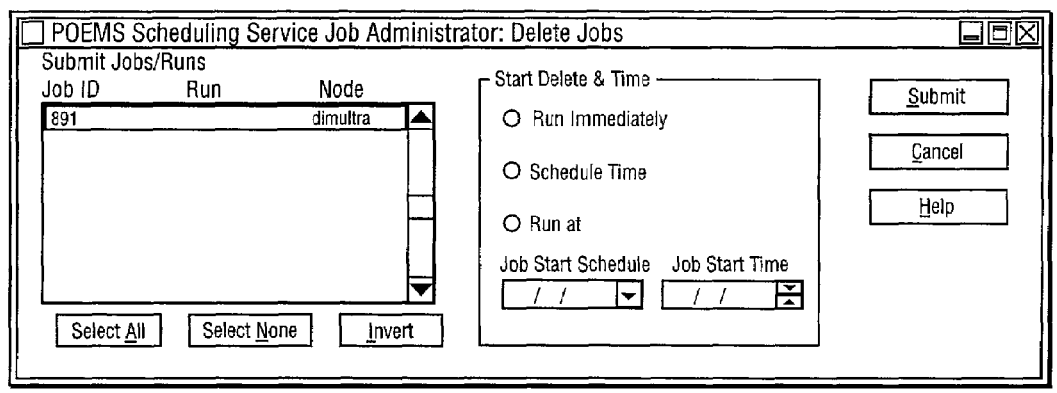
FIG. 52 is an illustration of a Delete Jobs window.
Figure 53:
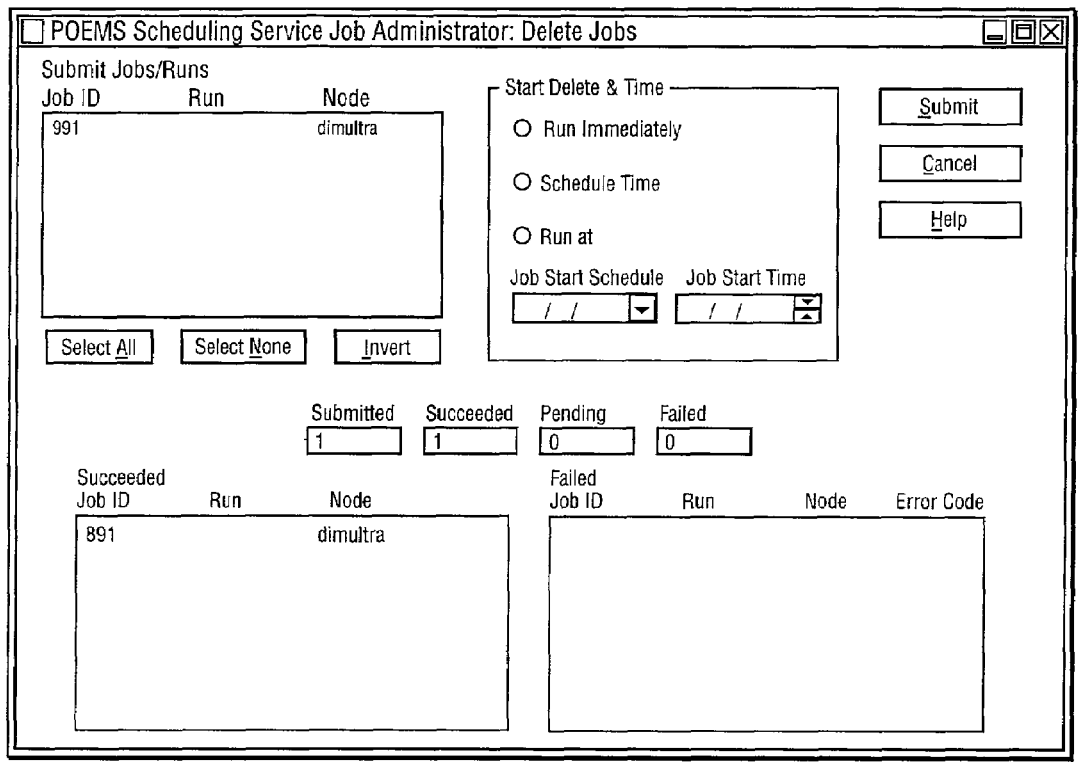
FIG. 53 is an illustration of a Status and Results window for the deletion of a single job.

The Delete Jobs window then displays (see FIG. 52). This window shows the Job ID and node name of the selected job. If the user clicks on the job, it is deselected and the Submit button becomes inactive. Clicking the Submit button deletes the job, and the window expands to provide a dynamic display of the status and results of the action (see FIG. 53).

If the deletion of the job completes successfully, the job ID and node name for the job display in the Succeeded filed. If the deletion of the job fails, the job ID, node name, and an error code for the job display in the Failed field.

A running total of submitted, succeeded, pending, and failed deletions displays in the small Submitted, Succeeded, Pending, and Failed fields.

Rerunning Jobs

The Jobs Administrator window may be utilized to rerun completed jobs using the same parameters. Either multiple jobs or single jobs may be rerun. When a job is rerun, a new run number is assigned. In one embodiment, locked jobs are prevented from being rerun via these procedures.

Rerunning Multiple Jobs

Figure 54:
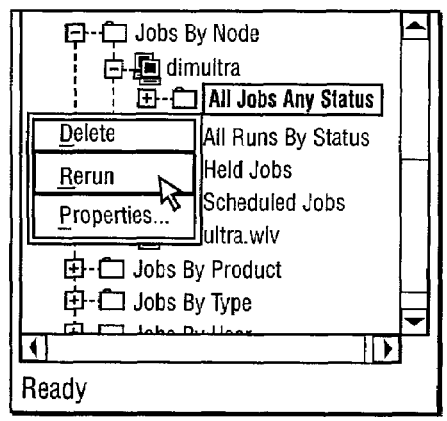
FIG. 54 is an illustration of utilization of a popup window to evoke a rerun of multiple jobs at a folder level.
Figure 55:
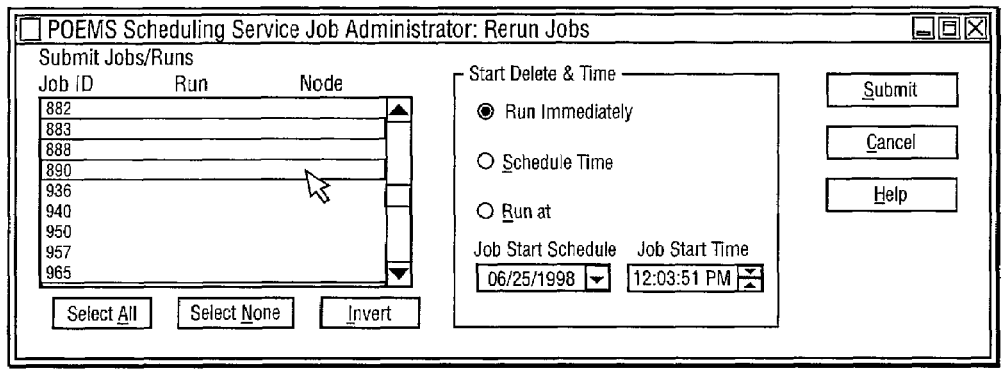
FIG. 55 is an illustration of a Rerun Jobs popup window.

To rerun multiple jobs, the Jobs Administrator window is accessed at the level of the folder containing the jobs to rerun in a Jobs resource object. The folder containing the jobs to rerun is located, and a right-click on the icon or text of the folder displays a popup menu (see FIG. 54). Selecting Rerun from the popup menu displays the Rerun Jobs window (see FIG. 55). This window displays the Job ID and node name of all of the jobs selected in the Submit Jobs/Runs field and provides options for rerunning them.

Similar to the Delete Jobs procedures discussed above, all of the jobs in a folder are initially selected. If the user clicks on a job, it is deselected and will not be rerun. If the user deselects all of the jobs, the Submit button becomes inactive.

A user may utilize one of the following options in the Start Date & Time specification area by:

Clicking on the Run Immediately button to rerun the jobs immediately;

Or

Clicking on the Schedule later button to cancel the previously scheduled next starting time for the jobs and hold the jobs in the Held Jobs folder.

Note: Jobs may be rerun either immediately or at a specified time using the Job Administrator window (see Rerunning Multiple Jobs discussed above).

Or

Clicking on the Run at button and type the date in the Job Start Date field, or clicking on the down arrow to select the date from a calendar, then typing the time in the Job Start Time field, or using the up/down arrows to scroll to the desired time.

Note: In one embodiment the user must set the date and time in these fields using the time zone originally used to run the jobs. The job times in the Jobs resource object may not display in the time zone where the job originally ran.

Figure 56:
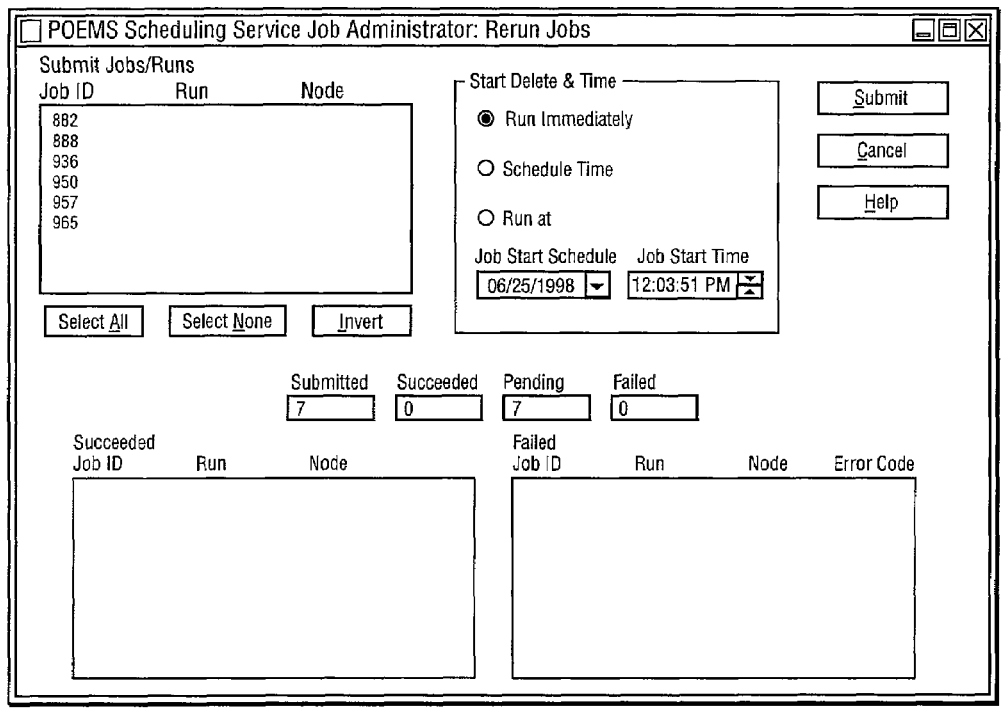
FIG. 56 is an illustration of a Status and Results window for the rerun of jobs in a Jobs folder.

The selected jobs are then rerun at the specified date and time. Clicking on the Submit button reruns the selected jobs, and the window expands to provide a dynamic display of the status and results of the action (see FIG. 56).

The selected jobs are then rerun at the specified date and time. Clicking on the Submit button reruns the selected jobs, and the window expands to provide a dynamic display of the status and results of the action (see FIG. 56). If a job is submitted successfully, the job ID and node name for each job display in the Succeeded field. If a job fails to submit, the job ID, node name, and an error code for that job display in the Failed field.

A running total of submitted, succeeded, pending, and failed reruns displays in the Submitted, Succeeded, Pending, and Failed fields.

Rerunning Single Jobs

Figure 57:
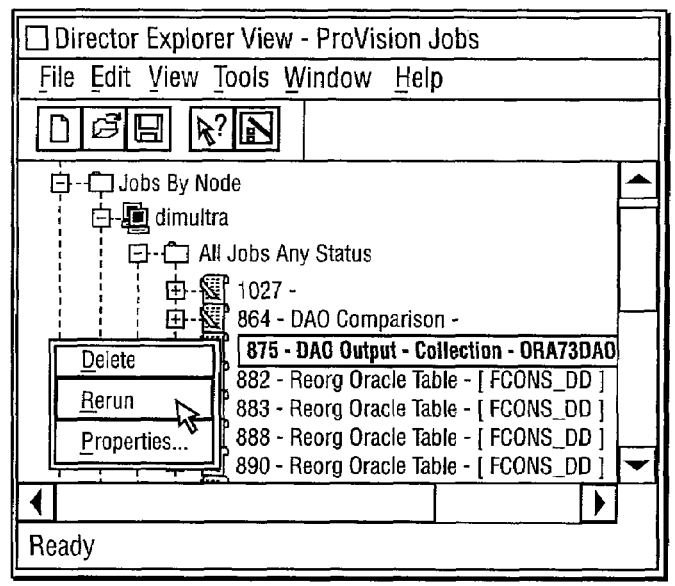
FIG. 57 is an illustration of a utilization of a popup window to rerun a single job.
Figure 58:
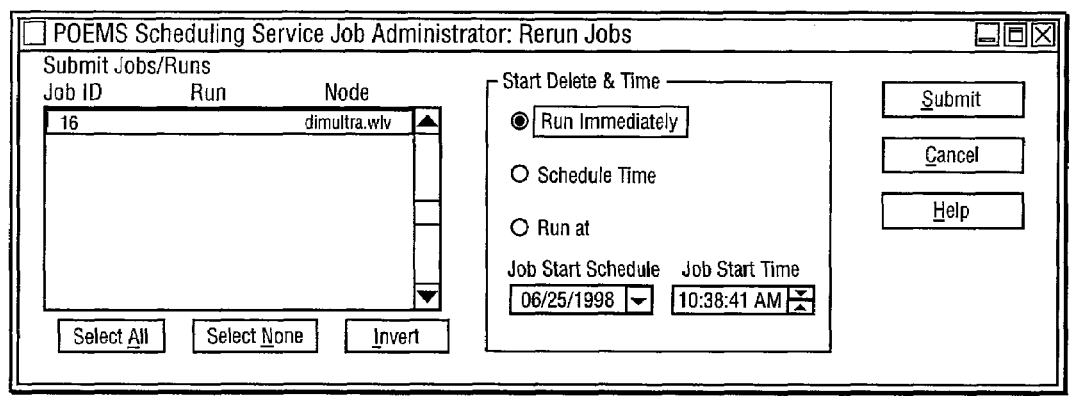
FIG. 58 is an illustration of a Rerun Jobs window for an individual job.

To rerun single jobs, the Jobs Administrator window is accessed at the level of the job to rerun. After locating the job to rerun in the Jobs folder, the icon or text of the job is right-clicked to display a menu (see FIG. 57), and Rerun is selected, displaying the Rerun Jobs window (see FIG. 58). This window displays the Job ID and node name of the selected job and provides options for rerunning it. Clicking the job deselects it and the Submit button becomes inactive. Similar start date & time options, as discussed above, are also available. Clicking on the Submit button reruns the job.

As with the other rerun options, the window expands to provide a dynamic display of the status and results of the submission.

Canceling Runs

The user can use the Jobs Administrator to cancel a running job. The user can cancel multiple runs or single runs of a job. However, some products may temporarily disable this capability during a critical stage of a job, which does not allow recovery, makes recovery difficult, or requires that the product specific procedures be followed for recovery.

Canceling Multiple Runs

Figure 59:
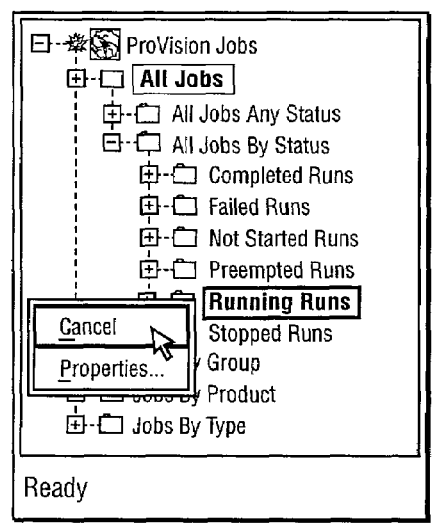
FIG. 59 is an illustration of the utilization of a popup window to cancel running jobs.

To cancel multiple runs, the Jobs Administrator is accessed at the level of the folder containing the runs to cancel in a Jobs resource object. After locating a Running Runs folder containing the runs to cancel, a right-click on the icon or text of the folder displays a popup menu (see FIG. 59).

Figure 60:
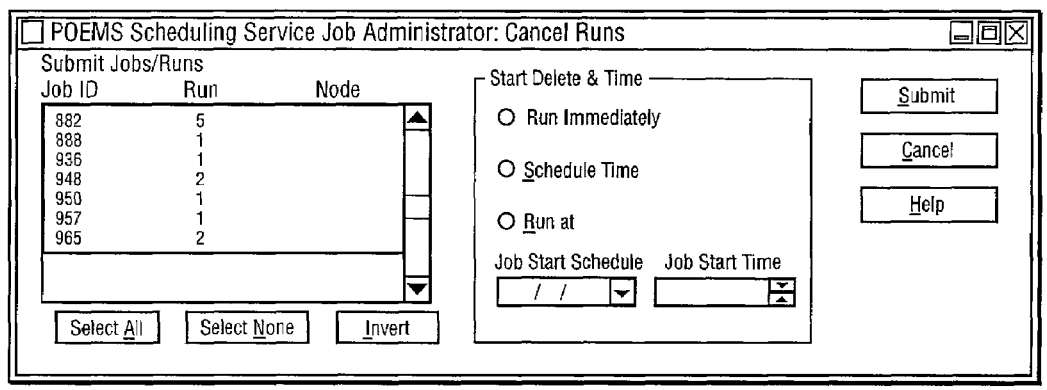
FIG. 60 is an illustration of a Cancel Runs popup window.

By selecting Cancel from the popup menu, a Cancel Runs window is displayed (see FIG. 60). This window displays the Job ID, run number, and node name of all of the runs selected in the Submit Jobs/Runs field (see FIG. 57, for example).

Similar to the Delete Job procedures, all of the runs in a folder are selected initially. By clicking on a run, it is deselected and will not be canceled. If all of the runs are deselected, the Submit button becomes inactive, etc. The Submit button cancels the selected runs, and the window expands to provide a dynamic display of the status and results of the action.

Monitoring the Progress of Jobs

A Progress Monitor is provided to view information about a current phase and overall progress of any job run by products using the POEMS Scheduling Service.

Individual products publish events regarding the different phases of their jobs. The Progress Monitor subscribes to these events and uses the resulting data to provide the user with information on the progress of the job.

The specific progress identifiers and the job phases that may be monitored are dependent on the individual design of the product using the POEMS Scheduling Service.

Accessing the Progress Monitor

The Progress Monitor may be accessed at the individual run level in the Jobs Repository Resource Object.

Figure 61:
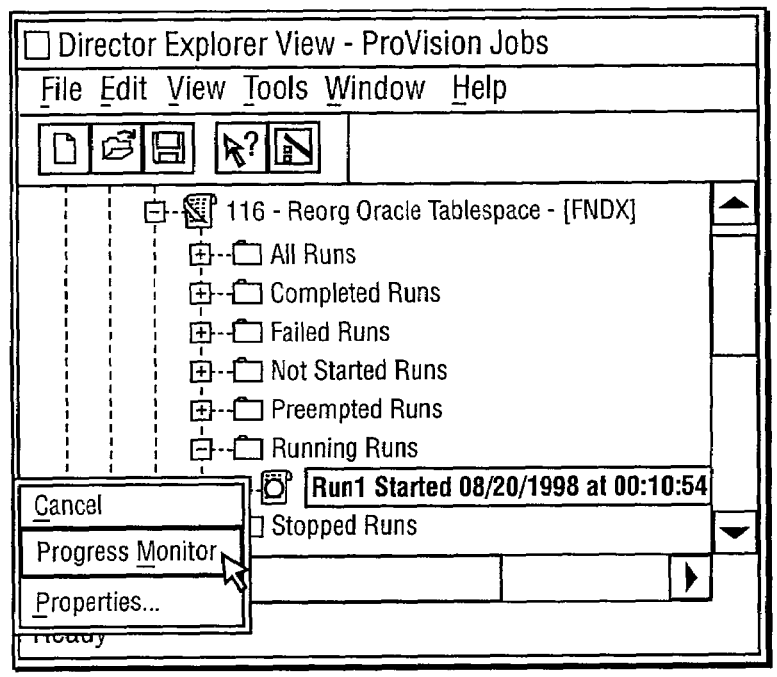
FIG. 61 is an illustration of the utilization of a popup window to invoke a Progress Monitor on a running job.
Figure 62:
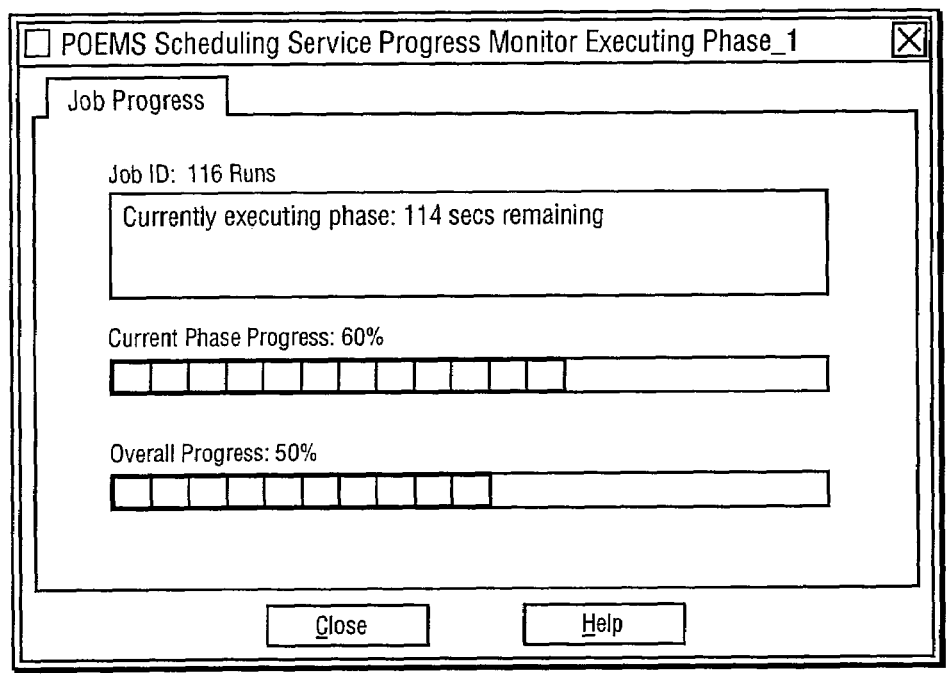
FIG. 62 is an illustration of a Progress Monitor utilized by the present invention to show phase, overall prog and other specific information about a job.

To monitor the progress of a job, a user first finds the run of the job and right-clicks on the run to display a popup menu (see FIG. 61). Selecting Progress Monitor from the popup menu displays the Progress Monitor (see FIG. 62). The Progress Monitor is configured to display the following information:

Name of the current phase of the job.

Job ID and run number.

Name and/or number of the current phase of the job.

Current phase number and the time remaining in the current phase.

Graphical display of the progress of the current phase of the job and the percentage completed of the current phase.

Graphical display of the overall progress of the job (including all phases) and the percentage completed for the entire job.

In one embodiment, the contents of the main text field vary according to the design of the product that scheduled the job.

The name of the current phase of the job can be viewed from the title bar of the Progress Monitor window. The progress of the job's current phase is determined by viewing the main text field in the Progress Monitor window, or viewing the Current Phase Progress field in the Progress Monitor window. Black bars are used to graphically display the phase progress. This field also provides the percentage completed of the job's current phase.

The progress for the entire job is viewed using the Overall Progress field in the Progress Monitor window. Again, black bars are used to graphically display the overall job's progress, and the percentage completed for the entire job.

Troubleshooting Tips

The present invention includes a number of troubleshooting techniques. A number of possibilities may cause a failure to delete and rerun jobs, or cancel specific runs of a job.

If a submission fails:

Communications to the local and central repositories may not be working. Verify that you can communicate with both of the repositories, and then submit the request again.

The user may have attempted to cancel a run during a critical phase of job execution. The specific ProVision product being used may prevent the user from using the cancel feature to avoid a potential conflict.

The POEMS Scheduling Service agent (ptlesag.exe) may not be running on the node/machine where the object is located. Verify that a scheduling service agent is running on that machine, and then submit the request again.

Figures 63, 64:
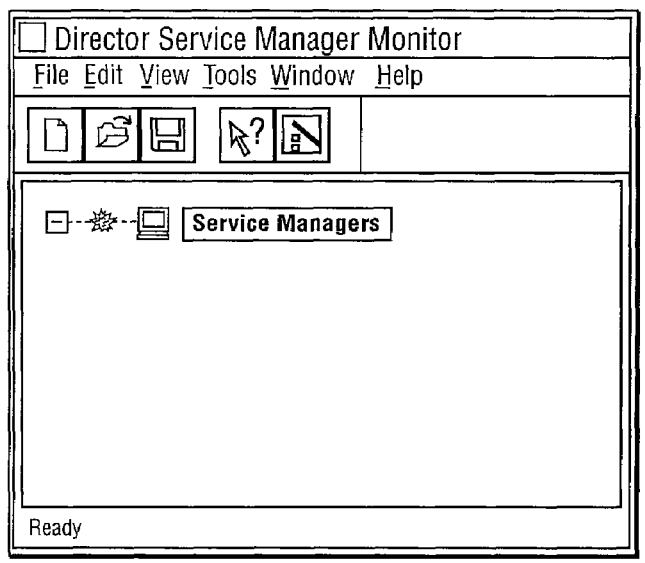
FIG. 63 is an illustration of a Director Service Manager Monitor.
FIG. 64 is an illustration of a right side of a Service Manager Monitor displaying information for programs residing on a node.

To verify that a Scheduling Services agent is running on a node, a user selects Tools ▶Monitor ▶Service Managers from the menu bar to display the Director Service Manager Monitor window (see FIG. 63). The user may click on the plus sign (+) or double-click on the text of Service Managers to display the list of service managers on different nodes. Clicking on the text of the service manager for a node brings up the right side of the Service Manager Monitor with information for the programs residing on that node (see FIG. 64).

The present invention has been described in reference to the POEMS Scheduling service utilized by the Platinum suite of database products. However, the teachings of the present invention may be applied to any individual or suite of computer or other products to provide similar services. Therefore, the present invention is not limited to a specific line of products or type of products (point products, ProVision products, or databases, for example) and apply to any computer processes or applications in general.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, application programming interfaces for Graphical User Interfaces, Job Scheduling, Job Data Management, Job Administration, a command line interface, calendaring functions, and communications across a network. The software modules also include job scheduling agents operating on individual nodes on computer platforms in the network, and modules for the display, storage, or communication of results according to the processes of the present invention.

Each of the above-described APIs are compiled and linked into specific point products, ProVision products, or other applications utilizing those APIs to perform the present invention. In addition, configuration files are maintained for setup and operation of the invention and repositories are maintained by the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A job scheduling device for scheduling jobs to run on at least two nodes of at least one computing platform, comprising:
   at least two local job repositories, each local job repository installed on a separate one of the at least two nodes and each local job repository configured to maintain job information on each job submitted to the node where the local job repository is installed, the job information including job parameters needed to execute each job; and
   at least two enterprise scheduling agents, each enterprise scheduling agent installed on a separate one of the at least two nodes and each enterprise scheduling agent configured to:
   access the job information maintained by the local job repository;
   schedule for execution each job submitted to the node where the local job repository is installed;
   determine when to execute each job submitted to the node where the local job repository is installed; and
   launch execution of each job submitted to the node based on the determination;
   a presentation system configured to accept and validate parameters identifying at least one job to be submitted for execution on at least one of the nodes; and
   a job scheduler configured to allocate at least one job based on the parameters to at least one of the nodes and to submit the allocated jobs to the at least one of the nodes;
   wherein the job scheduler is communicatively coupled to the at least two nodes by a network.

2. The job scheduling device according to claim 1, further comprising:
   a job data management device configured to maintain job data and job histories of jobs submitted to each of the nodes.

3. The job scheduling device according to claim 2, wherein the job histories include information received from each enterprise scheduling agent regarding status of the jobs submitted.

4. The job scheduling device according to claim 2, wherein the job data management device is utilized by the job scheduler to set parameters in jobs to be submitted to each of the nodes.

5. The job scheduling device according to claim 1, further comprising:
   a job history repository that saves both jobs and job histories of jobs submitted to each enterprise scheduling agent;
   wherein each enterprise scheduling agent comprises,
   an agent communicator configured to send and receive messages between the job scheduler and the enterprise scheduling agent,
   a job manager configured to setup, launch, run, and manage jobs submitted to the enterprise scheduling agent,
   a data manager configured to update and delete data from the job history repository, and
   a low level API configured to handle internal functions of the enterprise scheduling agent, file management, and message handling functions.

6. The job scheduling device according to claim 5, further comprising:
   an enterprise communicator configured to construct and communicate messages between the job scheduler and each enterprise scheduling agent; and
   a job data management device configured to maintain job histories of jobs submitted to each enterprise scheduling agent;
   wherein the data manager updates the job history via enterprise communicator messages sent from each enterprise scheduling agent to the job data management device.

7. The job scheduling device according to claim 1, further comprising:
   a command line device configured to accept commands regarding administration of jobs submitted to at least one of the nodes and
   a job administration device configured to communicate the command line to the enterprise scheduling agent installed on the at least one of the nodes for execution.

8. The job scheduling device according to claim 7, wherein:
   the commands accepted by the command line device include at least one of delete a job and all runs of the job, cancel a job's run, list all jobs by at least one of product code, status, and node, and rerun a job immediately.

9. The job scheduling device according to claim 8, wherein:
   the commands accepted by the command line device include context variables; and
   each enterprise scheduling agent converts the context variables according to a current job and job parameters, and executes the commands.

10. The job scheduling device according to claim 1, further comprising:
    a point product device configured to provide a communication link between each enterprise scheduling agent and at least one product submitting jobs to the job scheduling device;
    wherein the point product device communicates job status, job logfile, setup, cancel, job parameter functions, and requests between each enterprise scheduling agent and the at least one product.

11. The job scheduling device according to claim 10, further comprising:
    a job administration device configured to accept command line inputs and communicate the command line inputs to at least one enterprise scheduling agent;
    a job data management device configured to maintain job histories of jobs submitted to each of the nodes; and
    an enterprise communicator configured to send messages between at least one of said job scheduler, point product device, job administration device, and job data management device and each enterprise scheduling agent.

12. The job scheduling device according to claim 1, further comprising:

an enterprise communicator configured to send messages between the job scheduler and each enterprise scheduling agent.

13. The job scheduling device according to claim 12, wherein:
each enterprise scheduling agent is registered at a specific node address that identifies each enterprise scheduling agent with a unique datagroup; and
the enterprise communicator encodes each message with at least one destination corresponding to a datagroup to direct each message to at least one enterprise scheduling agent.

14. The job scheduling device according to claim 1, wherein:
each local job repository maintains job history information on each job submitted to the node where the local job repository is installed; and
each local job repository is updated by the enterprise scheduling agent installed on the node where the local job repository is installed.

15. The job scheduling device according to claim 14, further comprising:
a job data management device configured to maintain job histories of jobs submitted to each of the nodes; and
a synchronizing device configured to synchronize each local job repository with the job histories maintained by the job data management device.

16. The job scheduling device according to claim 1, further comprising:
a progress monitor configured to monitor and display execution of at least one of the jobs;
wherein:
the progress monitor provides a visual display of,
an identification of the job and a current phase of the job,
a percentage complete of the job, and
a percentage complete of the current phase.

17. The job scheduling device according to claim 1, further comprising:
an auto login device configured to accept login parameters from a user submitting a job;
wherein the login parameters are utilized by each enterprise scheduling agent to launch and execute the job submitted.

18. The job scheduling device according to claim 1, further comprising:
a notification scripting device configured to execute a notification script having instructions for notifying a user of status or a submitted job;
wherein the notification scripting device includes facilities for creating, editing, and selecting a notification script for a specific job.

19. The job scheduling device according to claim 1, wherein:
the presentation system includes,
a GUI interface that accepts user inputs for scheduling and specifying a job to be submitted;
wherein the GUI interface includes facilities for selection and creation of a scheduling calendar, selection of a start date and time, selection of recurring job run intervals, and selection of an immediate job run.

20. The job scheduling device according to claim 1, further comprising:
a resource management device configured to enable a user to locate and view jobs and job runs.

21. The job scheduling device according to claim 20, wherein:

the resource management device includes a GUI for defining an object representing a job, having,
a general properties page having input fields for a label identifying the job, and a description of the job,
a description properties page having a selection field for identifying an icon for representing the job, and
a repository page having a selection field for identifying a time zone for display of job times.

22. The job scheduling device according to claim 21, wherein:
objects defined by the resource management device comprise,
a hierarchy of folders including at least one of an all jobs folder, a jobs by group folder, a jobs by node folder, a jobs by product folder, a jobs by type folder, and a jobs by user folder.

23. The job scheduling device according to claim 22, wherein the all jobs folder includes folders, including,
an all jobs any status folder listing jobs regardless of status and associated job history of each job,
an all runs by status folder listing jobs according to status, including completed runs, failed runs, not started runs, preempted runs, running runs, and stopped runs,
a held jobs folder listing jobs that are held and can be scheduled for a later time, and
a scheduled jobs folder listing jobs that are scheduled to run.

24. The job scheduling device according to claim 1, wherein:
the presentation system includes, a strategy scheduling window configured to allow a user to view, create, modify, and delete schedules for a strategy.

25. The job scheduling device as recited in claim 1, wherein the presentation system comprises a Graphic User Interface Application Program Interface (API GUI).

26. A method of scheduling jobs to run on at least two nodes of at least one computing platform, comprising:
determining, at a first location, at least one job to be scheduled based on job parameters for the at least one job;
submitting the at least one job to the at least two nodes, each node having a local job repository and an enterprise scheduling agent installed thereon;
maintaining, at each of the local job repositories, the at least one job submitted to the node where the local job repository is installed;
using each scheduling agent to schedule for execution each job submitted to the node where the local job repository is installed;
determining, at each of the enterprise scheduling agents, when to execute the at least one job submitted to the node where the enterprise scheduling agent is installed; and
based on the determinations, executing the at least one job on the at least two nodes under management of the enterprise scheduling agents;
wherein the first location is communicatively coupled to the at least two nodes by a network.

27. The method according to claim 26, further comprising:
monitoring progress of each job executing on the at least two nodes; and
displaying the progress on a progress monitor.

28. The method according to claim 26, further comprising recording each job and a history of each job in a job history repository.

29. The method according to claim 28, further comprising:
utilizing a job data management device for,
retrieving status messages regarding each job sent from each enterprise scheduling agent, and
updating said job history repository based on said status messages.

30. The method according to claim 29, further comprising:
maintaining, at each of the local job repositories, job history information for each job submitted to the node where the local job repository is installed.

31. The method according to claim 30, further comprising:
synchronizing the job history repository with each local job repository.

32. The method according to claim 26, wherein determining at least one job to be scheduled comprises:
retrieving the job parameters from one of a product and a user interface that collects the job parameters;
validating the job parameters; and
allocating a job based on the job parameters.

33. The method according to claim 26, wherein submitting the at least one job comprises:
packaging the job parameters in a communication format; and
transmitting the packaged job parameters from a computing platform where the job parameters are determined to the at least two nodes.

34. The method according to claim 26, wherein executing the at least one job comprises:
setting up the at least two nodes to run an application program identified by the job parameters;
executing the application program on the at least two nodes; and
monitoring progress of the application being executed on the at least two nodes.

35. The method according to claim 26, further comprising:
accepting a command line for administration of a job submitted to at least one of the enterprise scheduling agents; and
communicating the command line to the at least one of the enterprise scheduling agents for execution.

36. The method according to claim 35, further comprising:
substituting context variables in the command line with data based on the context variable and the job to be administered; and
executing the command line.

37. The method according to claim 26, further comprising:
communicating data, including at least one of job status, job logfile, setup, cancel, job parameter functions, and requests for the data between a product and each enterprise scheduling agent.

38. The method according to claim 26, further comprising:
registering each enterprise scheduling agent at a node address that identifies the registered enterprise scheduling agent with a unique datagroup;
communicating jobs and job administration commands and requests with each enterprise scheduling agent via messages; and
encoding each message sent to a recipient enterprise scheduling agent with at least one destination corresponding to a datagroup that directs the message to the recipient enterprise scheduling agent.

39. The method according to claim 26, further comprising:
retrieving auto login parameters from a user scheduling an auto login job; and
launching execution of the job utilizing the auto login parameters.

40. The method according to claim 39, further comprising:
retrieving a notification script for a job being submitted; and
executing the notification script on at least one of completion of the job and at a requested status point.

41. The method according to claim 26, further comprising:
accepting a scheduling calendar identifying at least one of an execution time and an interval for at least one of the jobs; and
executing the jobs on the at least two nodes at the time and interval identified in the calendar.

42. The method according to claim 26, further comprising:
providing a description of at least one of the jobs, including a written description, a label, and an icon selected to represent the job; and
identifying a time zone for display of job times.

43. The method according to claim 26, further comprising:
placing information about job times and status in an object containing folders, each folder identifying a categorization of jobs contained therein, including, an all jobs folder, a jobs by group folder, a jobs by node folder, a jobs by product folder, a jobs by type folder, and a jobs by user folder.

44. The method according to claim 43, further comprising:
organizing the all jobs folder to maintain additional folders, including, at least one of,
an all jobs any status folder listing jobs regardless of status and associated job history of each job,
an all runs by status folder listing jobs according to status, including completed runs, failed runs, not started runs, preempted runs, running runs, and stopped runs,
a held jobs folder listing jobs that are held and can be scheduled for a later time, and
a scheduled jobs folder listing jobs that are scheduled to run.

45. The method according to claim 26, further comprising providing a strategy scheduling window that allows a user to view, create, modify, and delete schedules for a strategy.

46. Software for use in scheduling jobs to run on at least two nodes of at least one computing platform, the software embodied in computer readable media that, when executed using one or more computers, is operable to:
determine, at a first location, at least one job to be scheduled based on job parameters for the at least one job;
submit the at least one job to the at least two nodes, each node having a local job repository and an enterprise scheduling agent installed thereon;
maintain, at each of the local job repositories, the at least one job submitted to the node where the local job repository is installed;
schedule for execution each job submitted to the node where the local job repository is installed;

determine, at each of the enterprise scheduling agents, when to execute the at least one job submitted to the node where the enterprise scheduling agent is installed; and based on the determinations, execute the at least one job on the at least two nodes under management of the enterprise scheduling agents;

wherein the first location is communicatively coupled to the at least two nodes by a network.

47. A job scheduling device for scheduling jobs to run on at least two nodes of at least one computing platform, comprising:

installed on each of the at least two nodes:
first means for maintaining job information on each job submitted to the node where the first means is installed, the job information including job parameters needed to execute the job;
second means for:
accessing the job information maintained by the first means;
scheduling for execution each job submitted to the node where the first means is installed;
determining when to execute the jobs submitted to the node where the first means is installed; and
launching execution of each job submitted to the node based on the determination;
third means for accepting and validating parameters identifying at least one job to be submitted for execution on at least one of the nodes; and
fourth means for allocating at least one job based on the parameters to at least one of the nodes and for submitting the allocated jobs to the at least one of the nodes;
wherein the first means is communicatively coupled to the at least two nodes by a network.

48. The job scheduling device as recited in claim 47, wherein the third means comprises a Graphic User Interface Application Program Interface (API GUI).

49. A job scheduling system for scheduling jobs to run on at least two nodes of at least one computing platform, comprising:

at least two local job repositories, each local job repository installed on a separate one of the at least two nodes and each local job repository configured to maintain job information on each job submitted to the node where the local job repository is installed, the job information including job parameters needed to execute each job; and at least two enterprise scheduling agents, each enterprise scheduling agent installed on a separate one of the at least two nodes and each enterprise scheduling agent configured to:
access the job information maintained by the local job repository;
schedule for execution each job submitted to the node where the local job repository is installed;
determine when to execute the jobs submitted to the node where the local job repository is installed; and
launch execution of each job submitted to the node based on the determination;

a presentation system configured to accept and validate parameters identifying at least one job to be submitted for execution on at least one of the nodes; and a job scheduler configured to allocate at least one job based on the parameters to at least one of the nodes and to submit the allocated jobs to the at least one of the nodes so that the at least one allocated job can be executed by the enterprise scheduling agent installed on the node to which the job was allocated and submitted;

wherein the job scheduler is communicatively coupled to the at least two nodes by a network.

50. A job scheduling method for scheduling jobs to run on at least two nodes of at least one computing platform, comprising:

installing at least two local job repositories, each local job repository installed on a separate one of the at least two nodes, each local job repository configured to maintain job information on each job submitted to the node where the local job repository is installed, the job information including job parameters needed to execute each job;

installing at least two enterprise scheduling agents, each enterprise scheduling agent installed on a separate one of the at least two nodes, each enterprise scheduling agent configured to:
access the job information maintained by the local job repository;
schedule for execution each job submitted to the node where the local job repository is installed;
determine when to execute the each job submitted to the node where the local job repository is installed; and
launch execution of each job submitted to the node based on the determination;

at a first location:
accepting and validating parameters identifying at least one job to be submitted for execution on at least one of the nodes; and
allocating at least one job based on the parameters to at least one of the nodes;

submitting the at least one allocated job to the at least one of the nodes; and executing the at least one allocated job on the at least one of the nodes to which the job was allocated and submitted;

wherein the first location is communicatively coupled to the at least two nodes by a network.

* * * * *